(12) United States Patent
Fouts et al.

(10) Patent No.: US 12,502,218 B2
(45) Date of Patent: Dec. 23, 2025

(54) SYSTEMS AND METHODS FOR TREATING A JOINT

(71) Applicant: Stryker Corporation, Kalamazoo, MI (US)

(72) Inventors: Brian Fouts, Morgan Hill, CA (US);
Christopher Zeh, Parker, CO (US);
Ruth Godbey, San Jose, CA (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 16/785,367

(22) Filed: Feb. 7, 2020

(65) Prior Publication Data

US 2020/0253667 A1   Aug. 13, 2020

Related U.S. Application Data

(60) Provisional application No. 62/803,172, filed on Feb. 8, 2019.

(51) Int. Cl.
*G06F 7/48* (2006.01)
*A61B 34/00* (2016.01)
(Continued)

(52) U.S. Cl.
CPC .............. *A61B 34/10* (2016.02); *A61B 34/25* (2016.02); *G16H 70/60* (2018.01); *A61B 2034/102* (2016.02); *A61B 2034/105* (2016.02)

(58) Field of Classification Search
CPC ... A61B 34/10; A61B 34/25; A61B 2034/102; A61B 2034/105; A61B 2017/00212;
(Continued)

(56) References Cited

U.S. PATENT DOCUMENTS

| | | | |
|---|---|---|---|
| 5,437,672 | A | 8/1995 | Alleyne |
| 5,862,249 | A | 1/1999 | Jang et al. |

(Continued)

FOREIGN PATENT DOCUMENTS

| | | | |
|---|---|---|---|
| CN | 101518447 | A | 9/2009 |
| CN | 102194047 | A | 9/2011 |

(Continued)

OTHER PUBLICATIONS

Zhao, Liang, et al. "Automated Analysis of Femoral Artery Calcification Using Machine Learning Techniques." 2019 International Conference on Computational Science and Computational Intelligence (CSCI). IEEE, 2019.*

(Continued)

*Primary Examiner* — Nithya J. Moll
(74) *Attorney, Agent, or Firm* — Morrison & Foerster LLP

(57) ABSTRACT

Disclosed are computer visual guidance systems for guiding surgeons through arthroscopic debridement of bony pathologies, including by automatically generating annotations relating to characteristics of bony pathology in an image. The annotation may be generated in accordance with a determination as to whether a femoral head of the bony pathology is endospherical or exospherical. The annotation may be generated in accordance with a mathematical model created based on anatomies of subjects other than the patient. Further disclosed is a user interfaces for guiding a surgeon through arthroscopic debridement of a bony pathology, wherein intraoperative images are displayed simultaneously with a preoperative plan comprising interactive three-dimensional models of an anatomical feature of a patient. Further disclosed is a user interface for guiding a physician in categorizing images of a patient, wherein the (Continued)

interface comprises an image viewing window and an interactive checklist for different image categories to be captured.

31 Claims, 61 Drawing Sheets

(51) Int. Cl.
*A61B 34/10* (2016.01)
*G16H 70/60* (2018.01)
(58) Field of Classification Search
CPC ...... A61B 2034/2048; A61B 2034/252; A61B 2034/254; A61B 2090/376; A61B 2090/3966; G16H 70/60; G16H 20/40; G16H 50/50; G16H 50/70; G16H 30/40; G06T 7/0012; G06T 2207/10116; G06T 2207/30008
See application file for complete search history.

(56) References Cited

U.S. PATENT DOCUMENTS

| | | | |
|---|---|---|---|
| 6,161,080 A | 12/2000 | Aouni-Ateshian et al. | |
| 6,205,411 B1 | 3/2001 | Digioia, III et al. | |
| 6,697,664 B2 | 2/2004 | Kienzle, III et al. | |
| 7,167,738 B2 | 1/2007 | Schweikard et al. | |
| 7,231,076 B2 | 6/2007 | Fu et al. | |
| 7,327,865 B2 | 2/2008 | Fu et al. | |
| 7,643,862 B2 | 1/2010 | Schoenefeld | |
| 7,689,042 B2 | 3/2010 | Brunner et al. | |
| 7,783,008 B2 | 8/2010 | Jabri | |
| 7,949,386 B2 | 5/2011 | Buly et al. | |
| 8,014,984 B2 | 9/2011 | Iannotti et al. | |
| 8,052,623 B2 | 11/2011 | Haimerl et al. | |
| 8,090,166 B2 | 1/2012 | Rappaport et al. | |
| 8,152,816 B2 | 4/2012 | Tuma et al. | |
| 8,328,816 B2 | 12/2012 | Beaule | |
| 8,369,593 B2 | 2/2013 | Peng et al. | |
| 8,594,397 B2 | 11/2013 | Haimerl et al. | |
| 8,611,697 B2 | 12/2013 | Nathaniel et al. | |
| 8,678,125 B2 | 3/2014 | Kosugi et al. | |
| 8,679,125 B2 | 3/2014 | Smith et al. | |
| 8,694,075 B2 | 4/2014 | Groszmann | |
| 8,696,603 B2 | 4/2014 | Takahashi et al. | |
| 8,702,805 B2 | 4/2014 | Trabish | |
| 8,715,289 B2 | 5/2014 | Smith | |
| 8,774,900 B2 | 7/2014 | Buly et al. | |
| 8,828,009 B2 | 9/2014 | Allen et al. | |
| 8,831,324 B2 | 9/2014 | Penenberg | |
| 8,858,563 B2 | 10/2014 | Philippon et al. | |
| 8,888,782 B2 | 11/2014 | Smith et al. | |
| 8,890,511 B2 | 11/2014 | Belew | |
| 8,900,320 B2 | 12/2014 | Frederick et al. | |
| 8,923,584 B2 | 12/2014 | Chabanas et al. | |
| 8,934,961 B2 | 1/2015 | Lakin et al. | |
| 8,958,611 B2 | 2/2015 | Ikits | |
| 8,965,108 B2 | 2/2015 | Chabanas et al. | |
| 9,020,223 B2 | 4/2015 | Chabanas et al. | |
| 9,082,319 B2 | 7/2015 | Shimada et al. | |
| 9,113,921 B2 | 8/2015 | Lang et al. | |
| 9,113,971 B2 | 8/2015 | Metzger et al. | |
| 9,122,670 B2 | 9/2015 | Chabanas et al. | |
| 9,123,155 B2 | 9/2015 | Cunningham et al. | |
| 9,173,716 B2 | 11/2015 | Kasodekar et al. | |
| 9,183,629 B2 | 11/2015 | Chabanas et al. | |
| 9,220,567 B2 | 12/2015 | Sutherland et al. | |
| 9,271,804 B2 | 3/2016 | Wu | |
| 9,320,421 B2 | 4/2016 | Chabanas et al. | |
| 9,345,495 B2 | 5/2016 | Gibson et al. | |
| 9,345,552 B2 | 5/2016 | Janik et al. | |
| 9,386,993 B2 | 7/2016 | Meridew et al. | |
| 9,402,726 B2 | 8/2016 | Linderman et al. | |
| 9,443,346 B2 | 9/2016 | Ikits | |
| 9,480,534 B2 | 11/2016 | Bowling et al. | |
| 9,514,533 B2 | 12/2016 | Chabanas et al. | |
| 9,672,662 B2 | 6/2017 | Scanlan et al. | |
| 10,070,903 B2 | 9/2018 | Blau | |
| 10,105,168 B2 | 10/2018 | Blau | |
| 10,709,394 B2 | 7/2020 | Zhou et al. | |
| 10,918,398 B2 | 2/2021 | Fouts et al. | |
| 2003/0176783 A1* | 9/2003 | Hu | A61F 2/468 600/429 |
| 2004/0242987 A1 | 12/2004 | Liew et al. | |
| 2005/0096535 A1 | 5/2005 | de la Barrera | |
| 2007/0016008 A1 | 1/2007 | Schoenefeld | |
| 2007/0129630 A1 | 6/2007 | Shimko | |
| 2007/0135706 A1 | 6/2007 | Shimko et al. | |
| 2007/0249967 A1* | 10/2007 | Buly | A61B 90/36 600/595 |
| 2007/0260256 A1 | 11/2007 | Beaule | |
| 2008/0039717 A1 | 2/2008 | Frigg et al. | |
| 2008/0058641 A1 | 3/2008 | Shimko | |
| 2008/0300478 A1 | 12/2008 | Zuhars | |
| 2009/0000626 A1 | 1/2009 | Quaid et al. | |
| 2009/0209851 A1 | 8/2009 | Blau | |
| 2010/0049493 A1 | 2/2010 | Haimerl | |
| 2010/0284590 A1* | 11/2010 | Peng | G06T 7/12 382/128 |
| 2011/0190774 A1 | 8/2011 | Nikolchev et al. | |
| 2011/0213374 A1 | 9/2011 | Fitz et al. | |
| 2011/0213377 A1 | 9/2011 | Lang et al. | |
| 2011/0213379 A1 | 9/2011 | Blau et al. | |
| 2011/0213428 A1 | 9/2011 | Fitz et al. | |
| 2011/0213429 A1 | 9/2011 | Lang et al. | |
| 2011/0238431 A1 | 9/2011 | Cionni et al. | |
| 2011/0270295 A1 | 11/2011 | Litvack et al. | |
| 2011/0301654 A1 | 12/2011 | Wozencroft et al. | |
| 2012/0066892 A1 | 3/2012 | Lang et al. | |
| 2012/0271147 A1 | 10/2012 | Kim et al. | |
| 2013/0083984 A1 | 4/2013 | Chabanas et al. | |
| 2013/0089253 A1* | 4/2013 | Chabanas | G06T 7/0012 382/131 |
| 2013/0114866 A1 | 5/2013 | Kasodekar et al. | |
| 2013/0191099 A1 | 7/2013 | Krekel | |
| 2013/0211232 A1 | 8/2013 | Murphy et al. | |
| 2013/0211386 A1 | 8/2013 | Blau et al. | |
| 2013/0211408 A1 | 8/2013 | Kather et al. | |
| 2013/0211531 A1 | 8/2013 | Steines et al. | |
| 2013/0314440 A1 | 11/2013 | Simon et al. | |
| 2013/0315371 A1 | 11/2013 | Simon et al. | |
| 2014/0079303 A1 | 3/2014 | Pfrengle et al. | |
| 2014/0187908 A1 | 7/2014 | Ellermann et al. | |
| 2014/0243833 A1 | 8/2014 | Smith | |
| 2014/0278322 A1 | 9/2014 | Jaramaz et al. | |
| 2014/0316417 A1 | 10/2014 | Kaiser et al. | |
| 2014/0322197 A1 | 10/2014 | Brooks | |
| 2014/0378982 A1 | 12/2014 | Philippon et al. | |
| 2015/0066151 A1 | 3/2015 | Frederick et al. | |
| 2015/0106024 A1 | 4/2015 | Lightcap et al. | |
| 2015/0133945 A1 | 5/2015 | Dushyant et al. | |
| 2015/0182295 A1 | 7/2015 | Bozung et al. | |
| 2015/0185846 A1 | 7/2015 | Otto et al. | |
| 2015/0265266 A1 | 9/2015 | Sanchez et al. | |
| 2015/0265362 A1 | 9/2015 | Andersson et al. | |
| 2015/0269727 A1 | 9/2015 | Chabanas et al. | |
| 2015/0355298 A1 | 12/2015 | Ben-Eliezer et al. | |
| 2016/0038160 A1 | 2/2016 | Metzger et al. | |
| 2016/0066770 A1 | 3/2016 | Barbato et al. | |
| 2016/0074124 A1 | 3/2016 | Fitz et al. | |
| 2016/0113720 A1 | 4/2016 | Lavallee et al. | |
| 2016/0135816 A1 | 5/2016 | Lavallee et al. | |
| 2016/0157751 A1 | 6/2016 | Mahfouz | |
| 2016/0157936 A1 | 6/2016 | Netravali | |
| 2016/0175054 A1 | 6/2016 | Kang et al. | |
| 2016/0191887 A1 | 6/2016 | Casas | |
| 2016/0235381 A1 | 8/2016 | Scanlan et al. | |
| 2016/0242931 A1 | 8/2016 | Wong et al. | |
| 2016/0253846 A1 | 9/2016 | Scanlan et al. | |
| 2016/0262772 A1 | 9/2016 | Gibson et al. | |
| 2016/0278787 A1 | 9/2016 | Axelson, Jr. et al. | |
| 2016/0278793 A1 | 9/2016 | Meridew et al. | |
| 2016/0324580 A1 | 11/2016 | Esterberg | |
| 2016/0331467 A1 | 11/2016 | Slamin et al. | |

(56) References Cited

U.S. PATENT DOCUMENTS

| | | | |
|---|---|---|---|
| 2017/0306416 | A1 | 10/2017 | Bedoya et al. |
| 2018/0035964 | A1* | 2/2018 | Funabasama .......... G16H 50/30 |
| 2018/0318014 | A1 | 11/2018 | Gangwar et al. |
| 2019/0133693 | A1 | 5/2019 | Mahfouz |
| 2019/0167221 | A1 | 6/2019 | Simon et al. |
| 2019/0231433 | A1* | 8/2019 | Amanatullah ..... A61B 17/1764 |
| 2019/0231434 | A1 | 8/2019 | Lambers et al. |
| 2020/0312011 | A1 | 10/2020 | Kopeinigg et al. |
| 2021/0169503 | A1 | 6/2021 | Fouts et al. |
| 2021/0251590 | A1 | 8/2021 | Guo |
| 2021/0259774 | A1 | 8/2021 | Fouts et al. |
| 2022/0183760 | A1 | 6/2022 | Fouts et al. |
| 2023/0210599 | A1 | 7/2023 | Lambers et al. |
| 2023/0414231 | A1 | 12/2023 | Fouts |
| 2024/0390017 | A1 | 11/2024 | Fouts |

FOREIGN PATENT DOCUMENTS

| | | |
|---|---|---|
| CN | 104185451 A | 12/2014 |
| CN | 104244860 A | 12/2014 |
| CN | 112037200 A | 12/2020 |
| DE | 10057023 A1 | 6/2002 |
| EP | 1844726 B1 | 10/2007 |
| EP | 2618313 A1 | 7/2013 |
| GB | 2572594 A | 10/2019 |
| JP | 6063599 B1 | 1/2017 |
| WO | 2011/158117 A2 | 12/2011 |
| WO | 2012/149964 A1 | 11/2012 |
| WO | 2013/174401 A1 | 11/2013 |
| WO | 2013/174402 A1 | 11/2013 |
| WO | 2014/048447 A1 | 4/2014 |
| WO | 2015/124171 A1 | 8/2015 |
| WO | 2016/154557 A1 | 9/2016 |
| WO | 2017218933 A1 | 12/2017 |
| WO | 2018/236936 A1 | 12/2018 |
| WO | 2019/148154 A1 | 8/2019 |
| WO | 2019/193341 A1 | 10/2019 |

OTHER PUBLICATIONS

Minciullo, Luca, and Tim Cootes. "Fully automated shape analysis for detection of Osteoarthritis from lateral knee radiographs." 2016 23rd International Conference on Pattern Recognition (ICPR). IEEE, 2016.*

Lindner, Claudia, et al. "Fully automatic segmentation of the proximal femur using random forest regression voting." IEEE transactions on medical imaging 32.8 (2013): 1462-1472.*

Agus et al. (2003). "A haptic model of a bone-cutting burr," Studies in Health Technology and Informatics 94: 4-10.

Alignment Disorders, Radiology Key, 2015, https://radiologykey.com/alignment-disorders/.

Allen, D. et al., Prevalence of associated deformities and hip pain in patients with cam-type femoroacetabular impingement, J Bone Joint Surg, vol. 91-B. No. 5, May 2009, pp. 589-594.

Anderson, Lucas A. et al., Acetabular Carilage Delamination in Femoroacetabular Impingement: Risk Factors and Magnetic Resonance Imaging Diagnosis, J Bone Joint Surg Am, vol. 91, No. , 2009, pp. 305-313.

Atlas of MSK Measurements: how to draw the alpha angle, Stanford MSK, http://xrayhead.com/measure/show_measurement.php?i=3.

Atlas of MSK Measurements: how to draw the femoral version, Stanford MSK, http://xrayhead.com/measure/show_measurement.php?i=5.

Audenaert et al. (May 2012). "Imageless versus image-based registration in navigated arthroscopy of the hip," The Journal of Bone & Joint Surgery 94-B(5) 624-629.

Audenaert, Emmanuel A. et al., Development of a three-dimensional detection method of cam deformities in femoroacetabular impingement, Skeletal Radiology, vol. 40, 2011, pp. 921-927.

Audenaert, Emmanuel A. et al., Three-Dimensional Assessment of Cam Engagement in Femoroacetabular Impingement, Arthroscopy, vol. 27, No. 2, 2011, pp. 167-171.

Beaule, Paul E. et al., Three-dimensional computed tomography of the hip in the assessment of femoroacetabular impingement, J Orthop Res, vol. 23, 2005, pp. 1286-1292.

Beck, M. et al., Hip morphology influences the pattern of damage to the acetabular cartilage: femoroacetabular impingement as a cause of early osteoarthritis of the hip, J Bone Joint Surg, vol. 87-B, No. 7, 2005, pp. 1012-1018.

Bei, Yanhong. et al., Multibody dynamic simulation of knee contact mechanics, Med Eng Phys., vol. 26, No. 9, Nov. 2004, pp. 777-789.

Bouma, Heinse W. et al., Can Combining Femoral and Acetabular Morphology Parameters Improve the Characterization of Femoroacetabular Impingement?, Clin Orthop Rel Res, vol. 473, No. 4, 2015, pp. 1396-1403.

Broughton, N. S. et al., Reliability of radiological measurements in the assessment of the child's hip, J Bone Joint Surg, vol. 71-B, No. 1, 1989, p. 6-8.

Butler, Mark H., Current Technologies for Device Independence, Hewlett Packard, 2001, pp. 1-28.

Cadet, Edwin R. et al., Inter-and intra-observer agreement of femoroacetabular impingement (FAI) parameters comparing plain radiographs and advanced, 3D computed tomographic (CT)-generated hip models in a surgical patient cohort, Knee Surg Sports Traumatol Arthrosc, vol. 27, No. 7, 2014, pp. 2324-2331.

Carlisle, John C. et al., Reliability of Various Observers in Determining Common Radiographic Parameters of Adult Hip Structural Anatomy, The Iowa Orthopaedic Journal, vol. 31, 2011, pp. 52-58.

Chadayammuri, Vivek et al., Measurement of lateral acetabular coverage: a comparison between CT and plain radiography, J Hip Preservation Surgery, vol. 2, No. 4, Oct. 22, 2015, pp. 392-400.

Chadayammuri, Vivek et al., Passive Hip Range of Motion Predicts Femoral Torsion and Acetabular Version, J Bone Joint Surg Am., vol. 98, 2016, pp. 127-134.

Chavhan, Govind B. et al., Principles, Techniques, and Applications of T2*-based MR Imaging and Its Special Applications, RadioGraphics, vol. 29, 2009, pp. 1433-1449.

Cheng, Hui et al., Comparison of 2.5D and 3D Quantification of Femoral Head Coverage in Normal Control Subjects and Patients with Hip Dyplasia, PLOS One, vol. 10, No. 11, Nov. 24, 2015, pp. 1-14.

Clohisy, John C. et al., A Systematic Approach to the Plain Radiographic Evaluation of the Young Adult Hip, J Bone Joint Surg Am., vol. 90, Supp. 4, 2008, pp. 47-66.

Clohisy, John C. et al., Radiographic Evaluation of the Hip has Limited Reliability, Clin Orthop Relat Res, vol. 467, 2009, pp. 666-675.

Clohisy, John C. et al., The Frog-leg Lateral Radiograph Accurately Visualized Hip Cam Impingement Abnormalities, Clin Orthop Relat Res, No. 462, Sep. 2007, pp. 115-121.

Cobb et al. (Apr. 30, 2010). "Cams and Pincer Impingement Are Distinct, Not Mixed," Clinical Orthopaedics and Related Research 468(8): 2143-2151.

Dandachli, W. et al., Analysis of cover of the femoral head in normal and dysplastic hips, J Bone Joint Surg, vol. 90-B, No. 11, 2008, pp. 1428-1434.

Dandachli, W. et al., Three-dimensional CT analysis to determine acetabular retroversion and the implications for the management of femoro-acetabular impingement, J Bone Joint Surg. vol. 91-B, No. 8, 2009, pp. 1031-1036.

Danz, J.C. et al., Three-dimensional portable document format: A simple way to present 3-dimensional data in an electronic publication, American Journal of Orthodontics and Dentofacial Orthopedics, vol. 140, No. 2, Aug. 2011, pp. 274-276.

Dyonics Plan Hip Impingement Planning System: User Manual and Frequently Asked Questions, Smith & Nephew, Inc., 2014.

Eguizabal, Alma et al., A Weighting Strategy for Active Shape Models, IEEE International Conference on Image Processing, 2017.

Eijer, H. et al., Evaluation and Treatment of Young Adults with Femoro-Acetabular Impingement Secondary to Perthes' Disease, Hip Int., vol. 16, No. 4, 2006, pp. 273-280.

EOS Imaging. "EOS System," located at https://www.eos-imaging.com/us/our-expertise/imaging-solutions/eos-system, visited on Oct. 29, 2019. 8 pages.

(56) References Cited

OTHER PUBLICATIONS

Extended European Search Report dated May 13, 2020, directed to EP Application No. 17870894.7; 12 pages.
Fa, Lianggluo et al., Superiority of the modified Tonnis angle over the Tonnis angle in the radiographic diagnosis of acetabuular dysplasia, Experimental and Therapeutic Medicine, vol. 8, 2014, pp. 1934-1938.
Fabricant, Peter D. et al., Clinical Outcomes After Arthroscopic Psoas Lengthening: The Effect of Femoral Version, Arthroscopy, vol. 28, No. 7, 2012, pp. 965-971.
Fabricant, Peter D. et al., The Effect of Femoral and Acetabular Version on Clinical Outcomes After Arthroscopic Femoroacetabular Impingement Surgery, J Bone Joint Surg, vol. 97, No. 7, 2015, pp. 537-543.
Fouts et al., U.S. Notice of Allowance and Fee(s) Due mailed Oct. 8, 2020, directed to U.S. Appl. No. 15/818,394; 7 pages.
Fouts et al., U.S. Office Action dated Apr. 21, 2020, directed to U.S. Appl. No. 15/818,394; 33 pages.
Fouts et al., U.S. Office Action dated Dec. 20, 2019, directed to U.S. Appl. No. 15/818,394; 28 pages.
Fouts et al., U.S. Office Action dated Feb. 15, 2019, directed to U.S. Appl. No. 15/818,394; 21 pages.
Gosvig, K. K. et al., A new radiological index for assessing asphericity of the femoral head in cam impingement, J Bone Joint Surg, vol. 89-B, No. 10, Oct. 2007, pp. 1309-1316.
Hanson, Joey A. et al., Discrepancies in measuring acetabular coverage: revisiting the anterior and lateral center edge angels, Journal of Hip Preservation Surgery, vol. 2, No. 3, 2015, pp. 280-286.
Hellman, Michael D. et al., Radiographic Comparison of Anterior Acetabular Rim Morphology Between Pincer Femoroacetabular Impingement and Control, Arthroscopy, vol. 32, No. 3, 2016, pp. 468-472.
Hernandez, Ramiro J. et al., CT Determination of Femoral Torsion, AJR, vol. 137, Jul. 1981, pp. 97-101.
Hetsroni, Iftach et al., Anterior Inferior Illiac Spine Morphology Correlates With Hip Range of Motion: A Classification System and Dynamic Model, Clin Orthop Relat Res, vol. 471, No. 8, Aug. 2013, pp. 2497-2503.
Heyworth, Benton E. et al., Preoperative Three-dimensional CT Predicts Intraoperative Findings in Hip Arthroscopy, Clin Orthop Rlat Res, vol. 470, No. 7, Jul. 2012, pp. 1950-1957.
International Preliminary Report on Patentability mailed on May 31, 2019 for PCT Application No. PCT/US2017/062603 filed Nov. 20, 2017, 11 pages.
International Search Report and Written Opinion mailed Jun. 1, 2021, directed to International Application No. PCT/US2021/018911; 17 pages.
International Search Report and Written Opinion mailed on Feb. 1, 2018 for PCT Application No. PCT/US2017/062603 filed Nov. 20, 2017, 12 pages.
Ito, K. et al., Femoroacetabular impingement and the cam-effect: a MRI-based quantitative anatomical study of the femoral head-neck offset, J Bone Joint Surg, vol. 83-B, No. 2, Mar. 2001, pp. 171-176.
Jesse, Mary Kristen et al., Normal Anatomy and Imaging of the Hip: Emphasis on Impingement Assessment, Seminars in Musculoskeletal Radiology, vol. 17, No. 3, 2013, pp. 229-247.
Johnston, Todd L. et al., Relationship Between Offset Angle Alpha and Hip Chondral Injury in Femoroacetabular Impingement, Arthoroscopy, vol. 24, No. 6, 2008, pp. 669-675.
Kasten et al. (Apr. 2020). "End-To-End Convultional Neural Network for 3D Reconstruction of Knee Bones from Bi-Planar X-Ray Images," 12 pages.
Kelkar, Rajeev, Normal and Abnormal Mechanics of the Shoulder: Studies of Articular Geometry, Contact, and Kinematics, ProQuest Dissertations and Theses, 1996.
Kelly, Bryan T. et al., Alterations in Internal Rotation and Alpha Angles Are Associated With Arthroscopic Cam Decompression in the Hip, The American Journal of Sports Medicine, 2012, pp. 1-6.
Konishi, N. et al., Determination of acetabular coverage of the femoral head with use of a single anteroposterior radiograph. A new computerized technique, J Bone Joint Surg Am, vol. 75-A, No. 9, 1993, pp. 1318-1333.
Kraeutler, Matthew J. et al., Femoral Version Abnormalities Significantly Outweigh Effect of Cam Impingement on Hip Internal Rotation, J Bone Joint Surg Am., vol. 100-A, No. 3, 2018, pp. 205-210.
Krekel, P.R. et al., Interactive simulation and comparative visualisation of the bone-determined range of motion of the human shoulder, SimVis, 2006, pp. 1-13.
Laborie, Lene Bjerke et al., Radiographic measurements of hip dysplasia at skeletal maturity—new reference Intervals baed on 2,036 19-yea-old Norwegians, Skeletal Radiol, vol. 42, No. 7, Jul. 2013, pp. 925-935.
Lambers et al., U.S. Office Action dated Dec. 15, 2020 directed U.S. Appl. No. 16/261,464; 16 pages.
Lambers et al., U.S. Office Action dated Jun. 11, 2021, directed to U.S. Appl. No. 16/261,464; 13 pages.
Larson, Christopher M. et al., Are Normal Hips Being Labeled as Pathologic? A CT-based Method for Defining Normal Acetabular Coverage, Clin Orthop Relat Res, vol. 473, No. 4, Apr. 5, 2015. pp. 1247-1254.
Larson, Christopher M. et al., Arthroscopic Hip Revision Surgery for Residual Femoroacetabular Impingement (FAI): Surgical Outcomes Compared With a Matched Cohort After Primary Arthroscopic FAI Correction, The Am J of Sports Med. vol. 42, No. 8, 2014, pp. 1785-1790.
Leboeuf, Fabien, Using LATEX to produce multi-media clinical reports, The PracTeX Journal, No. 1, 2011, pp. 1-14.
Lequesne, M. et al., The normal hip joint space: variations in width, shape, and architecture on 223 pelvic radiographs, Ann Rheum Dis, vol. 63, 2004, pp. 1145-1151.
Levy, David M. et al., Prevalence of Cam Morphology in Females with Femoroacetabular Impingement, Front. Surg., vol. 2, No. 61, Dec. 2015, pp. 1-5.
Mardones, Rodrigo M. et al., Surgical Correction of "Cam-Type" Femoroacetabular Impingement: A Cadaveric Comparison of Open Versus Arthroscopic Debridement, Arthroscopy, vol. 25, No. 2, 2009, pp. 175-182.
Mardones, Rodrigo M. et al., Surgical Treatment of Femoroacetabular Impingement: Evaluation of the Effect of the Size of the Resection, J Bone Joint Surg Am, vol. 88A, Supp. 1, Mar. 2006, pp. 84-91.
Matsuda et al., Acute latrogenic Dislocation Following Hip Impingement Arthroscopic Surgery, Arthroscopy, vol. 25, No. 4, 2009, pp. 400-404.
Matsuda et al., Closed Intramedullary Derotational Osteotomy and Hip Arthroscopy for Cam Femoroacetabular Impingement From Femoral Retroversion, Arthroscopy Techniques, vol. 3, No. 1, 2014, pp. e83-e88.
McCarthy, Joseph et al., Anatomy, pathologic features, and treatment of acetabular labral tears, Clin Orthop Relat Res, No. 406, 2003, pp. 38-47.
Meyer, Dominik C. et al., Comparison of Six Radiographic Projections to Assess Femoral Head/Neck Ashpericity, Clin Orthop Relat Res. No. 445, 2006, pp. 181-185.
Milone, Michael T. et al., Novel CT-based Three-dimensional Software Improves the Characterization of Cam Morphology, Clin Orthop Relat Res, vol. 471, No. 8, Aug. 2013, pp. 2484-2491.
Miyasaka, Dai et al., Three-dimensional Assessment of Femoral Head Coverage in Normal and Dysplastic Hips: A Novel Method, Acta Med., vol. 68, No. 5, 2014, pp. 277-284.
Murphy, S.B. et al., The prognosis in untreated dysplasia of the hip: A study of radiographic factors that predict the butcome, J Bone Joint Surg Am, vol. 77-A, No. 7, 1995, pp. 985-989.
Nepple, Jeffrey J. et al., Clinical and Radiographic Predictors of Intra-articular Hip Disease in Arthroscopy, Am J Sports Med, vol. 39, No. 2, 2011, pp. 296-303.
Nepple, Jeffrey J. et al., Diagnostic Imaging of Femoroacetabular Impingement, J Am Acad Orthop Surg, vol. 21, Suppl. 1, 2013, pp. S20-S26.

(56) References Cited

OTHER PUBLICATIONS

Nepple, Jeffrey J. et al., Do Plain Radiographs Correlate With CT for Imaging of Cam-type Femoroacetabular Impingement?. Clin Orthop Relat Res, vol. 470, No. 12, Dec. 2012, pp. 3313-3320.
Notzli, H.P. et al., The contour of the femoral head-neck junction as a predictor for the risk of anterior impingement, J Bone Joint Surg, vol. 84-B, 2002, pp. 556-560.
Ogata, S. et al., Acetabular cover in congenital dislocation of the hip, J Bone Joint Surg, vol. 72-B, No. 2, 1990, pp. 190-196.
Omeroglu, Hakan et al., Analysis of a radiographic assessment method of acetabular cover in developmental dysplasia of the hip, Arch Orthop Trauma Surg, vol. 122, No. 6, 2002, pp. 334-337.
Omeroglu, Hakan et al., Measurement of center-edge angle in developmental dysplasia of the hip: a comparison of two methods in patients under 20 years of age, Skeletal Radiol, vol. 31, No. 1, 2002, pp. 25-29.
Outerbridge, R.E., The etiology of chondromalacia patellae, J Bone Joint Surg, vol. 43-B, No. 4, 1961, pp. 556-560.
Ozcelik, Abdurrahman et al., Definition of a quantitative measurement method for acetabular version in a plain radiograph in the healthy adult hip, Eklem Hastalik Cerrahisi, vol. 26, No. 1, 2015, pp. 2-5.
Panoramic Fluoro, Radlink Inc., 2017, http:-www.radlink.com-index.php-products-software-surgeons-checklist-software-panoramic-fluoro-.
Perreira, Aimee C. et al., Multilevel Measurement of Acetabular Version Using 3-D CT-generated Models, Clin Orthop Relat Res, vol. 469, No. 2, Feb. 2011, pp. 552-561.
Phelps, A. et al., Embedding 3D Radiology Models in Portable Document Format, American Journal of Roentgenology, vol. 199, No. 6, Dec. 2012, pp. 1342-1344.
Rakhra, Kawan S. et al., Comparison of MRI Alpha Angle Measurement Planes in Femoroacetabular Impingement, Clin Orthop Relat Res, vol. 467, No. 3, 2009, pp. 660-665.
Reikeras, Olav et al., Cross table lateral radiography for measurement of acetabular cup version, Ann Transl Med., vol. 4, No. 9, 2016, pp. 1-4.
Reynolds, D. et al., Retroversion of the acetabulum: a cause of hip pain, J Bone Joint Surg, vol. 81-B, No. 2, Mar. 1999, pp. 281-288.
Ross, James R. et al., Intraoperative Fluoroscopic Imaging to Treat Cam Deformities: Correlation With 3-Dimensional Computed Tomography, Am J. Sports Med. vol. 42, No. 6, 2014, pp. 1370-1376.
Ruthensteiner, B. et al., Embedding 3D Models of Biological Specimens in PDF Publications, Microscopy Research and Technique, vol. 71, No. 11, 2008, pp. 778-786.
Schumann et al. (2013). "An Integrated System for 3D Hip Joint Reconstruction from 2D X-rays: A Preliminary Validation Study," Annals of Biomedical Engineering, 41(10): 2077-2087.
Siebenrock, K.A. et al., Effect of Pelvic Tilt on Acetabular Retroversion: A Study of Pelves From Cadavers, Clin Orthop Relat Res. No. 407, Feb. 2003, pp. 241-248.
Stahelin, Lisca et al., Arthroscopic Offset Restoration in Femoroacetabular Cam Impingement: Accuracy and Early Clinical Outcome, Arthroscopy: The J of the Arthroscopic and Rel Surg, vol. 24, No. 1, 2008, pp. 51-57.
Stelzeneder, David et al., Can Radiographic Morphometric Parameters for the Hip Be Assessed on MRI?, Clin Orthop Relat Res, vol. 471, No. 3, Mar. 2013, pp. 989-999.
Stubbs, Allston J. et al., Classic measures of hip dysplasia do not correlate with three-dimensional computer tomographic measures and indices, Hip Int, vol. 21, No. 5, 2011, pp. 549-558.
Tannast, Moritz et al., Conventional radiographs to assess femoroacetabular impingement, Instr Course Lect, vol. 58, 2009, pp. 203-212.
Tannast, Moritz et al., Femoroacetabular Impingement: Radiographic Diagnosis—What the Radiologist Should Know, Am J Radiology, vol. 188, Jun. 2007, pp. 1540-1552.
Tannast, Moritz et al., Noninvasive Three-Dimensional Assessment of Femoroacetabular Impingement, J Orthop Res, vol. 25, No. 1, 2007, pp. 122-131.
Tannast, Moritz et al., Which Radiographic Hip Parameters Do Not Have to Be Corrected for Pelvic Rotation and Tilt?, Clin Orthop Relat Res, vol. 473, No. 4, Apr. 2015, pp. 1255-1266.
Tannenbaum, Eric et al., Gender and racial differences in focal and global acetabular version, J Arthroplasty, vol. 29, No. 2, Feb. 2014, pp. 373-376.
Tannenbaum, Eric P. et al., A Computed Tomography Study of Gender Differences in Acetabular Version and Morphology: Implications for Femoroacetabular Impingement, The J of Arthroscopic and Rel Surg, vol. 31, No. 7, 2015, pp. 1247-1254.
Thaler et al. "Volumetric Reconstruction from a Limited No. of Digitally Reconstructed Radiographs Using CNNs," Proceedings of a OAGM Workshop, 2018; pp. 13-19.
Tonnis, D. et al., Acetabular and Femoral Anteversion: Relationship with Osteoarthritis of the Hip, J Bone Joint Surg Am, vol. 81-A, No. 12, 1999, pp. 1747-1770.
Tonnis, D., Congenital Dysplasia and Dislocation of the Hip in Children and Adults, Chapter 9, 1987, pp. 100-142.
Uchida, Soshi et al., Clinical and Radiographic Predicators for Worsened Clinical Outcomes After Hip Arthroscopic Labral Preservation and Capsular Closure in Developmental Dysplasia of the Hip, Am J Sports Med. vol. 44, No. 1, 2016, pp. 28-38.
Van Bosse, Harold J. P. et al., Pelvic Positioning Creates Error in CT Acetabular Measurements, Clin Orthop Relat Res, vol. 469, No. 6, Jun. 2011, pp. 1683-1691.
Werner, Clement M. L. et al., Normal values of Wiberg's lateral center-edge angle and Lequesne's acetabular index-a coxometric update, Skeletal Radiol, vol. 41, 2012, pp. 1273-1278.
Wiberg, Gunnar, Studies on Dysplastic Acetabula and Congenital Subluxation of the Hip Joint with Special Reference to the Complication of Osteoarthritis, Orthopedic Clinic of Karolinska Institutet, 1939, pp. 1-39 and 129-135.
Wilson, J. D. et al., To what degree is digital imaging reliable? Validation of femoral neck shaft angle measurement in the era of picture archiving and communication systems, The British Journal of Radiology, vol. 84, Apr. 2011, pp. 375-379.
Zaltz, Ira et al., The Crossover Sign Overestimates Acetabular Retroversion, Clin Orthop Relat Res, vol. 471, 2013, pp. 2463-2470.
Ziegler, A. et al., Effectively incorporating selected multimedia content into medical publications, BMC Medicine, vol. 9, No. 17, 2011, pp. 1-6.
Decision of Rejection dated Sep. 1, 2022, directed to CN Application No. 201780083846.8; 14 pages.
First Office Action dated Aug. 31, 2021, directed to CN Application No. 201780083846.8; 25 pages.
Fouts et al., U.S. Notice of Allowance and Fee(s) Due mailed Nov. 3, 2022, directed to U.S. Appl. No. 17/143,091; 9 pages.
International Preliminary Report on Patentability dated Aug. 23, 2022, directed to International Application No. PCT/US2021/018911; 10 pages.
International Search Report and Written Opinion mailed May 10, 2022, directed to International Application No. PCT/US2021/072917; 13 pages.
Lambers et al., U.S. Advisory Action dated Oct. 21, 2021, directed to U.S. Appl. No. 16/261,464; 5 pages.
Ambers et al., U.S. Notice of Allowance and Fee(s) Due mailed May 13, 2022, directed to U.S. Appl. No. 16/261,464; 5 pages.
Lambers et al., U.S. Office Action dated Dec. 20, 2021, directed to U.S. Appl. No. 16/261,464; 15 pages.
Second Office Action dated Mar. 16, 2022, directed to CN Application No. 201780083846.8; 17 pages.
Fouts et al., U.S. Advisory Action dated Aug. 9, 2024, directed to U.S. Appl. No. 18/190,956; 6 pages.
Fouts et al., U.S. Election of Species Requirement dated Jun. 4, 2024, directed to U.S. Appl. No. 17/180,573; 6 pages.
Fouts et al., U.S. Office Action dated Jun. 6, 2024, directed to U.S. Appl. No. 17/644,335; 14 pages.
Fouts et al., U.S. Office Action dated Nov. 1, 2024, directed to U.S. Appl. No. 17/180,573; 17 pages.
Fouts et al., U.S. Office Action dated Sep. 12, 2024, directed to U.S. Appl. No. 18/190,956; 20 pages.
Jansen, Mylène. (Sep. 15, 2017). "A Novel 3D joint space quantification method in patients with osteoarthritis in the knee." 64 pages.

(56) References Cited

OTHER PUBLICATIONS

Fouts et al., U.S. Notice of Allowance and Fee(s) Due mailed Feb. 21, 2025, directed to U.S. Appl. No. 18/190,956; 7 pages.
Fouts et al., U.S. Notice of Allowance and Fee(s) Due mailed Nov. 25, 2024, directed to U.S. Appl. No. 17/644,335; 10 pages.
Fouts et al., U.S. Office Action dated Mar. 19, 2025, directed to U.S. Appl. No. 17/180,573; 16 pages.
Office Action dated Apr. 10, 2025, directed to EP Application No. 21 711 707.6; 6 pages.
The First Office Action dated May 8, 2025, directed to CN Application No. 202180030039.6; 9 pages.
Fouts et al., U.S. Office Action dated Apr. 25, 2024, directed to U.S. Appl. No. 18/190,956; 32 pages.
Fouts et al., U.S. Office Action dated Nov. 9, 2023, directed to U.S. Appl. No. 18/190,956; 18 pages.
International Preliminary Report on Patentability dated Jun. 13, 2023, directed to International Application No. PCT/US2021/072917; 9 pages.
Lambers et al., U.S. Notice of Allowance and Fee(s) Due mailed Nov. 24, 2023, directed to U.S. Appl. No. 18/045,449; 6 pages.
Lambers et al., U.S. Office Action dated Jul. 7, 2023, directed to U.S. Appl. No. 18/045,449; 14 pages.
Office Action dated Aug. 23, 2023, directed to EP Application No. 17 870 894.7; 6 pages.

\* cited by examiner

SYSTEMS AND METHODS FOR TREATING A JOINT

CROSS-REFERENCE TO RELATED APPLICATIONS

This application claims the benefit of U.S. Provisional Application No. 62/803,172, filed Feb. 8, 2019, the entire contents of which are hereby incorporated by reference herein.

FIELD

This disclosure relates to orthopedics in general, and more particularly to surgical methods and systems for treating a joint.

BACKGROUND

Orthopedics is a medical specialty that focuses on the diagnosis, correction, prevention, and treatment of patients with skeletal conditions, including for example conditions or disorders of the bones, joints, muscles, ligaments, tendons, nerves and skin, which make up the musculoskeletal system. Joint injuries or conditions such as those of the hip joint or other joints can occur from overuse or over stretching or due to other factors, including genetic factors, and may cause deviation from the baseline anatomy of the joint. As an example, the hip joint movably connects the leg to the torso. The hip joint is a ball-and-socket joint, and is capable of a wide range of different motions, e.g., flexion and extension, abduction and adduction, internal and external rotation, etc. See FIGS. 1A-1D. With the possible exception of the shoulder joint, the hip joint is perhaps the most mobile joint in the body. The hip joint carries substantial weight loads during most of the day, in both static (e.g., standing and sitting) and dynamic (e.g., walking and running) conditions.

The joints (e.g., a hip joint) are susceptible to a number of different pathologies (e.g., conditions or disorders, which may cause deviation from the baseline anatomy of the joint). These pathologies can have both congenital and injury-related origins. In some cases, the pathology can be substantial at the outset. In other cases, the pathology may be minor at the outset but, if left untreated, may worsen over time. More particularly, in many cases an existing pathology may be exacerbated, for example, by the dynamic nature of the joint, the substantial weight loads imposed on the joint, or a combination thereof.

The pathology may, either initially or thereafter, significantly interfere with patient comfort and lifestyle. In some cases, for example in connection with the hip joint, the pathology may be so severe as to require partial or total hip replacement. A number of procedures have been developed for treating hip pathologies short of partial or total hip replacement, but these procedures are generally limited in scope due to the significant difficulties associated with treating the hip joint.

SUMMARY

According to some known surgical techniques discussed in further detail below, while a surgeon is debriding bone (e.g., bone on a cam or pincer in a hip, as discussed below), the surgeon cannot get updated measurements of the certain parameters (e.g., an Alpha Angle (or the Center Edge Angle) in hip surgeries) to determine if more bone needs to be removed. In order to achieve this, the patient would have to be moved out of the operating room to the imaging room, the necessary image(s) obtained, the measurements (e.g., Alpha Angle or Center Edge Angle) calculated, and then the patient moved back to the operating room. The time necessary to do this, while requiring the operating room staff to wait, in addition to the inability to maintain sterility of the patient's surgical site, make this an impractical solution. As a result, the surgeon lacks the ability to measure important measurements (e.g., the Alpha Angle and/or the Center Edge Angle) during surgery. Therefore, the surgeon cannot make these anatomical measurements while bone is being removed to assess if sufficient bone has been removed or if additional bone removal is required. The surgery is completed without updated anatomical measurements to confirm that various pathologies (e.g., cam and/or pincer pathologies) have been adequately treated.

Accordingly, it is desirable to provide the surgeon with methods and systems that facilitate acquiring images at multiple time points during a surgery, measuring the anatomy using the acquired images, and then continuing the surgery, all without disrupting the surgical procedure.

In some embodiments, there is provided a method and system for guiding the surgeon during an arthroscopic debridement procedure, such as a procedure to treat cam-type femoroacetabular impingement as discussed in further detail below. In some embodiments, there is provided a computer visual guidance system wherein a 2D image obtained from an ordinary C-arm X-ray device is analyzed (e.g., automatically analyzed) and annotated so as to provide the surgeon with additional information and data for guiding the surgeon through an arthroscopic debridement procedure (e.g., a procedure to treat cam-type or pincer-type femoroacetabular impingement). In some embodiments, the surgeon lines up the C-arm X-ray device with an appropriate patient anatomy (e.g., the patient's hip), captures an X-ray image (e.g., of the femur and acetabulum), and the computer visual guidance system then automatically detects the features of the patient anatomy (e.g., edges of the femur and acetabulum), and computes and displays measurements of the pathology. The computer visual guidance system may additionally identify one or more pathologies which are to be removed, and then annotate the C-arm image so as to show the surgeon the bone which is to be removed.

The surgeon may utilize this tool iteratively during the resection until the pathology (e.g., a condition or disorder, which may cause deviation from the baseline anatomy of the joint) is substantially removed, thereby ensuring that the appropriate bone is resected. In some embodiments, this iterative approach can be repeated with the patient in multiple positions so that the 2D projection of the pathology is visible under a variety of visualization methods (e.g., fluoroscopic visualizations).

In some embodiments, automatic measurement (e.g., measurement of an Alpha Angle or a Center Edge Angle) is performed and a diagram displaying information about the measurement is displayed. In the example of hip procedures involving an Alpha Angle, one advantage of utilizing the Alpha Angle measurement is that it is already commonly used to diagnose patients with cam-type impingement. However, Alpha Angle measurements may have practical limitations. The Alpha Angle describes where the femoral head stops being round, but it does not define how far a resection should go around the head (e.g., further medial or lateral or posterior), nor does it define how far distally down the neck that resection should be smoothed and extended.

Further embodiments address these limitations. For example, in some embodiments, a second line is drawn for the Alpha Angle, with the second line designating the target Alpha Angle (in addition to the currently-measured Alpha Angle). The area outside the femoral head circle and between the currently-measured Alpha Angle line and the target Alpha Angle line describes the initial cam pathology which is to be removed, which is approximately triangular. Furthermore, a smooth transition may be provided between the bone resection and the remaining bone. This process may then be repeated by either re-positioning the patient's leg or moving the C-arm so as to obtain additional projections. It will be appreciated that obtaining a plurality of projections may assist the surgeon to approximate the total 3D resection.

In some embodiments, imaging certain anatomy from certain angles requires an orientation that may cause additional anatomy to be present in an image. For example, imaging a Center Edge Angle requires proper vertical orientation of the pelvis, so additional anatomy may be present in the X-ray image. To address this situation, the system can either utilize the contralateral femoral head to establish the horizontal plane for the Center Edge Angle measurement, or the system can use the pubic synthesis to establish the vertical plane for the Center Edge Angle measurement. In some embodiments, the former approach may be more accurate than the latter approach.

Similar to the Alpha Angle measurement, a simple measurement of the Center Edge Angle has its limitations. More particularly, a simple measurement of the Center Edge Angle does not define how far a resection should go, nor does it describe how the resection should be smoothed and extended. Therefore, in some embodiments, a target line and resection smoothing may be provided. Furthermore, an iterative approach to both resection and orientation are desirable to ensure a precise resection. In some embodiments, a target line and resection smoothing may be provided for resection procedures other than hip procedures.

Measurements and annotations, according to known techniques, are done manually by surgeons or by radiologists. Furthermore, resection measurements and annotations are done pre-operatively according to known techniques—once a surgeon has scrubbed into surgery and the patient is under anesthesia, time is limited and the surgeon is busy manipulating the arthroscope and the resection instruments. According to known techniques, surgeons are not able to take resection measurements and have annotations on the X-ray images in real time during surgery. The systems and methods of the present disclosure make assisted surgery quick, accurate and hands-free.

In some embodiments, there is provided a computer visual guidance system for guiding a surgeon through an arthroscopic debridement of a bony pathology (e.g., a condition or disorder, which may cause deviation from the baseline anatomy of the joint), wherein the computer visual guidance system is configured to: (i) receive a 2D image of the bony pathology from a source; (ii) automatically analyze the 2D image so as to determine at least one measurement with respect to the bony pathology; (iii) automatically annotate the 2D image with at least one annotation relating to the at least one measurement determined with respect to the bony pathology so as to create an annotated 2D image; and (iv) display the annotated 2D image to the surgeon so as to guide the surgeon through the arthroscopic debridement of the bony pathology.

In some embodiments, there is provided a method for guiding a surgeon through an arthroscopic debridement of a bony pathology, wherein the method comprises: providing a computer visual guidance system, wherein the computer visual guidance system is configured to: (i) receive a 2D image of the bony pathology from a source; (ii) automatically analyze the 2D image so as to determine at least one measurement with respect to the bony pathology; (iii) automatically annotate the 2D image with at least one annotation relating to the at least one measurement determined with respect to the bony pathology so as to create an annotated 2D image; and (iv) display the annotated 2D image to the surgeon so as to guide the surgeon through the arthroscopic debridement of the bony pathology; providing a 2D image of the bony pathology to the computer visual guidance system; and displaying the annotated 2D image to the surgeon.

Furthermore, it is desirable to have techniques for automatically determining a resection curve for a patient having an abnormal femoral head, such as an endospherical femoral head or an exospherical femoral head.

Thus, disclosed herein are techniques for automatically determining a modified resection curve based on various characteristics of patient anatomy when it is determined that the patient has an endospherical femoral head. Additionally, disclosed herein are techniques for automatically determining a resection curve modified resection curve based on various characteristics of patient anatomy when it is determined that the patient has an exospherical femoral head.

Furthermore, it is desirable to have techniques for systematically determining an optimal resection curve for a patient. It is desirable to have techniques for determining a resection curve that can minimize human error caused by a surgeon estimating the resection curve. Additionally, it is desirable to have techniques for determining a resection curve that can account for various characteristics of healthy anatomies that share one or more characteristics in common with the patient's anatomy, in order to determine an optimal resection curve for the patient.

Thus, disclosed herein are various embodiments relating to techniques for automatically determining a resection curve for a patient based on a mathematical model built on the basis of data regarding characteristics of healthy or base anatomy (e.g., that of a particular patient or a patient population). The mathematical model may be generated on the basis of images of healthy or normal anatomy (e.g., that of a particular patient or a patient population), and may be configured to accept as input one or more characteristics of the anatomy of the surgical patient. On the basis of the one or more characteristics of the anatomy of the surgical patient (or a patient population), the mathematical model may generate and output a resection curve for the surgical patient.

Furthermore, it is desirable to have efficient, intuitive, and user-friendly graphical user interfaces for guiding physicians in capturing, annotating, categorizing, and storing images from various predefined angles and anatomical positions before, during, and/or after a procedure.

Thus, disclosed herein are example embodiments of graphical user interfaces for guiding a physician using a visual checklist to capture anatomical images in various predefined positions and from various predefined angles. The graphical user interface may display visual guidance at various steps of a checklist, with each step corresponding to an image to be captured of a certain anatomical position from a certain angle. The physician may be able to follow the guidance to capture the image, modify and/or annotate the image, and save the captured image to the designated category corresponding to the step in the checklist. The interface may provide checklist portions for pre-procedure images and/or for post-procedure images, and may in some embodiments provide a comparison mode for viewing corresponding pre- and post-procedure images side by side Furthermore, it is desirable to have efficient, intuitive, and user-friendly graphical user interfaces for displaying preoperative plans intraoperatively. Additionally, there is a need for preoperative plans that allow for improved visualization of anatomies and instrument trajectories by physicians.

Thus, disclosed herein are example embodiments relating to graphical user interfaces for displaying three-dimensional and interactive preoperative plans intraoperatively. In some embodiments, a preoperative plan may be displayed alongside intraoperative images, and a physician can manipulate the preoperative plan during the operation. In some embodiments, the preoperative plan may include three-dimensional images that may be rotated and manipulated by a physician, such as by using touch-commands on a touch-screen display accessible during the operation.

Further example embodiments are described below. In some embodiments, any one or more of the features of any one or more of the embodiments below may be combined with any one or more of the other embodiments, and/or with any features recited elsewhere herein, even if the dependencies of the embodiments do not explicitly indicate that the embodiments and/or features may be combined.

In some embodiments, a computer visual guidance system for guiding a surgeon through an arthroscopic debridement of a bony pathology is provided, wherein the computer visual guidance system is configured to: (i) receive a 2D image of the bony pathology from a source; (ii) automatically analyze the 2D image so as to determine at least one measurement with respect to the bony pathology; (iii) automatically annotate the 2D image with at least one annotation relating to the at least one measurement determined with respect to the bony pathology so as to create an annotated 2D image; and (iv) display the annotated 2D image to the surgeon so as to guide the surgeon through the arthroscopic debridement of the bony pathology.

In some embodiments of the computer visual guidance system, the source of the 2D image comprises an intraoperative X-ray device.

In some embodiments of the computer visual guidance system, the source of the 2D image comprises a preoperative X-ray device.

In some embodiments of the computer visual guidance system, the computer visual guidance system is configured to be used iteratively during the arthroscopic debridement of the bony pathology.

In some embodiments of the computer visual guidance system, the source of the 2D image comprises an intraoperative X-ray device, and further wherein the computer visual guidance system is configured so that when, after Step (iv), the computer visual guidance system receives a new 2D image, Steps (i)-(iv) are automatically repeated using the new 2D image, whereby to create and display a new annotated 2D image.

In some embodiments of the computer visual guidance system, the at least one annotation comprises a first resection line for indicating a proposed debridement of the bony pathology.

In some embodiments of the computer visual guidance system, the at least one annotation comprises a second resection line for indicating a smooth transition between the proposed debridement of the bony pathology and adjacent bone.

In some embodiments of the computer visual guidance system, the computer visual guidance system is configured to allow the surgeon to manually adjust at least one of the at least one annotations so as to create a surgeon-adjusted annotated 2D image.

In some embodiments of the computer visual guidance system, the computer visual guidance system comprises a general purpose computer having input and output functionality.

In some embodiments of the computer visual guidance system, the computer visual guidance system comprises a touchscreen tablet.

In some embodiments of the computer visual guidance system, the touchscreen tablet is located in the sterile field and covered by a sterile drape.

In some embodiments of the computer visual guidance system, the computer visual guidance system is configured to guide the surgeon through an arthroscopic debridement in order to treat cam-type femoroacetabular impingement.

In some embodiments of the computer visual guidance system, the bony pathology comprises a cam pathology, and further wherein the computer visual guidance system is configured to automatically analyze the 2D image so as to determine at least one measurement with respect to the cam pathology and automatically annotate the 2D image with at least one annotation relating to the at least one measurement determined with respect to the cam pathology.

In some embodiments of the computer visual guidance system, the at least one measurement determined with respect to the cam pathology comprises an Alpha Angle measurement, and further wherein annotating the 2D image with at least one annotation relating to the at least one measurement determined with respect to the cam pathology comprises adding an Alpha Angle line to the 2D image.

In some embodiments of the computer visual guidance system, the computer visual guidance system is configured to determine the Alpha Angle measurement by: determining a line which originates at the center of the femoral head and extends through the middle of the femoral neck; determining a second line which originates at the center of the femoral head and passes through the location which signifies the start of the cam pathology; and calculating the angle between the two lines.

In some embodiments of the computer visual guidance system, wherein annotating the 2D image with at least one annotation relating to the at least one measurement determined with respect to the cam pathology comprises inserting a target Alpha Angle line into the 2D image.

In some embodiments of the computer visual guidance system, wherein the at least one annotation comprises a first resection line for indicating a proposed debridement of the cam pathology and a second resection line for indicating a smooth transition between the proposed debridement of the cam pathology and adjacent bone.

In some embodiments of the computer visual guidance system, wherein the first resection line starts at the Alpha Angle line and ends at the target Alpha Angle line, and the second resection line starts at the end of the first resection line and extends down the femoral neck.

In some embodiments of the computer visual guidance system, the at least one annotation comprises: a circle inscribing the femoral head; a centerpoint of the circle inscribing the femoral head; a line originating at the center of the femoral head and extending along the centerline of the femoral neck; an Alpha Angle line originating at the center of the femoral head and passing through the location at the start of the cam pathology; a line showing the target Alpha Angle; and a resection curve.

In some embodiments of the computer visual guidance system, the computer visual guidance system is configured to allow the surgeon to manually adjust at least one of the at least one annotations so as to create a surgeon-adjusted annotated 2D image.

In some embodiments of the computer visual guidance system, the computer visual guidance system comprises a touchscreen tablet, and further wherein the computer visual guidance system is configured to allow the surgeon to manually adjust at least one of the at least one annotations by adjusting the position of at least one of the at least one annotations on the display of the touchscreen tablet.

In some embodiments of the computer visual guidance system, the computer visual guidance system is configured to guide the surgeon through an arthroscopic debridement in order to treat pincer-type femoroacetabular impingement.

In some embodiments of the computer visual guidance system, the bony pathology comprises a pincer pathology, and further wherein the computer visual guidance system is configured to automatically analyze the 2D image so as to determine at least one measurement with respect to the pincer pathology and automatically annotate the 2D image with at least one annotation relating to the at least one measurement determined with respect to the pincer pathology.

In some embodiments of the computer visual guidance system, the at least one measurement determined with respect to the pincer pathology comprises a Center Edge Angle measurement, and further wherein annotating the 2D image with at least one annotation relating to the at least one measurement determined with respect to the pincer pathology comprises inserting a Center Edge Angle line into the 2D image.

In some embodiments of the computer visual guidance system, annotating the 2D image with at least one annotation relating to the at least one measurement determined with respect to the pincer pathology comprises inserting a target Center Edge Angle line into the 2D image.

In some embodiments of the computer visual guidance system, the computer visual guidance system is configured to determine the Center Edge Angle by: determining a vertical line which originates at the center of the femoral head; determining a second line which originates at the center of the femoral head and passes through the location which signifies the start of the pincer pathology; and calculating the angle between the two lines.

In some embodiments, a method for guiding a surgeon through an arthroscopic debridement of a bony pathology is provided, wherein the method comprises: providing a computer visual guidance system, wherein the computer visual guidance system is configured to: (i) receive a 2D image of the bony pathology from a source; (ii) automatically analyze the 2D image so as to determine at least one measurement with respect to the bony pathology; (iii) automatically annotate the 2D image with at least one annotation relating to the at least one measurement determined with respect to the bony pathology so as to create an annotated 2D image; and (iv) display the annotated 2D image to the surgeon so as to guide the surgeon through the arthroscopic debridement of the bony pathology; providing a 2D image of the bony pathology to the computer visual guidance system; and displaying the annotated 2D image to the surgeon.

In some embodiments of the method, the computer visual guidance system is used iteratively during the arthroscopic debridement of the bony pathology.

In some embodiments of the method, the source of the 2D image comprises an intra-operative X-ray device, and further wherein the computer visual guidance system automatically creates a new annotated 2D image upon receiving a new 2D image.

In some embodiments of the method, the bony pathology is moved relative to the intra-operative X-ray device before the computer visual guidance system receives a new 2D image.

In some embodiments of the method, wherein the intra-operative X-ray device is moved before the computer visual guidance system receives a new 2D image.

In some embodiments, a first system for annotating an image of a bony pathology for a surgical procedure on the bony pathology is provided, wherein the system comprises a processor configured to: receive an image of the bony pathology; automatically analyze the image to determine at least one characteristic of the bony pathology, wherein the at least one characteristic comprises whether a femoral head of the bony pathology is endospherical; automatically annotate the image with at least one annotation relating to the at least one characteristic to create an annotated image, wherein: if it is determined that the femoral head is endospherical, a resection curve portion included in the at least one annotation is determined according to a first set of parameters of the bony pathology; and if it is determined that the femoral head is not endospherical, the resection curve portion included in the at least one annotation is determined according to a second set of parameters of the bony pathology.

In some embodiments of the first system for annotating an image of a bony pathology, the system further comprises a display and is the system configured to display the annotated image so as to guide a physician through the surgical procedure on the bony pathology.

In some embodiments of the first system, determining whether the femoral head is endospherical comprises determining whether an edge of the femoral head in the image extends beyond a predetermined threshold distance inside a circle of best fit for the femoral head.

In some embodiments, the first set of parameters comprises an endospherical point of the femoral head, a target point, and a location of the femoral neck.

In some embodiments of the first system, the resection curve portion determined according to the first set of parameters starts at the endospherical point, goes through the target point, and ends on the location of the femoral neck.

In some embodiments of the first system, the second set of parameters comprises a point where bone first deviates from the best-fit circle, a target point, and a location of the femoral neck.

In some embodiments of the first system, the resection curve portion determined according to the second set of parameters starts at the point where the bone first deviates from a circle of best fit, goes through the target point, and ends on the location of the femoral neck.

In some embodiments, a method for annotating an image of a bony pathology for a surgical procedure on the bony pathology includes receiving an image of the bony pathology; automatically analyzing the image to determine at least one characteristic of the bony pathology, wherein the at least one characteristic comprises whether a femoral head of the bony pathology is endospherical;

automatically annotating the image with at least one annotation relating to the at least one characteristic to create an annotated image, wherein: if it is determined that the femoral head is endospherical, a resection curve portion included in the at least one annotation is determined according to a first set of parameters of the bony pathology; and if it is determined that the femoral head is not endospherical, the resection curve portion included in the at least one annotation is determined according to a second set of parameters of the bony pathology.

In some embodiments, the method can further include displaying the annotated image so as to guide a physician through the surgical procedure on the bony pathology.

In some embodiments, determining whether the femoral head is endospherical can include determining whether an edge of the femoral head in the image extends beyond a predetermined threshold distance inside a circle of best fit for the femoral head.

In some embodiments, the first set of parameters can include an endospherical point of the femoral head, a target point, and a location of the femoral neck.

In some embodiments, the resection curve portion determined according to the first set of parameters can start at the endospherical point, go through the target point, and end on the location of the femoral neck.

In some embodiments, the second set of parameters can include a point where bone first deviates from the best-fit circle, a target point, and a location of the femoral neck.

In some embodiments, the resection curve portion determined according to the second set of parameters can start at the point where the bone first deviates from a circle of best fit, go through the target point, and end on the location of the femoral neck.

In some embodiments, a second system for annotating an image of bony pathology of a patient for a surgical procedure on the bony pathology is provided, wherein the system comprises a processor and a display and is configured to: receive data regarding anatomy of subjects other than the patient; based at least in part on the data regarding anatomy of subjects other than the patient, generate and store a mathematical model configured to accept characteristics of anatomy as input and to generate a resection curve as an output; receive an image of the bony pathology of the patient; automatically analyze the image to determine at least one characteristic of the bony pathology of the patient; and based on the at least one characteristic of the bony pathology of the patient, use the mathematical model to generate at least one annotation for the image of the bony pathology of the patient.

In some embodiments of the second system, the system comprises a display and the system is configured to display an annotated image of the bony pathology of the patient, the annotated image comprising the at least one annotation, to guide a physician through arthroscopic debridement of the bony pathology.

In some embodiments of the second system, the at least one annotation comprises a resection curve.

In some embodiments of the second system, generating the resection curve comprises determining one or more of an end point distal on the femoral neck and a control point for forming a spline in at least a portion of the resection curve.

In some embodiments of the second system, generating and storing the mathematical model is based at least in part on femoral head and neck curvatures of the anatomy of the subjects in the plurality of images.

In some embodiments of the second system, the at least one characteristic of the bony pathology of the patient comprises one or more selected from: femoral head radius; femoral neck width; endospherical femoral head shape; exospherical femoral head shape; distance from neck center to target Alpha Angle; and angle formed from (a) a neck width upper point, (b) a head center, and (c) and a neck width lower point.

In some embodiments of the second system, the mathematical model is a regression model.

In some embodiments, a system for guiding a surgeon through a surgical procedure on a bony pathology of a patient is provided, wherein the system comprises a processor, an imaging device, and a touch-sensitive display, and wherein the system is configured to: display, on the display, a preoperative plan comprising an interactive model of an anatomical feature of a patient; capturing, by the imaging device, an image of the anatomical feature of the patient; and displaying the image of the anatomical feature of the patient simultaneously with displaying the preoperative plan.

In some embodiments of the system, the interactive model of an anatomical feature of the patient comprises a rendering of a joint of the patient, and one or more of a heat map on the rendering that illustrates a portion and amount of bone that should be resected, a coordinate system for the surgeon to use as a basis for matching a planned resection area to an operative resection area, alpha angle measurements, and lateral center edge angle measurements.

In some embodiments of the system, the image of the anatomical feature of the patient is an intraoperative image.

In some embodiments of the system, the system is further comprised to: detect a touch input executed by a user on the interactive model of the anatomical feature; and in response to detecting the tough input, adjusting one or more of a zoom level and a viewing angle of the interactive model in accordance with the touch input.

In some embodiments of the system, the interactive model is a three-dimensional model rotatable in three-dimensions.

In some embodiments, a method for annotating an image of a bony pathology of a patient for a surgical procedure on the bony pathology includes receiving data regarding anatomy of subjects other than the patient; based at least in part on the data regarding anatomy of subjects other than the patient, generating and storing a mathematical model configured to accept characteristics of anatomy as input and to generate a resection curve as an output; receiving an image of the bony pathology of the patient; automatically analyzing the image to determine at least one characteristic of the bony pathology of the patient; and based on the at least one characteristic of the bony pathology of the patient, generating at least one annotation for the image of the bony pathology of the patient based on the mathematical model.

In some embodiments, the method can further include displaying an annotated image of the bony pathology of the patient, the annotated image comprising the at least one annotation, to guide a physician through arthroscopic debridement of the bony pathology.

In some embodiments the at least one annotation can include a resection curve.

In some embodiments, generating the resection curve can include determining one or more of an end point distal on the femoral neck and a control point for forming a spline in at least a portion of the resection curve.

In some embodiments, generating and storing the mathematical model can be based at least in part on femoral head and neck curvatures of the anatomy of the subjects in the plurality of images.

In some embodiments, the at least one characteristic of the bony pathology of the patient can include one or more selected from: femoral head radius; femoral neck width; endospherical femoral head shape; exospherical femoral head shape; distance from neck center to target Alpha Angle; and angle formed from (a) a neck width upper point, (b) a head center, and (c) a neck width lower point.

In some embodiments, the mathematical model can be a regression model.

In some embodiments, a computer visual guidance system for guiding a surgeon in categorizing images of a bony pathology of a patient is provided, wherein the computer visual guidance system comprises a processor and a touch-sensitive display and is configured to: display an image viewing window on the display, wherein the image viewing window comprises one or more images of the bony pathology of the patient; simultaneously with displaying the image viewing window, display a checklist comprising a first plurality of user interface objects corresponding respectively to a first set of predefined image categories to be stored with respect to the bony pathology of the patient; display an indication that one of the user interface objects is selected; detect an input from a user indicating an instruction to associate one of the one or more images of the bony pathology of the patient with the selected one of the user interface objects; and in response to detecting the input, categorizing the one of the one or more images of the bony pathology by storing data associating the one of the one or more images with a category of the first set of categories that is associated with the selected one of the user interface objects.

In some embodiments of the computer visual guidance system for guiding a surgeon in categorizing images of a bony pathology of a patient displaying an indication that one of the user interface objects is selected comprises displaying an expanded view of the user interface object.

In some embodiments of the computer visual guidance system for guiding a surgeon in categorizing images of a bony pathology of a patient, displaying an indication that one of the user interface objects is selected comprises displaying visual guidance regarding the predefined image category associated with the one of the selected user interface objects.

In some embodiments of the computer visual guidance system for guiding a surgeon in categorizing images of a bony pathology of a patient, the image viewing window comprises one or more automatically generated annotations overlaid on the one or more images of the bony pathology of the patient.

In some embodiments of the computer visual guidance system for guiding a surgeon in categorizing images of a bony pathology of a patient, the system is further configured to: in response to detecting the input: cease displaying the indication that one of the user interface objects is selected; and display an indication that a next one of the user interface objects is selected.

In some embodiments of the computer visual guidance system for guiding a surgeon in categorizing images of a bony pathology of a patient, the checklist comprises a user interface object associated with a second plurality of user interface objects corresponding respectively to a second set of predefined image categories to be stored with respect to the patient's bony pathology.

In some embodiments of the computer visual guidance system for guiding a surgeon in categorizing images of a bony pathology of a patient: the first set of predefined image categories comprise preoperative image categories; and the second set of predefined image categories comprise postoperative image categories.

In some embodiments of the computer visual guidance system for guiding a surgeon in categorizing images of a bony pathology of a patient, the system is further configured to: display a comparison interface in which two images associated with corresponding preoperative and postoperative image categories are simultaneously displayed.

In some embodiments of the computer visual guidance system for guiding a surgeon in categorizing images of a bony pathology of a patient, the predefined image categories correspond to one or more of respective positions and respective angles for imaging the bony pathology of the patient.

In some embodiments, method for guiding a surgeon in categorizing images of a bony pathology of a patient includes displaying an image viewing window on a display, wherein the image viewing window comprises one or more images of the bony pathology of the patient; simultaneously with displaying the image viewing window, displaying a checklist comprising a first plurality of user interface objects corresponding respectively to a first set of predefined image categories to be stored with respect to the bony pathology of the patient; displaying an indication that one of the user interface objects is selected; detecting an input from a user indicating an instruction to associate one of the one or more images of the bony pathology of the patient with the selected one of the user interface objects; and in response to detecting the input, categorizing the one of the one or more images of the bony pathology by storing data associating the one of the one or more images with a category of the first set of categories that is associated with the selected one of the user interface objects.

In some embodiments, displaying an indication that one of the user interface objects is selected can include displaying an expanded view of the user interface object.

In some embodiments, displaying an indication that one of the user interface objects is selected can include displaying visual guidance regarding the predefined image category associated with the one of the selected user interface objects.

In some embodiments, the image viewing window comprises one or more automatically generated annotations overlaid on the one or more images of the bony pathology of the patient.

In some embodiments, the method further includes, in response to detecting the input: cease displaying the indication that one of the user interface objects is selected; and displaying an indication that a next one of the user interface objects is selected.

In some embodiments, the checklist comprises a user interface object associated with a second plurality of user interface objects corresponding respectively to a second set of predefined image categories to be stored with respect to the patient's bony pathology.

In some embodiments, the first set of predefined image categories comprise preoperative image categories; and the second set of predefined image categories comprise postoperative image categories.

In some embodiments, the method further includes displaying a comparison interface in which two images associated with corresponding preoperative and postoperative image categories are simultaneously displayed.

In some embodiments, the predefined image categories correspond to one or more of respective positions and respective angles for imaging the bony pathology of the patient.

In some embodiments, a system for displaying an interactive touch-sensitive graphical user interface during a surgical procedure on of a bony pathology is provided, wherein the system comprises a processor and a touch-sensitive display, and wherein the system is configured to: display, on the touch-sensitive display, the interactive graphical user interface for guiding the surgeon through the surgical procedure; detect, on the touch-sensitive display, an touch contact; determine whether the touch contact satisfies one or more predefined criteria for detecting liquid on a surface of the touch-sensitive display; if it is determined that the touch contact does not satisfy the one or more predefined criteria for detecting liquid on the surface of the touch-sensitive display, process the touch contact as an input to execute a function of the graphical user interface; if it is determined that the touch contact does satisfy the one or more predefined criteria for detecting liquid on the surface of the touch-sensitive display, do not process the touch contact as an input to execute the function of the graphical user interface.

In some embodiments of the system for displaying an interactive touch-sensitive graphical user interface during an arthroscopic debridement of a bony pathology of a patient, the system is further configured to: if it is determined that the touch contact does satisfy the one or more predefined criteria for detecting liquid on the surface of the touch-sensitive display, disable processing of touch contacts as inputs by the system.

In some embodiments of the system for displaying an interactive touch-sensitive graphical user interface during an arthroscopic debridement of a bony pathology of a patient, the system is further configured to: if it is determined that the touch contact does satisfy the one or more predefined criteria for detecting liquid on the surface of the touch-sensitive display, display an indicator that the touch-sensitive display is wet.

In some embodiments of the system for displaying an interactive touch-sensitive graphical user interface during an arthroscopic debridement of a bony pathology of a patient, the one or more predefined criteria comprise detecting a touch contact on the touch-sensitive display for greater than a predefined period of time.

In some embodiments of the system for displaying an interactive touch-sensitive graphical user interface during an arthroscopic debridement of a bony pathology of a patient, the one or more predefined criteria comprise detecting greater than a predefined number of simultaneous touch contacts on the touch-sensitive display.

In some embodiments of the system for displaying an interactive touch-sensitive graphical user interface during an arthroscopic debridement of a bony pathology of a patient, the one or more predefined criteria comprise one or more of the following: detecting a touch contact on the touch-sensitive display that is greater than a predefined threshold size, and detecting a touch contact on the touch-sensitive display that is smaller than a predefined threshold size.

In some embodiments of the system for displaying an interactive touch-sensitive graphical user interface during an arthroscopic debridement of a bony pathology of a patient, the one or more predefined criteria comprise detecting that greater than a predefined percentage of the surface of the touch-sensitive display is detecting one or more touch contacts.

In some embodiments, a method for displaying an interactive touch-sensitive graphical user interface during a surgical procedure on of a bony pathology includes displaying, on a touch-sensitive display, an interactive graphical user interface for guiding the surgeon through the surgical procedure; detecting, on the touch-sensitive display, an touch contact; determining whether the touch contact satisfies one or more predefined criteria for detecting liquid on a surface of the touch-sensitive display; if it is determined that the touch contact does not satisfy the one or more predefined criteria for detecting liquid on the surface of the touch-sensitive display, processing the touch contact as an input to execute a function of the graphical user interface; if it is determined that the touch contact does satisfy the one or more predefined criteria for detecting liquid on the surface of the touch-sensitive display, not processing the touch contact as an input to execute the function of the graphical user interface.

In some embodiments, the method further includes, if it is determined that the touch contact does satisfy the one or more predefined criteria for detecting liquid on the surface of the touch-sensitive display, disabling processing of touch contacts as inputs by the system.

In some embodiments, the method further includes, if it is determined that the touch contact does satisfy the one or more predefined criteria for detecting liquid on the surface of the touch-sensitive display, displaying an indicator that the touch-sensitive display is wet.

In some embodiments, the one or more predefined criteria comprise detecting a touch contact on the touch-sensitive display for greater than a predefined period of time.

In some embodiments, the one or more predefined criteria comprise detecting greater than a predefined number of simultaneous touch contacts on the touch-sensitive display.

In some embodiments, the one or more predefined criteria comprise one or more of the following: detecting a touch contact on the touch-sensitive display that is greater than a predefined threshold size, and detecting a touch contact on the touch-sensitive display that is smaller than a predefined threshold size.

In some embodiments, the one or more predefined criteria comprise detecting that greater than a predefined percentage of the surface of the touch-sensitive display is detecting one or more touch contacts.

In some embodiments, a computer visual guidance system for guiding a surgeon through a surgical procedure on a bony pathology comprises one or more processors configured to: receive an image of the bony pathology; automatically analyze the image to determine a plurality of characteristics associated with the bony pathology; detect one or more edges associated with a tool in the image of the bony pathology; automatically determine that the one or more edges associated with the tool are adversely affecting the determination of at least one characteristic of the plurality of characteristics; and in response to determining that the one or more edges associated with the tool are adversely affecting the determination of the at least one characteristic, displaying a graphical object in a location corresponding to the tool in the image to indicate to a user that the tool is interfering with the determination of the at least one characteristic.

In some embodiments, the at least one characteristic can include an edge of a bone.

In some embodiments, the tool can extend over the edge of the bone in the image.

In some embodiments, a method for guiding a surgeon through a surgical procedure on a bony pathology comprises receiving an image of the bony pathology; automatically analyzing the image to determine a plurality of characteristics associated with the bony pathology; detecting one or more edges associated with a tool in the image of the bony pathology; automatically determining that the one or more edges associated with the tool are adversely affecting the determination of at least one characteristic of the plurality of characteristics; and in response to determining that the one or more edges associated with the tool are adversely affecting the determination of the at least one characteristic, displaying a graphical object in a location corresponding to the tool in the image to indicate to a user that the tool is interfering with the determination of the at least one characteristic.

In some embodiments, the at least one characteristic can include an edge of a bone.

In some embodiments, the tool can extend over the edge of the bone in the image.

BRIEF DESCRIPTION OF THE DRAWINGS

Features will become apparent to those of ordinary skill in the art by describing in detail exemplary embodiments with reference to the attached drawings in which.

DETAILED DESCRIPTION

Reference will now be made in detail to implementations and embodiments of various aspects and variations of the invention, examples of which are illustrated in the accompanying drawings. Various devices, systems, and methods are described herein. Although at least two variations of the devices, systems, and methods are described, other variations may include aspects of the devices, systems, and methods described herein combined in any suitable manner having combinations of all or some of the aspects described. Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In some embodiments, a method and a system for treating a joint is provided.

In some embodiments, there is provided a method and a system for guiding the surgeon during an arthroscopic debridement procedure to treat cam-type femoroacetabular impingement.

In some embodiments, there is provided a method and a system for guiding the surgeon during an arthroscopic debridement procedure to treat pincer-type femoroacetabular impingement.

In some embodiments, there are provided techniques for automatically determining a modified resection curve based on various characteristics of patient anatomy when it is determined that the patient has an endospherical or exospherical femoral head.

In some embodiments, there are provided techniques for automatically determining a resection curve for a patient based on a mathematical model built on the basis of data regarding characteristics of healthy anatomy.

In some embodiments, there are provided graphical user interfaces for guiding a physician using a visual checklist to capture anatomical images in various predefined positions and from various predefined angles.

In some embodiments, there are provided graphical user interfaces for displaying three-dimensional and interactive preoperative plans intraoperatively.

A better understanding of various joint pathologies, and also the conventional limitations associated with their treatment, can be gained from a more precise understanding of the anatomy of the joint.

Anatomy of an Exemplary Joint: The Hip Joint

Figure 1A:
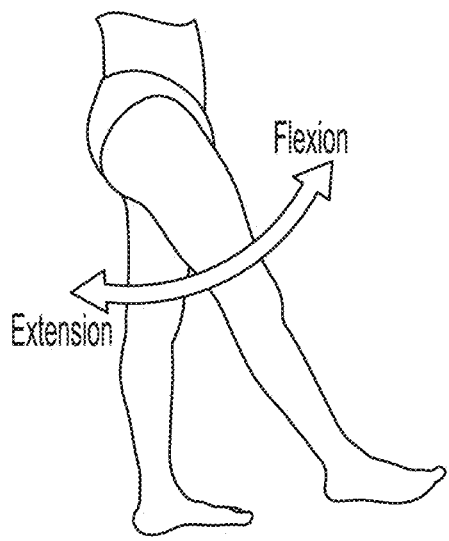
FIGS. 1A-1D are schematic views showing various aspects of, for example, hip motion.
Figure 1B:
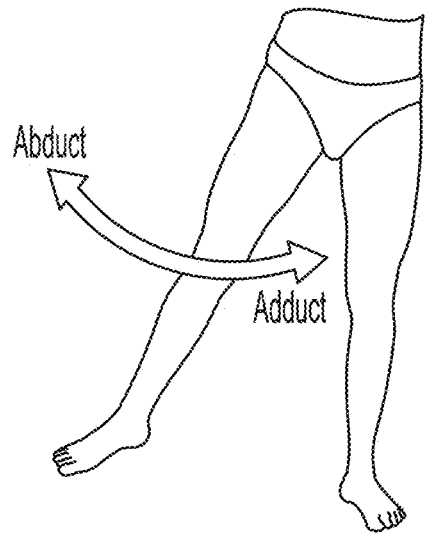
Figure 1C:
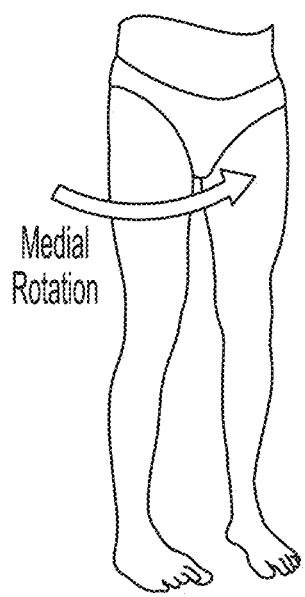
Figure 1D:
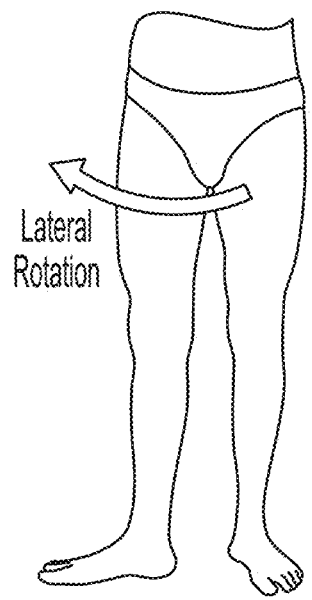
Figure 2:
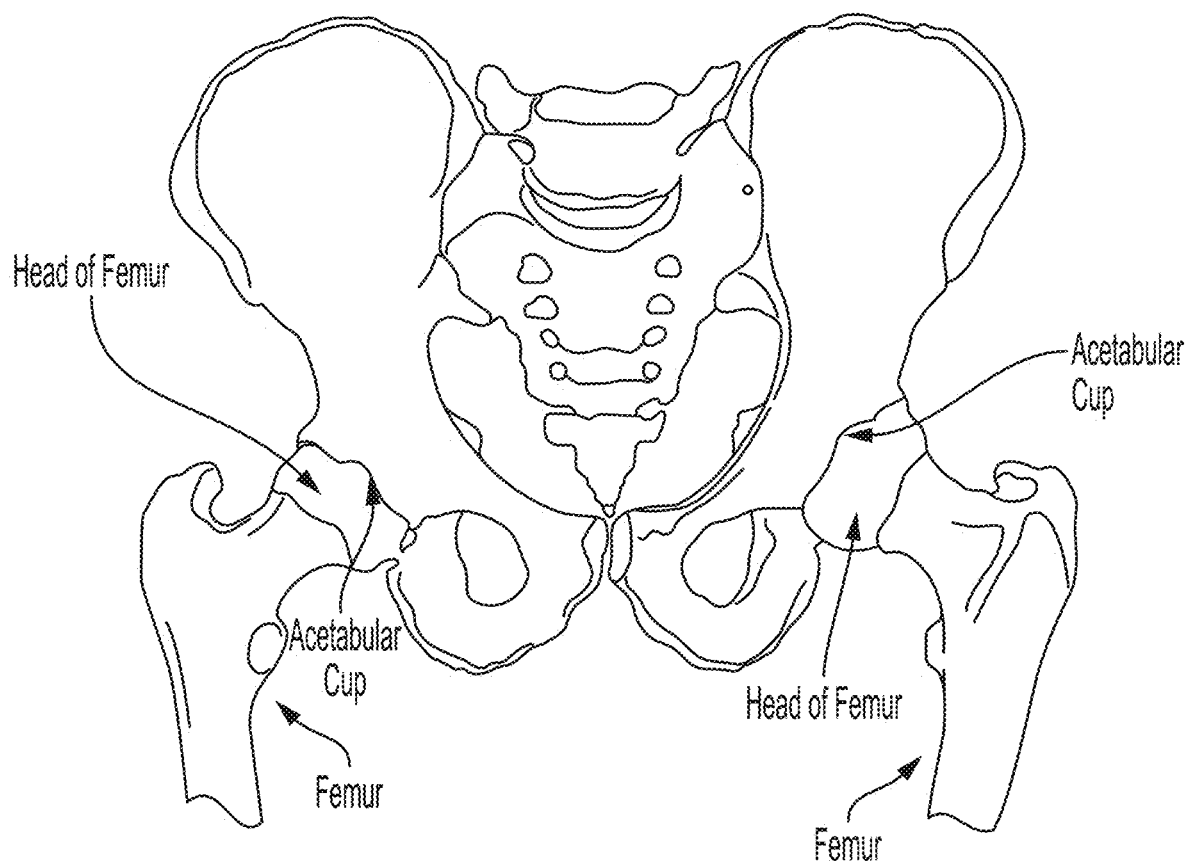
FIG. 2 is a schematic view showing bone structures in the region of the hip joint.

The hip joint is formed at the junction of the femur and the hip. More particularly, and with reference to FIG. 2, the ball of the femur is received in the acetabular cup of the hip, with a plurality of ligaments and other soft tissue serving to hold the bones in articulating condition.

Figure 3:
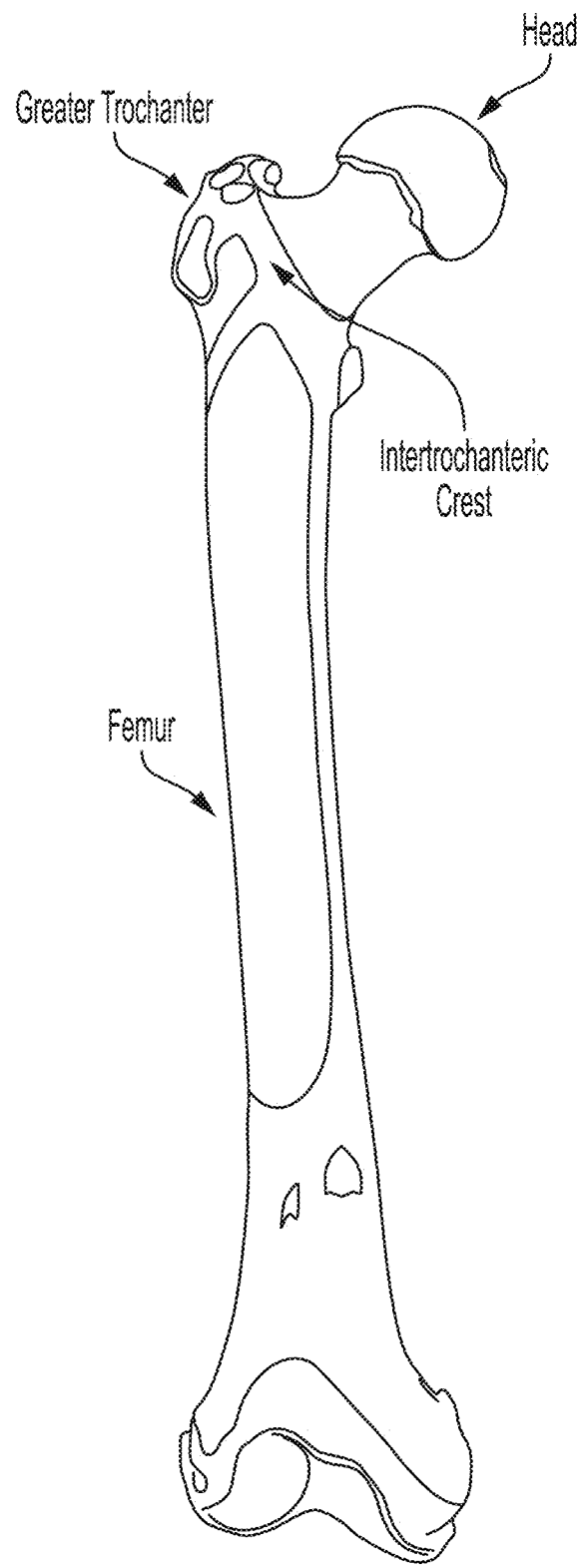
FIG. 3 is a schematic anterior view of the femur.
Figure 4:
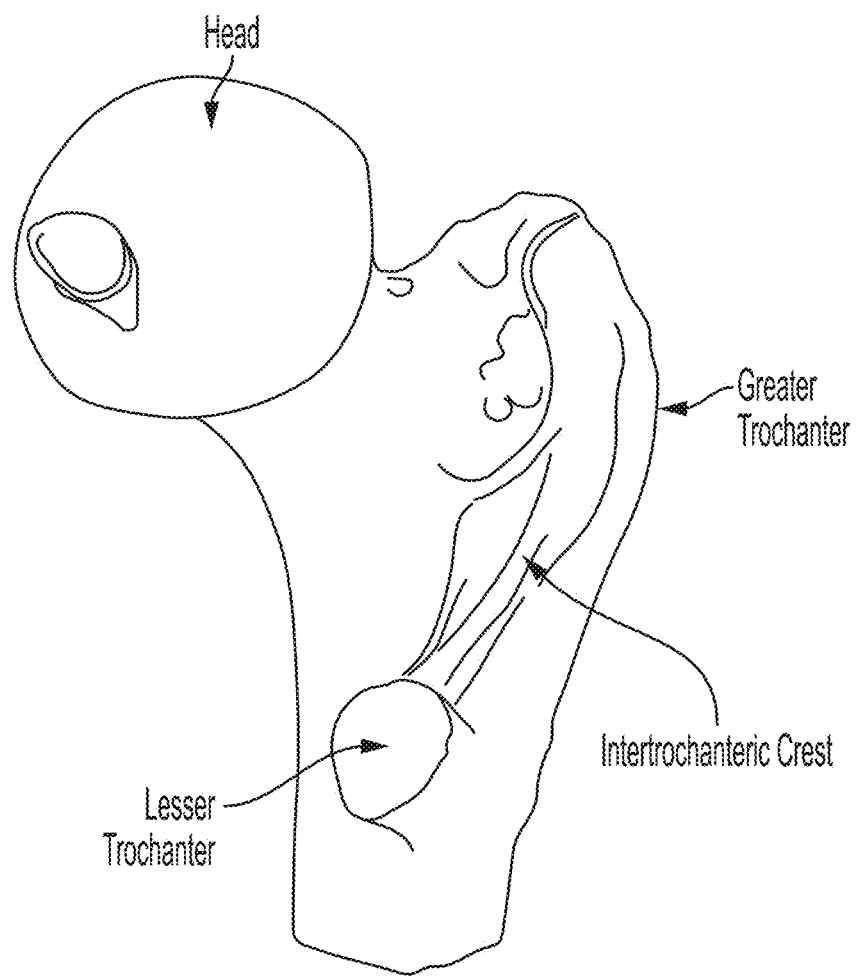
FIG. 4 is a schematic posterior view of the top end of the femur.

As is illustrated in FIG. 3, the femur is generally characterized by an elongated body terminating, at its top end, in an angled neck which supports a hemispherical head (also sometimes referred to as the ball). As is illustrated in FIGS. 3 and 4, a large projection known as the greater trochanter protrudes laterally and posteriorly from the elongated body adjacent to the neck. A second, somewhat smaller projection known as the lesser trochanter protrudes medially and posteriorly from the elongated body adjacent to the neck. An intertrochanteric crest extends along the periphery of the femur, between the greater trochanter and the lesser trochanter.

Figure 5:
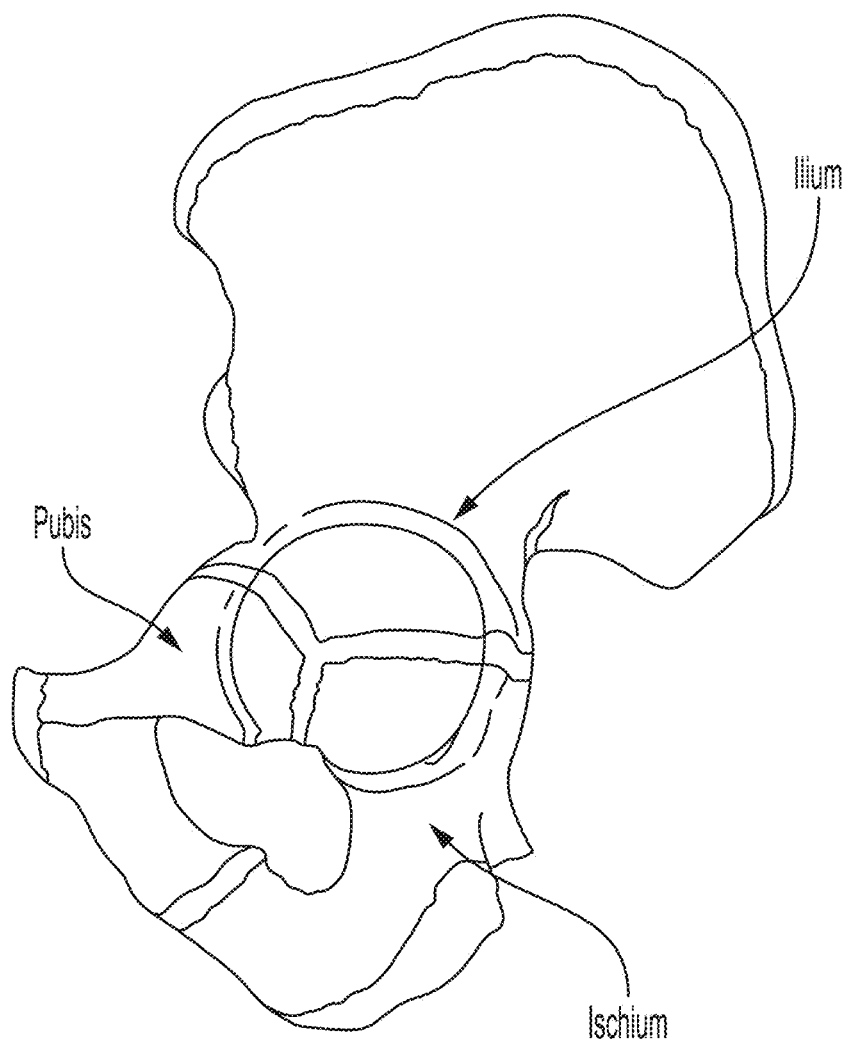
FIG. 5 is a schematic view of the pelvis.

Referring to FIG. 5, the hip is made up of three constituent bones: the ilium, the ischium and the pubis. These three bones cooperate with one another (they typically ossify into a single "hip bone" structure by the age of 25) so as to form the acetabular cup. The acetabular cup receives the head of the femur.

Figure 6:
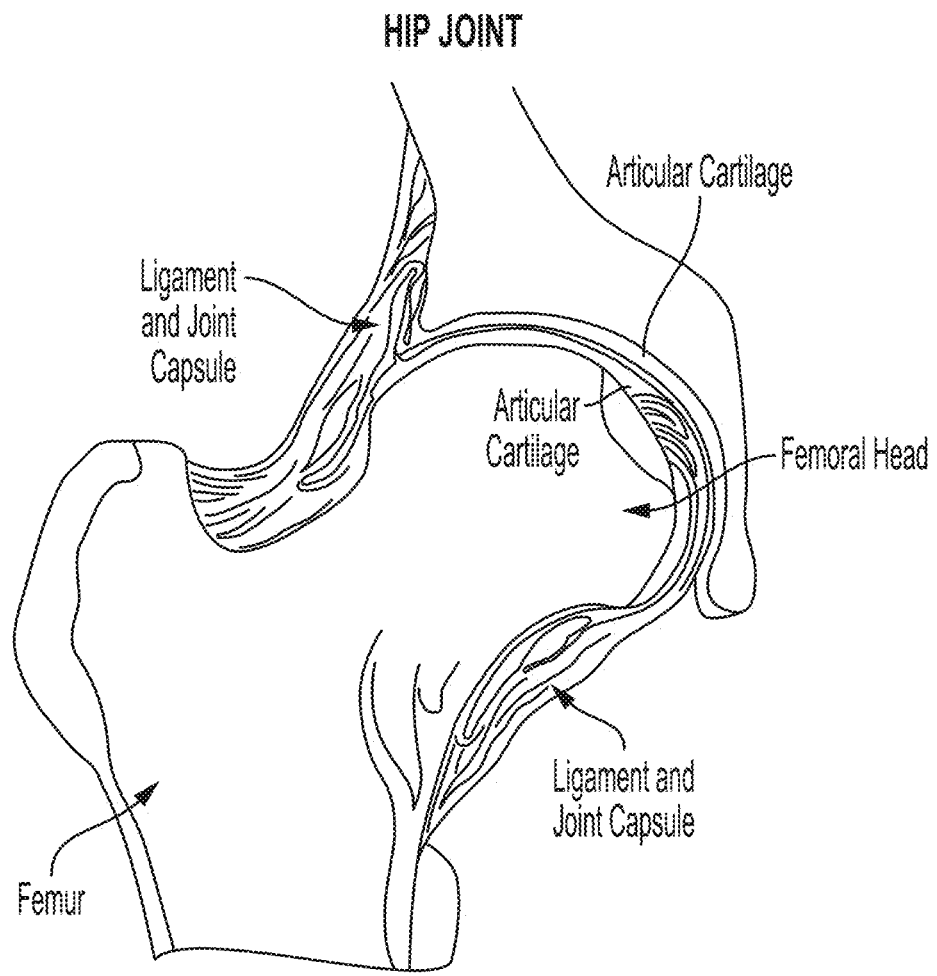
FIGS. 6-12 are schematic views showing bone and soft tissue structures in the region of the hip joint.

Both the head of the femur and the acetabular cup are covered with a layer of articular cartilage which protects the underlying bone and facilitates motion (see FIG. 6).

Figure 7:
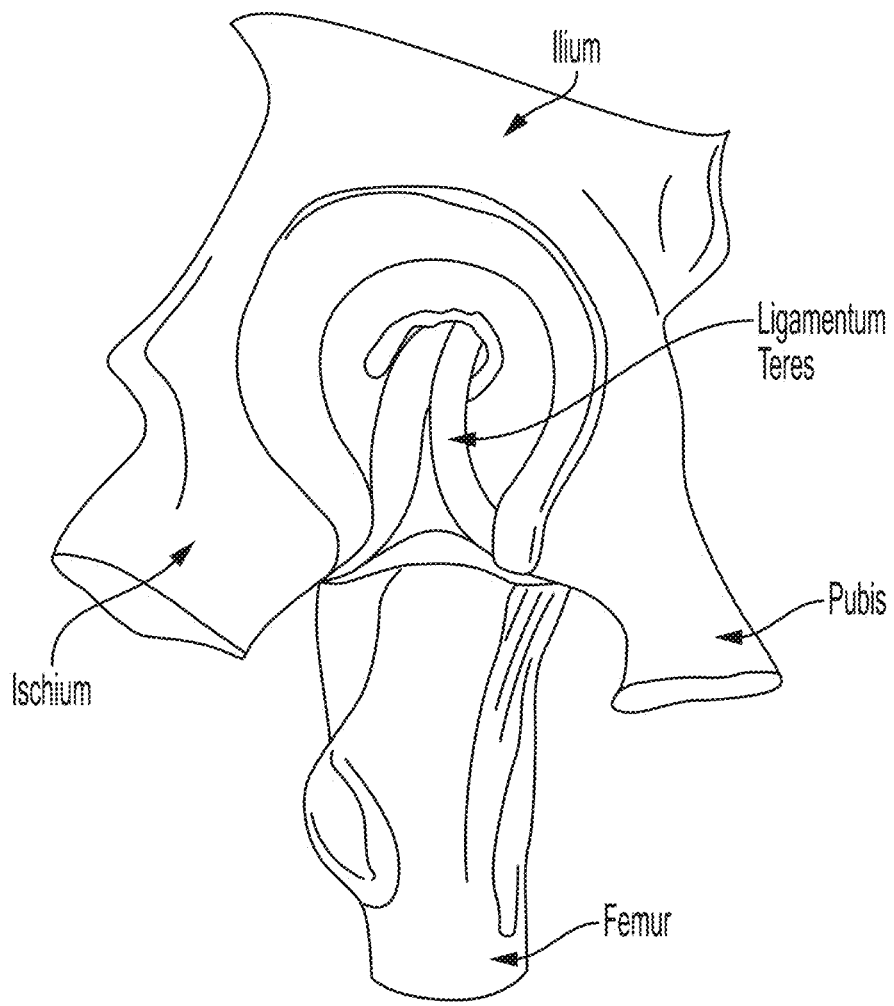
Figure 8:
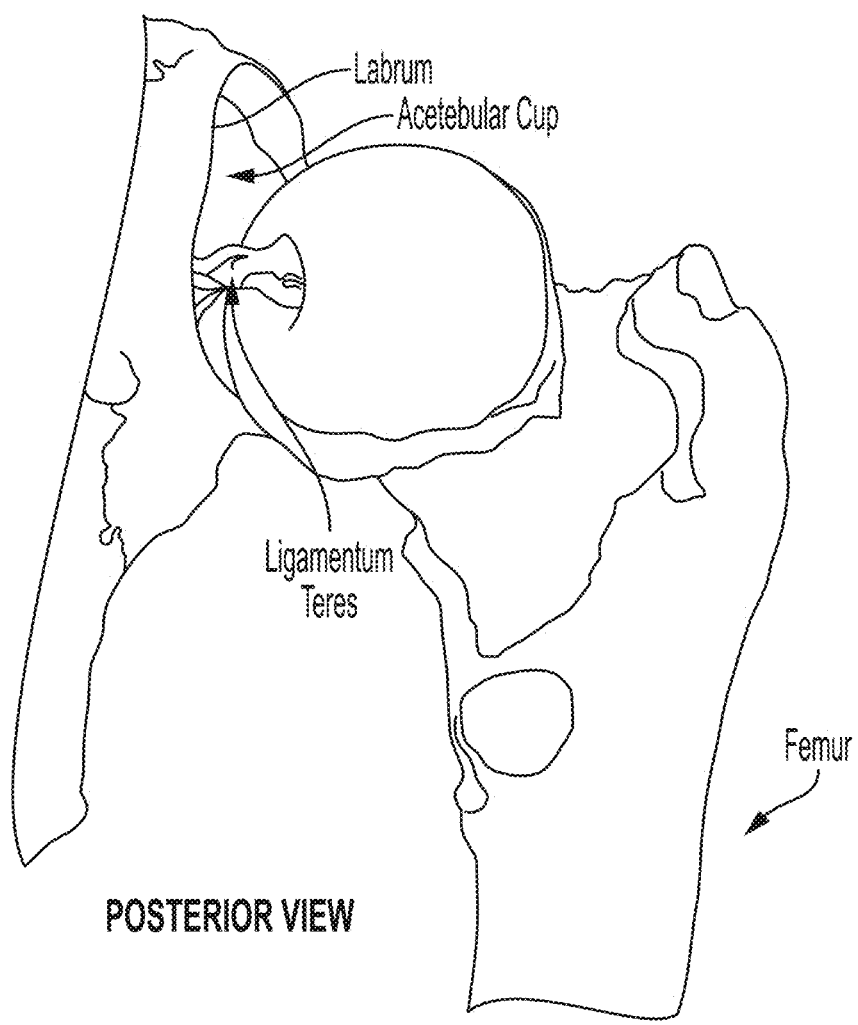
Figure 9:
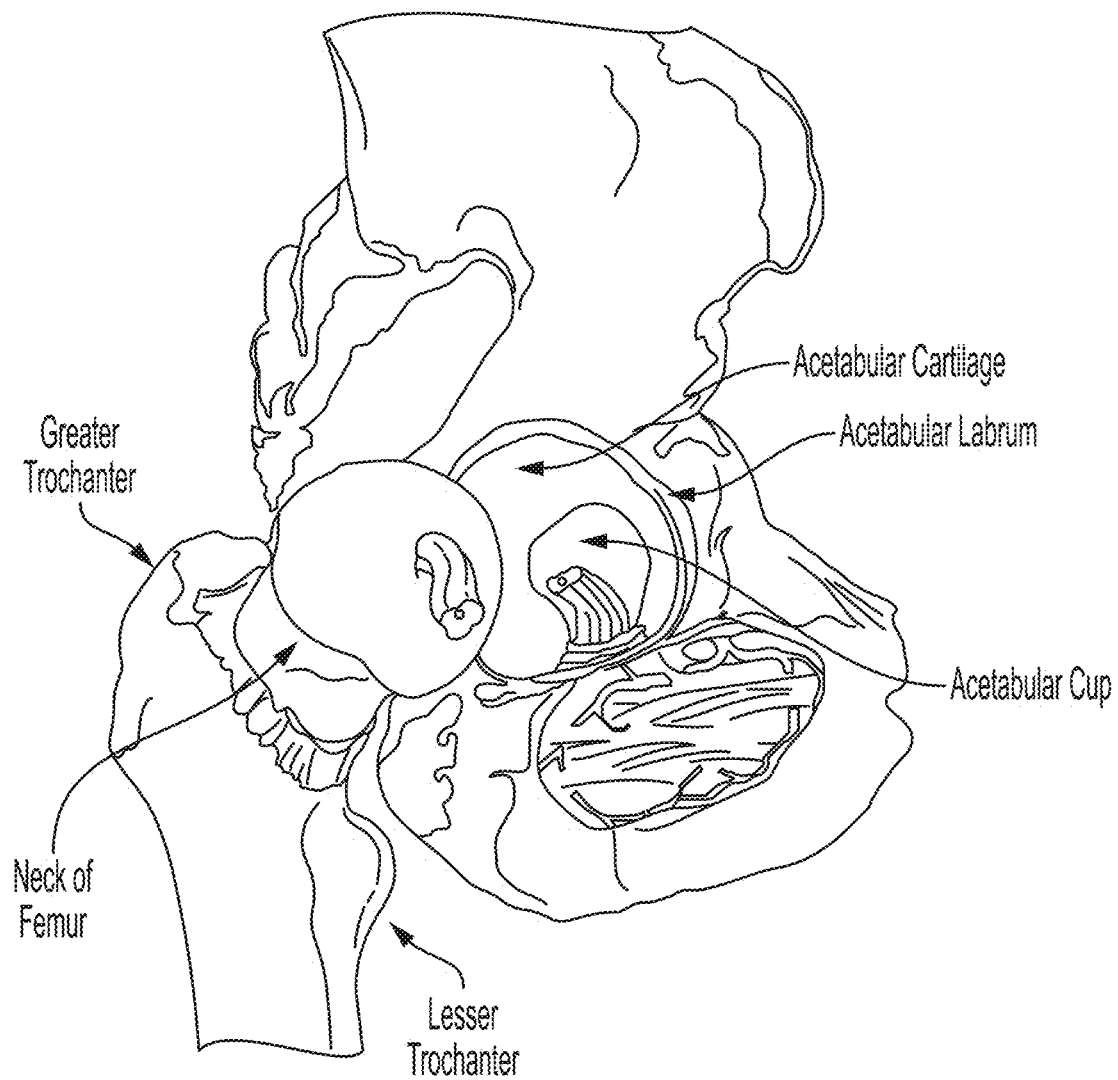
Figure 10:
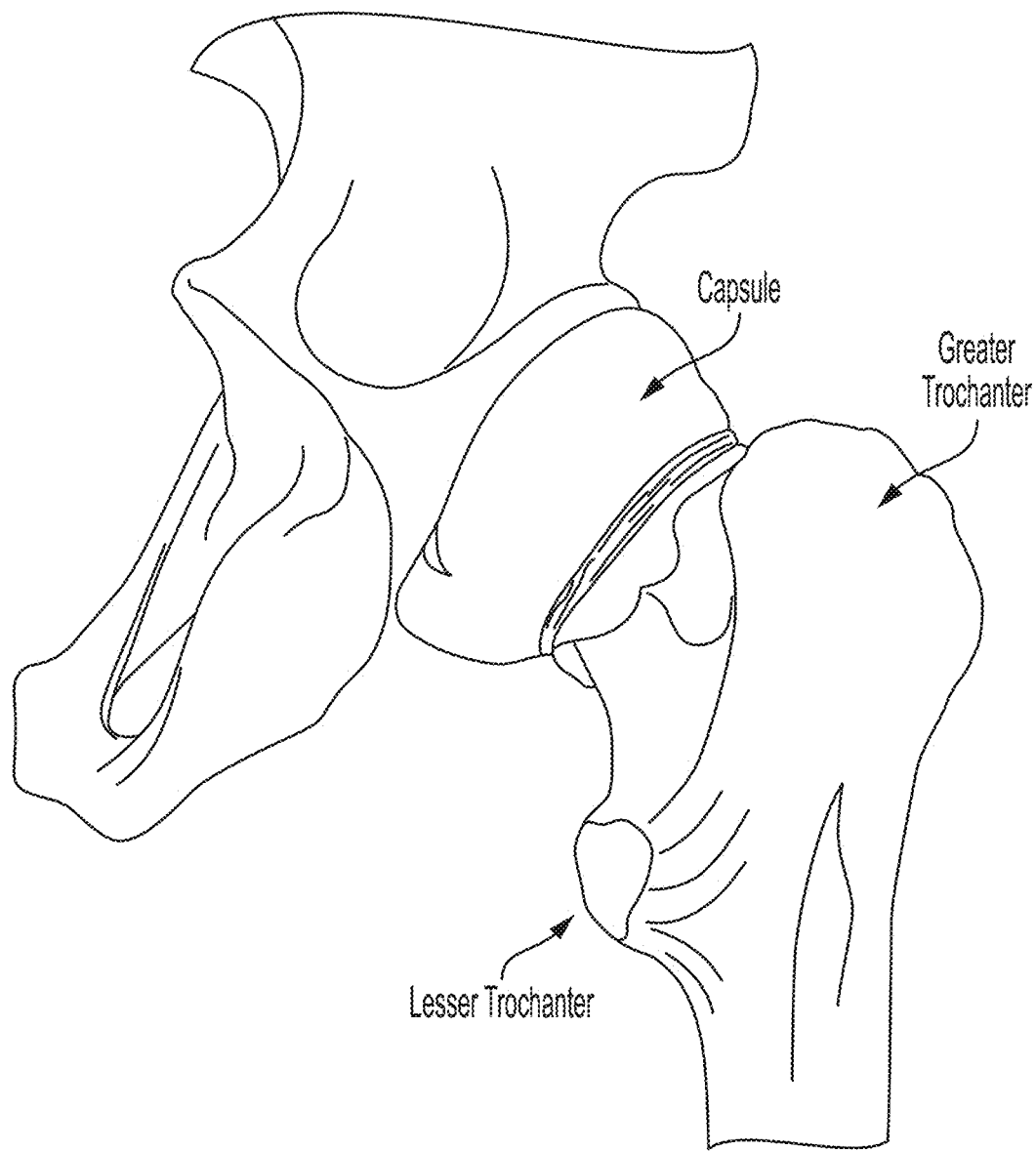
Figure 11:
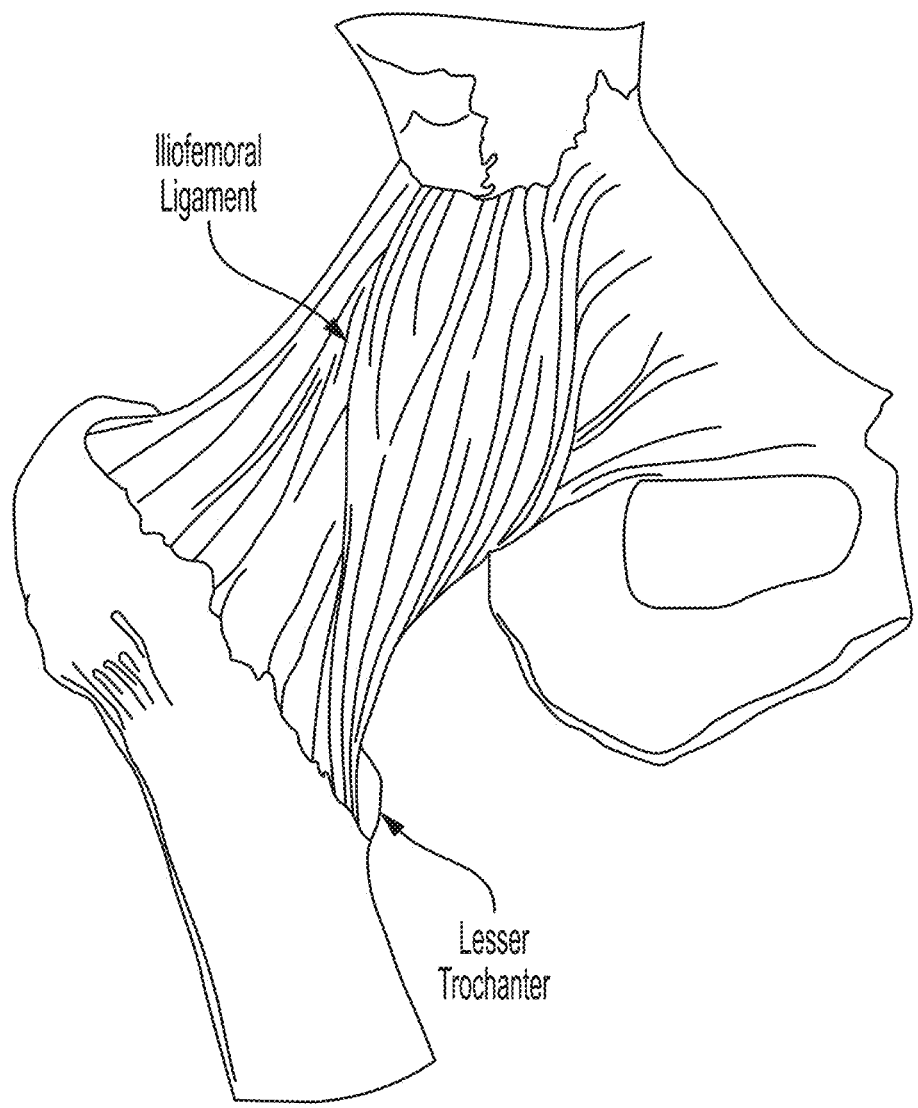
Figure 12:
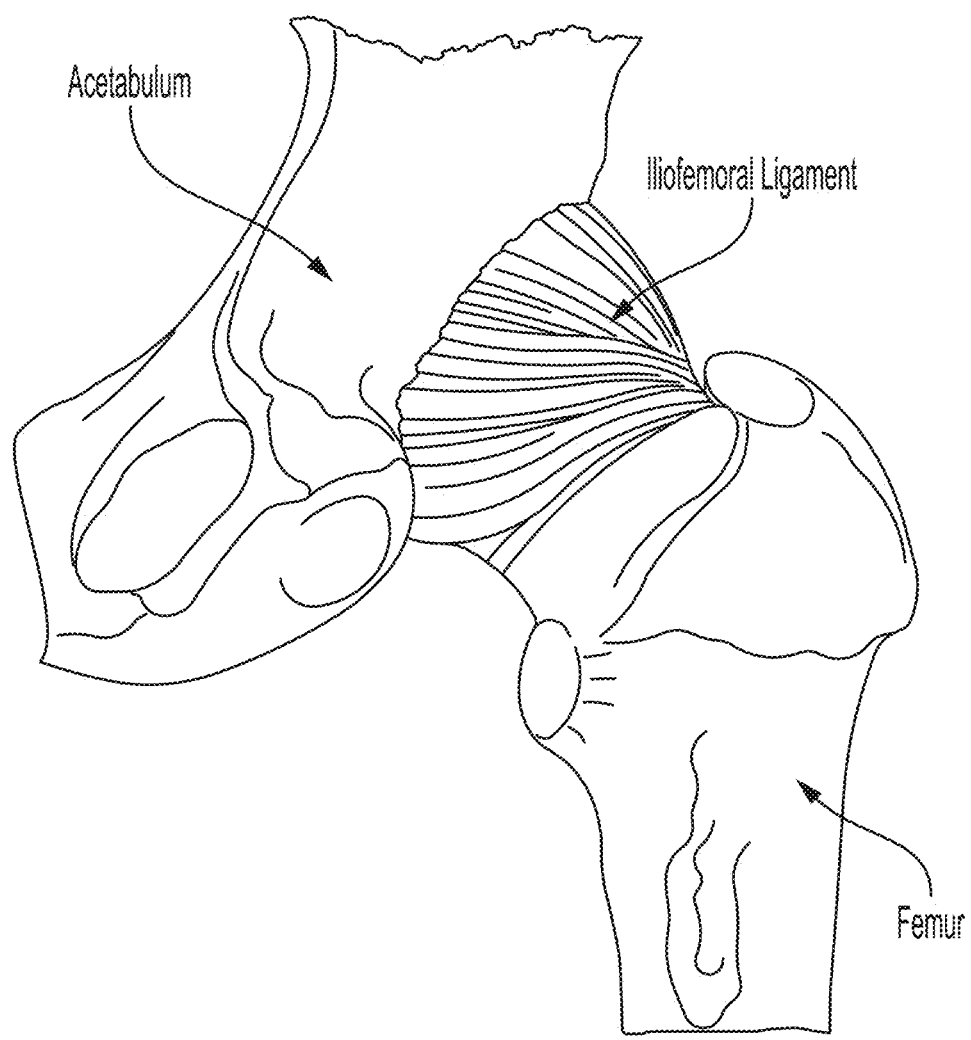

Various ligaments and soft tissue serve to hold the ball of the femur in place within the acetabular cup. More particularly, and with reference to FIGS. 7 and 8, the ligamentum teres extends between the ball of the femur and the base of the acetabular cup. Referring to FIG. 9, a labrum is disposed about the perimeter of the acetabular cup. The labrum serves to increase the depth of the acetabular cup and effectively establishes a suction seal between the ball of the femur and the rim of the acetabular cup, thereby helping to hold the head of the femur in the acetabular cup. In addition, and with reference to FIG. 10, a fibrous capsule extends between the neck of the femur and the rim of the acetabular cup, effectively sealing off the ball-and-socket members of the hip joint from the remainder of the body. The foregoing structures are encompassed and reinforced by a set of three main ligaments (i.e., the iliofemoral ligament, the ischiofemoral ligament and the pubofemoral ligament) which extend between the femur and the hip (see FIGS. 11 and 12).

Examples of Pathologies (e.g., Deviations from the Baseline Anatomy of the Joint) of the Hip Joint The hip joint is susceptible to a number of different pathologies. These pathologies can have, for example, both congenital and injury-related origins.

Figure 13A:
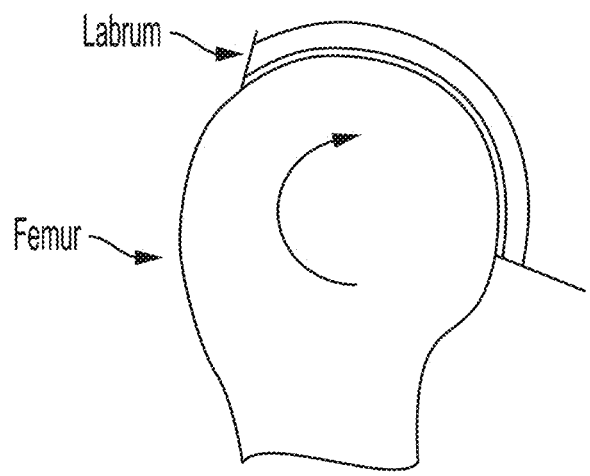
FIGS. 13A and 13B is a schematic view showing cam-type femoroacetabular impingement (i.e., cam-type FAI)
Figure 13B:
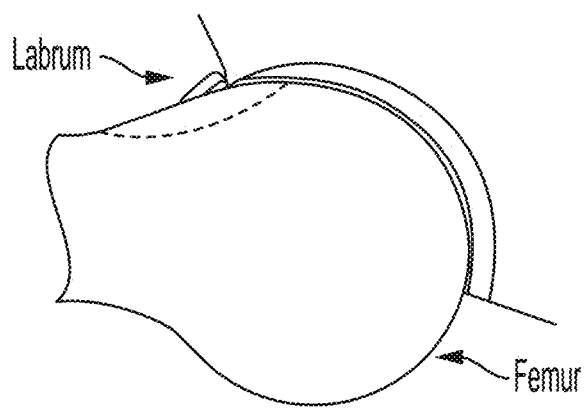
Figure 14A:
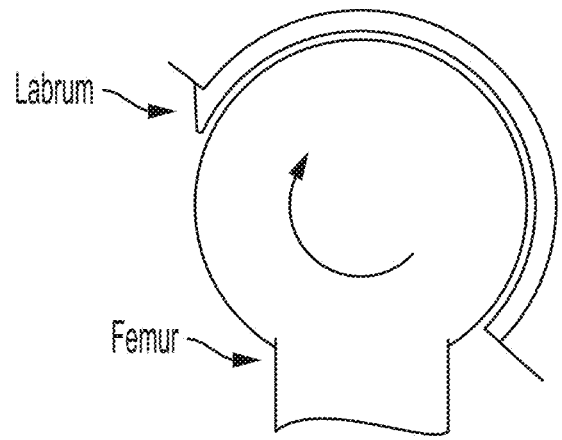
FIGS. 14A and 14B is a schematic view showing pincer-type femoroacetabular impingement (i.e., pincer-type FAI)
Figure 14B:
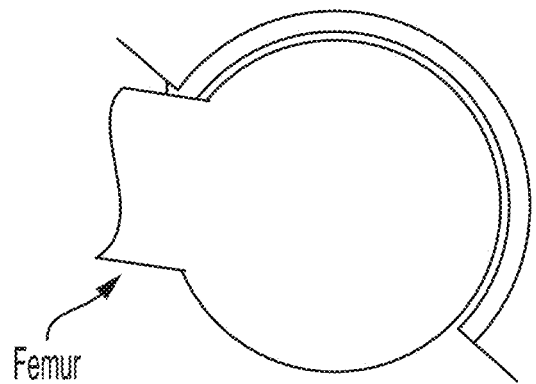

For example, a congenital pathology of the hip joint involves impingement between the neck of the femur and the rim of the acetabular cup. In some cases, and with reference to FIGS. 13A and 13B, this impingement can occur due to irregularities in the geometry of the femur. This type of impingement is sometimes referred to as a cam-type femoroacetabular impingement (i.e., a cam-type FAI). In other cases, and with reference to FIGS. 14A and 14B, the impingement can occur due to irregularities in the geometry of the acetabular cup. This latter type of impingement is sometimes referred to as a pincer-type femoroacetabular impingement (i.e., a pincer-type FAI). Impingement can result in a reduced range of motion, substantial pain and, in some cases, significant deterioration of the hip joint.

Another example of congenital pathology of the hip joint involves defects in the articular surface of the ball and/or the articular surface of the acetabular cup. Defects of this type sometimes start out fairly small but often increase in size over time, generally due to the dynamic nature of the hip joint and also due to the weight-bearing nature of the hip joint. Articular defects can result in substantial pain, induce or exacerbate arthritic conditions and, in some cases, cause significant deterioration of the hip joint.

Figure 15:
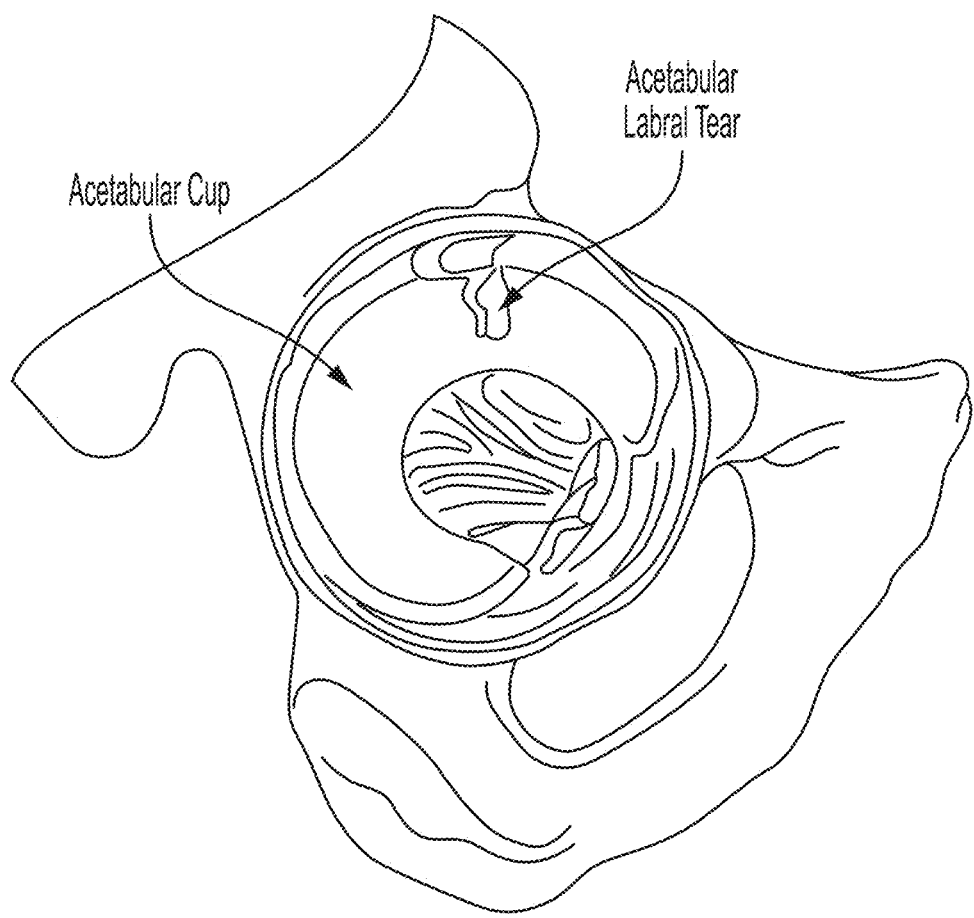
FIG. 15 is a schematic view showing a labral tear.

An example of injury-related pathology of the hip joint involves trauma to the labrum. In many cases, an accident or a sports-related injury can result in the labrum being torn, typically with a tear running through the body of the labrum (e.g., see FIG. 15). These types of injuries can be painful for the patient and, if left untreated, can lead to substantial deterioration of the hip joint.

Examples of Medical Approaches in Treating Joint Pathologies Using Minimally-Invasive and Early Interventions The current trend in orthopedic surgery is to treat joint pathologies using minimally-invasive techniques. For example, it is common to re-attach ligaments in the shoulder joint using minimally-invasive, "keyhole" techniques which do not require "laying open" the capsule of the shoulder joint. Furthermore, it is common to repair, for example, torn meniscal cartilage in the knee joint, and/or to replace ruptured ACL ligaments in the knee joint, using minimally-invasive techniques. While such minimally-invasive approaches can require additional training on the part of the surgeon, such procedures generally offer substantial advantages for the patient and have now become the standard of care for many shoulder joint and knee joint pathologies.

In addition to the foregoing, due to the widespread availability of minimally-invasive approaches for treating pathologies of the shoulder joint and knee joint, the current trend is to provide such treatment much earlier in the lifecycle of the pathology, so as to address patient pain as soon as possible and so as to minimize any exacerbation of the pathology itself. This is in marked contrast to traditional surgical practices, which have generally dictated postponing surgical procedures as long as possible so as to spare the patient from the substantial trauma generally associated with invasive surgery.

Examples of Treatment for Pathologies of the Hip Joint

Minimally-invasive treatments for pathologies of the hip joint have lagged behind minimally-invasive treatments for pathologies of the shoulder joint and knee joint. This may be, for example, due to (i) the geometry of the hip joint itself, and (ii) the nature of the pathologies which must typically be addressed in the hip joint.

The hip joint is generally considered to be a "tight" joint, in the sense that there is relatively little room to maneuver within the confines of the joint itself. This is in contrast to the knee joint, which is generally considered to be relatively spacious when compared to the hip joint. As a result, it is relatively more challenging for surgeons to perform minimally-invasive procedures on the hip joint.

Furthermore, the natural pathways for entering the interior of the hip joint (i.e., the pathways which naturally exist between adjacent bones) are generally much more constraining for the hip joint than for the shoulder joint or the knee joint. This limited access further complicates effectively performing minimally-invasive procedures on the hip joint.

In addition to the foregoing, the nature and location of the pathologies (e.g., conditions or disorders, which may cause deviation from the baseline anatomy of the joint) of the hip joint also complicate performing minimally-invasive procedures. For example, in the case of a typical tear of the labrum in the hip joint, instruments must generally be introduced into the joint space using a line of approach which is set, in some locations, at an angle of 25 degrees or more to the line of repair. This makes drilling into bone, for example, much more complex than where the line of approach is effectively aligned with the line of repair, such as is frequently the case in the shoulder joint. Furthermore, the working space within the hip joint is typically extremely limited, further complicating repairs where the line of approach is not aligned with the line of repair.

As a result of the foregoing, minimally-invasive hip joint procedures continue to be relatively difficult, and patients must frequently manage their hip joint pathologies for as long as possible, until a partial or total hip replacement can no longer be avoided, whereupon the procedure is generally done as a highly-invasive, open procedure, with all of the disadvantages associated with highly-invasive, open procedures.

Accordingly, it is desirable to have improved methods and systems for repairing joints in general, including the hip joint.

Example: Issues Relating to the Treatment of Cam-Type Femoroacetabular Impingement As noted above, hip arthroscopy is becoming increasingly more common in the diagnosis and treatment of various hip pathologies. However, due to the anatomy of the hip joint and the pathologies associated with the same, hip arthroscopy appears to be currently practical for only selected pathologies and, even then, hip arthroscopy has generally met with limited success.

One procedure which is sometimes attempted arthroscopically relates to femoral debridement for treatment of cam-type femoroacetabular impingement (i.e., cam-type FAI). More particularly, with cam-type femoroacetabular impingement, irregularities in the geometry of the femur can lead to impingement between the femur and the rim of the acetabular cup. Treatment for cam-type femoroacetabular impingement typically involves debriding the femoral neck and/or head, using instruments such as burrs and osteotomes, to remove the bony deformities causing the impingement. It is important to debride the femur carefully, since only bone which does not conform to the desired geometry should be removed, in order to ensure positive results as well as to minimize the possibility of bone fracture after treatment.

For this reason, when debridement is performed as an open surgical procedure, surgeons generally use debridement templates having a pre-shaped curvature to guide them in removing the appropriate amount of bone from the femur.

However, when the debridement procedure is attempted arthroscopically, conventional debridement templates with their pre-shaped curvature cannot be passed through the narrow keyhole incisions, and hence debridement templates are generally not available to guide the surgeon in reshaping the bone surface. As a result, the debridement must generally be effected "freehand." In addition to the foregoing, the view of the cam pathology is also generally limited. Primarily, the surgeon uses a scope and camera to view the resection area, but the scope image has a limited field of view and is somewhat distorted. Also, because the scope is placed close to the bone surface, the surgeon cannot view the entire pathology "all at once." Secondarily, the surgeon also utilizes a fluoroscope to take X-ray images of the anatomy. These X-ray images supplement the arthroscopic view from the scope, but it is still limited to a 2D representation of the 3D cam pathology.

As a result of the foregoing, it is generally quite difficult for the surgeon to determine exactly how much bone should be removed, and whether the shape of the remaining bone has the desired geometry. In practice, surgeons tend to err on the side of caution and remove less bone. Significantly, under-resection of the cam pathology is the leading cause of revision hip arthroscopy.

Accordingly, to the various embodiments disclosed herein provide methods and systems for guiding the surgeon during an arthroscopic debridement procedure to treat cam-type femoroacetabular impingement.

Example: Issues Relating to the Treatment of Pincer-Type Femoroacetabular Impingement An example of another procedure which is sometimes attempted arthroscopically relates to treatment of pincer-type femoroacetabular impingement (i.e., pincer-type FAI). More particularly, with pincer-type femoroacetabular impingement, irregularities in the geometry of the acetabulum can lead to impingement between the femur and the rim of the acetabular cup. Treatment for pincer-type femoroacetabular impingement typically involves debriding the rim of the acetabular cup using instruments such as burrs and osteotomes to remove the bony deformities causing the impingement. In some cases, the labrum is released from the acetabular bone so as to expose the underlying rim of the acetabular cup prior to debriding the rim of the acetabular cup, and then the labrum is reattached to the debrided rim of the acetabular cup. It is important to debride the rim of the acetabular cup carefully, since only bone which does not conform to the desired geometry should be removed, in order to alleviate impingement while minimizing the possibility of removing too much bone from the rim of the acetabular cup, which could cause joint instability.

However, when the debridement procedure is attempted arthroscopically, the debridement must generally be effected freehand. In this setting, it is generally quite difficult for the surgeon to determine exactly how much bone should be removed, and whether the remaining bone has the desired geometry. In practice, surgeons tend to err on the side of caution and remove less bone. Significantly, under-resection of the pincer pathology may necessitate revision hip arthroscopy.

Accordingly, various embodiments described herein provide methods and systems for guiding the surgeon during an arthroscopic debridement procedure to treat pincer-type femoroacetabular impingement.

Example: Alpha Angle and Center Edge Angle Measurements

Two common anatomical measurements used in diagnosing femoroacetabular impingement (FAI) are the Alpha Angle (FIG. 16) for cam-type impingement and the Center Edge Angle (FIG. 17) for pincer-type impingement. These measurements are typically measured from pre-operative images (e.g., pre-operative X-ray images). These measurements are used to determine the degree to which the patient's hip anatomy deviates from normal (e.g., baseline), healthy hip anatomy.

For example, a healthy hip typically has an Alpha Angle of anywhere from less than approximately 42 degrees to approximately 50 degrees; thus, a patient with an Alpha Angle of greater than approximately 42 degrees to approximately 50 degrees may be a candidate for FAI surgery. During an initial examination of a patient, the surgeon will typically take an X-ray of the patient's hip. If the patient has an initial diagnosis of FAI, the patient may also obtain an MRI or CT scan of their hip for further evaluation of the bony pathology causing the FAI.

Most of today's imaging techniques (e.g., X-ray, CT, MRI) are digital, and hence the images can be imported into, and manipulated by, computer software. Using the imported digital images, the surgeon is able to measure the Alpha Angle (and/or the Center Edge Angle). For example, the surgeon imports the digital image into one of the many available software programs that use the DICOM (Digital Imaging and Communications in Medicine) standard for medical imaging. In order to make the Alpha Angle (or the Center Edge Angle) measurements with the digital image, the surgeon must first manually create and overlay geometric shapes onto the digital medical image.

Figure 16:
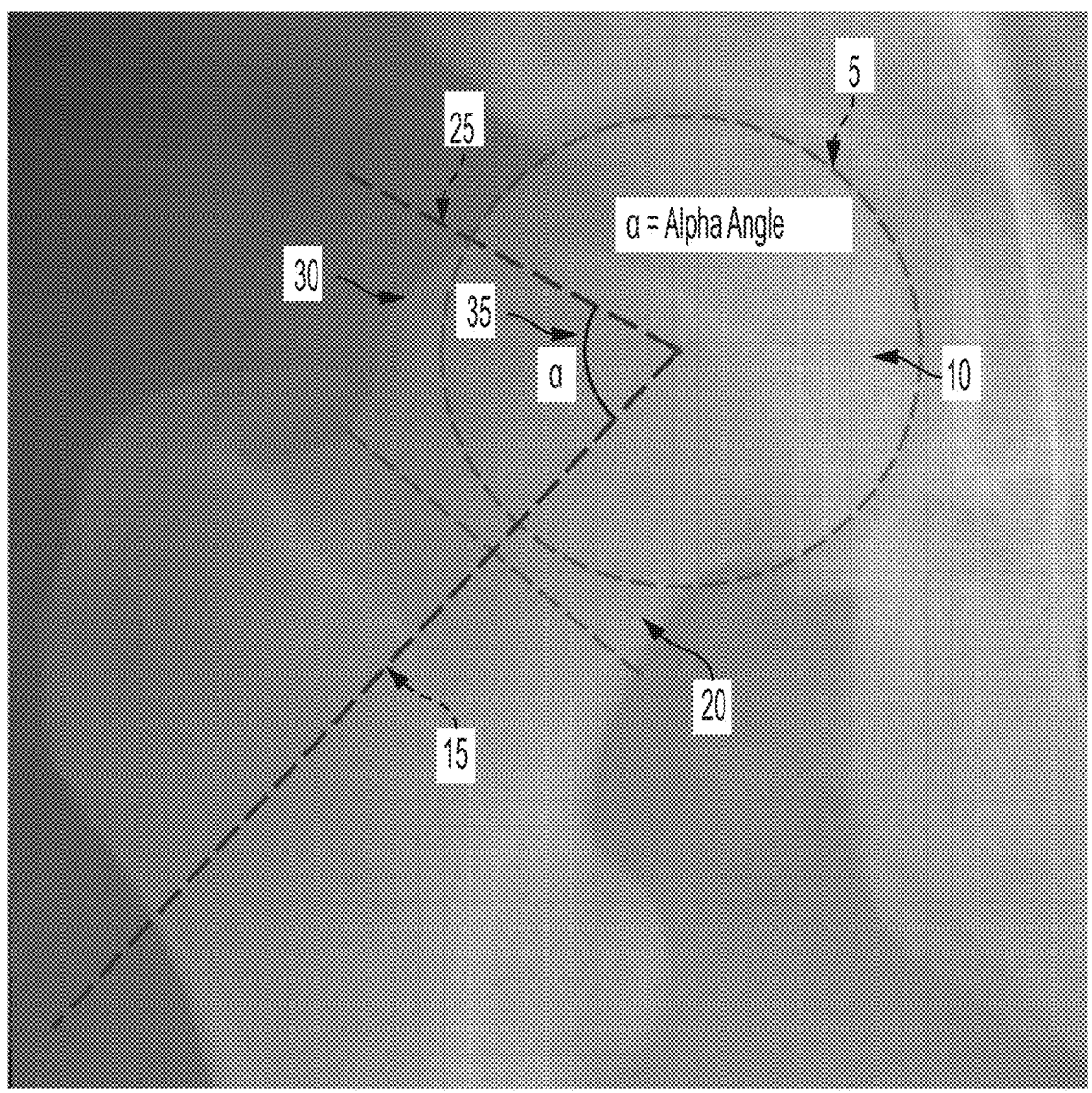
FIG. 16 is a schematic view showing an Alpha Angle determination on the hip of a patient.

For example, and with reference to FIG. 16, to measure the Alpha Angle, the surgeon manually creates a circle 5 and places it over the femoral head 10, and then manually sizes the circle such that the edge of the circle matches the edge of the femoral head. The surgeon then manually creates a line 15 and places it along the mid-line of the femoral neck 20. The surgeon then manually draws a second line 25 which originates at the center of the femoral head and passes through the location which signifies the start of the cam pathology 30 (i.e., the location where the bone first extends outside the circle set around the femoral head). The surgeon then manually selects the two lines and instructs the software to calculate the angle between the two lines; the result is the Alpha Angle 35.

Figure 17:
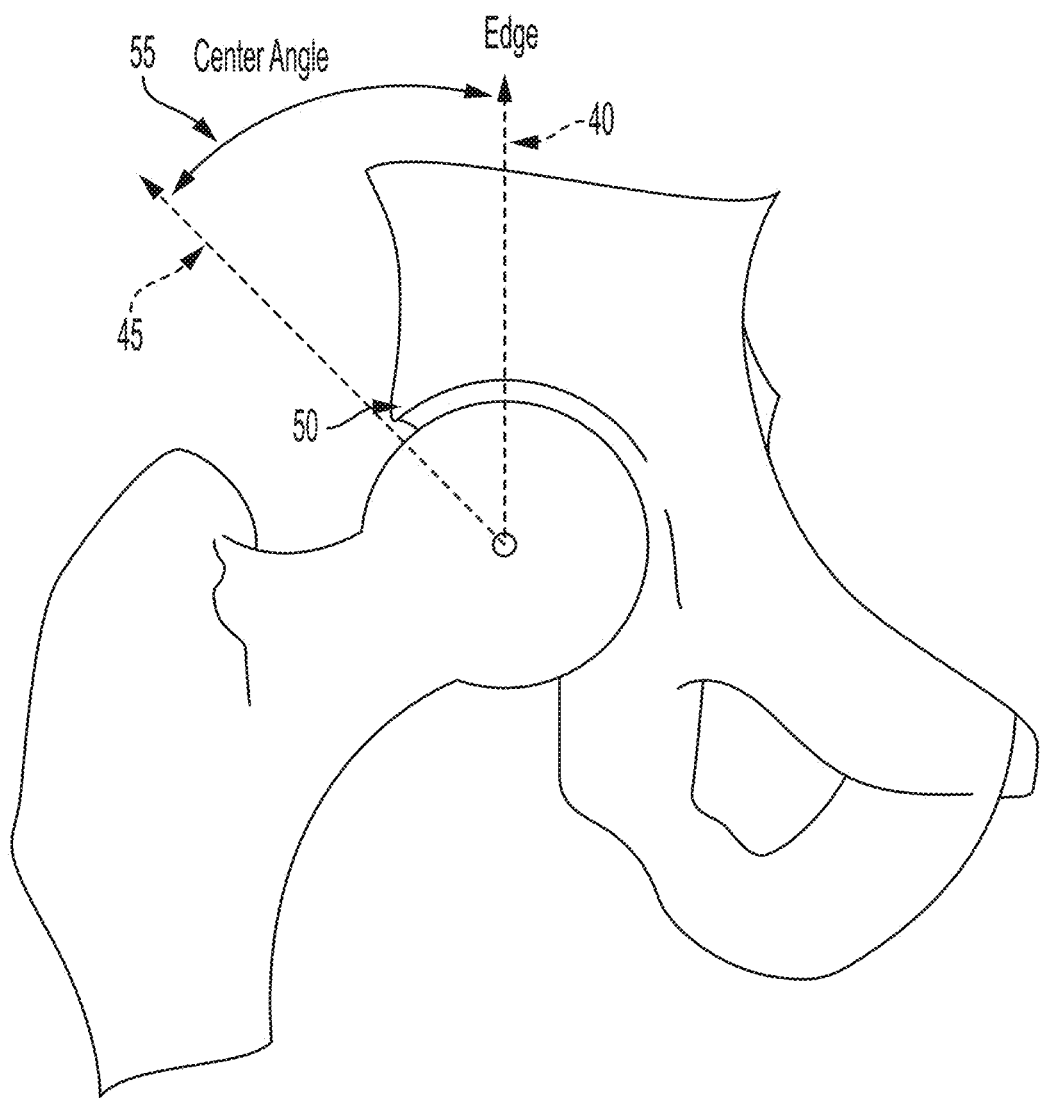
FIG. 17 is a schematic view showing a Center Edge Angle determination on the hip of a patient.

Correspondingly, and with reference to FIG. 17, to measure the Center Edge Angle, the surgeon manually creates a vertical line 40 which originates at the center of the femoral head, and then manually draws a second line 45 which originates at the center of the femoral head and passes through the location which signifies the start of the pincer pathology 50 (i.e., the rim of the acetabular cup). The surgeon then manually selects the two lines and instructs the software to calculate the angle between the two lines; the result is the Center Edge Angle 55.

With 3D medical images (e.g., CT, MRI, etc.), the surgeon can position one or more planes through the femoral head, and then performs the same operations within the one or more planes to measure the Alpha Angle for a given plane.

These Alpha Angle measurements (or Center Edge Angle measurements) are typically performed around the time that the patient is initially examined, which typically occurs weeks or months prior to surgery.

At the time of surgery, the surgeon may bring a copy (e.g., a printout) of the Alpha Angle measurements (or the Center Edge Angle measurements) to the operating room so that the printout is available as a reference during surgery. The surgeon may also have access to these measurements with a computer located in or near the operating room, which is connected to the hospital's PACS system (Picture Archiving and Communication System). Either way, the surgeon can have the pre-operative measurements available as a reference during surgery.

Figure 18:
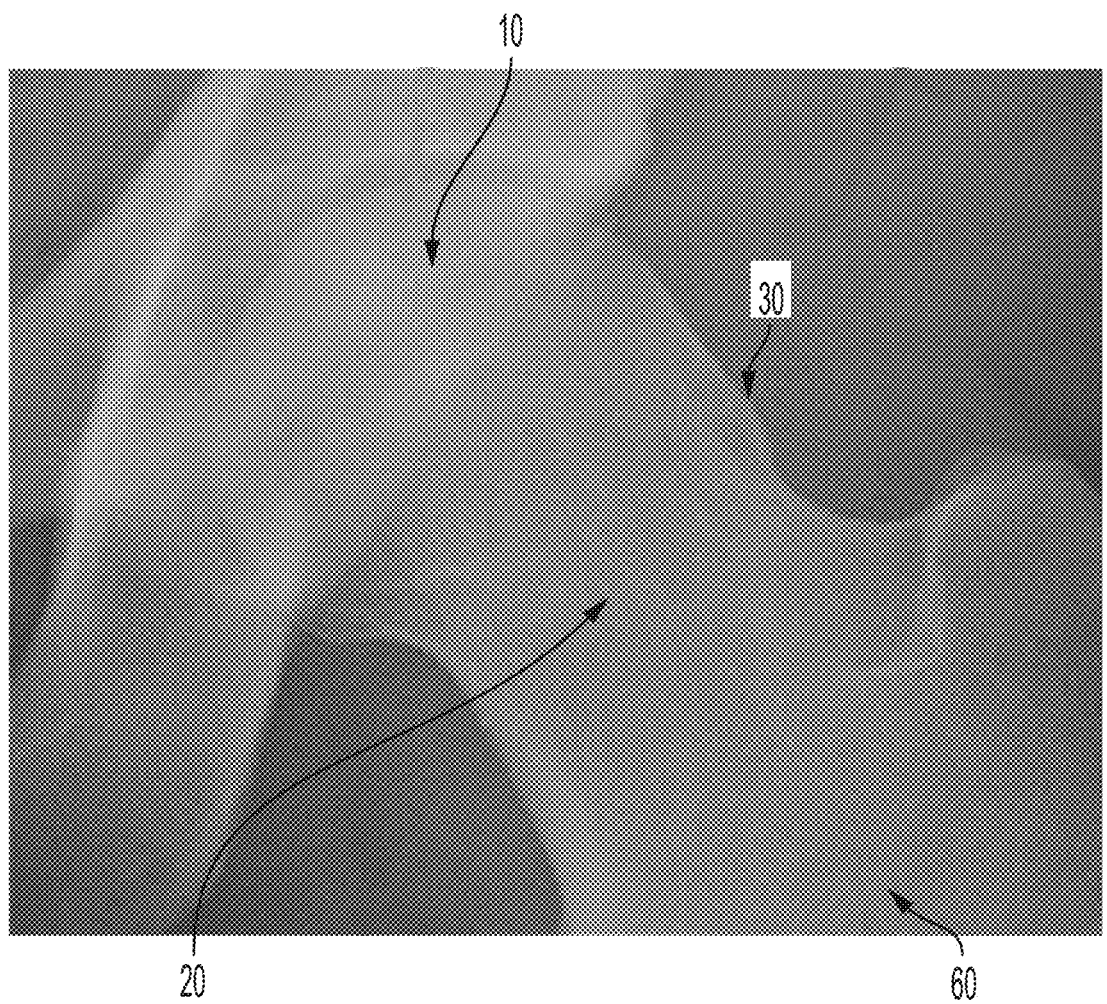
FIG. 18 is a schematic view showing the head and neck of a femur and a cam-type femoroacetabular impingement site.

Example Embodiment of a Method and a System for the Treatment of Cam-Type Femoroacetabular Impingement in a Hip Joint FIG. 18 is a schematic view of a femur 60 comprising the femoral head 10 and the femoral neck 20, and illustrates the cam-type femoroacetabular impingement site 30 which needs to be debrided in order to treat the cam-type femoroacetabular impingement.

According to various embodiments, the present disclosure describes a computer visual guidance system which analyzes an X-ray image (e.g., an intra-operative C-arm X-ray image) to measure (e.g., automatically measure) features of the hip, such as the cam pathology (e.g., by using an "Alpha Angle" calculation, see below), and then annotates the X-ray image for use by the surgeon in treating the cam pathology. The systems, methods, and techniques disclosed herein in various embodiments guide the surgeon to an optimal resection of the pathology which is causing the impingement. As noted above, arthroscopic resections are currently "eyeballed" and the surgeon has no objective way to define completion of the boney resection. This typically leads to over-resection and, most commonly, under-resection of the cam, which is considered to be the leading cause of revision hip arthroscopy. Furthermore, surgeons currently have no ability to measure Alpha Angle during surgery, so there is no means to determine if sufficient bone has been removed. The present disclosure addresses this problem by providing means which analyze (e.g., automatically analyze) an X-ray image with respect to a cam pathology and then annotate (e.g., automatically annotate) the X-ray image with guidance features which can be used by the surgeon in treating the cam pathology.

More particularly, the present disclosure, in various embodiments, describes a series of steps which start with an X-ray image and yields a measurement of a feature of the hip (e.g., the Alpha Angle) and an annotation which is correctly displayed on that X-ray image for the surgeon to be able to assess the pathology and progress towards proper resection.

Figure 19:
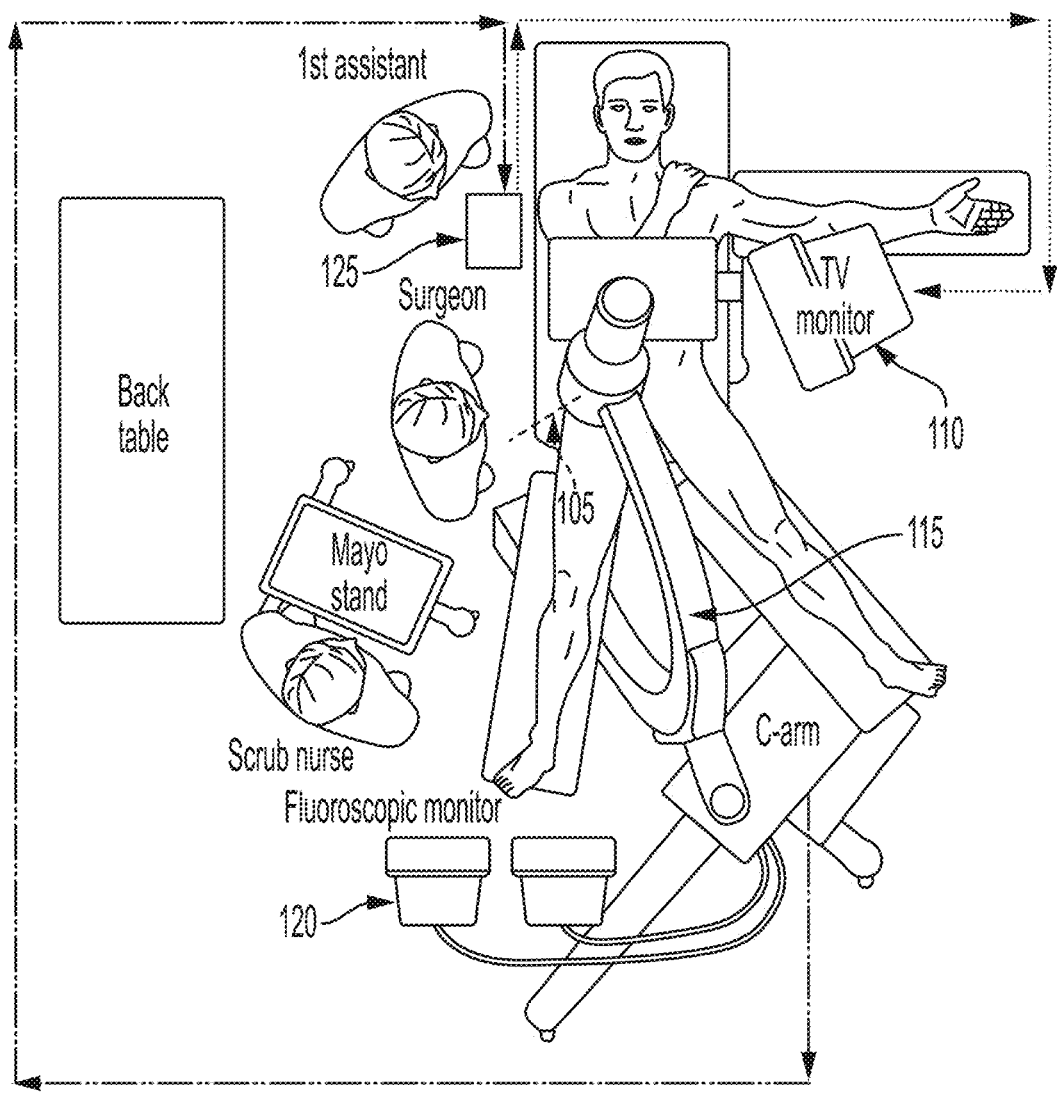
FIG. 19 is a schematic view showing a surgical suite.

FIG. 19 shows a surgical suite in accordance with some embodiments. For example, in a typical arthroscopic surgical suite, the surgeon uses an arthroscope 105 and a monitor 110 to directly view an internal surgical site. In addition, the surgeon also uses a C-arm X-ray machine 115 and a fluoroscopic monitor 120 to image the internal surgical site. In accordance with the present disclosure, there is also provided a novel computer visual guidance system 125 which automatically analyzes an X-ray image obtained from C-arm X-ray machine 115 with respect to selected features of the hip associated with a cam pathology and then automatically annotates the X-ray image displayed on computer visual guidance system 125 with guidance features for use by the surgeon in treating the cam pathology. In some embodiments, computer visual guidance system 125 comprises a general purpose computer having input and output means and which is appropriately programmed so as to provide the functionality disclosed herein. In some embodiments, computer visual guidance system 125 comprises a tablet device with an integrated computer processor and user input/output functionality, e.g., a touchscreen. In some embodiments, the computer visual guidance system 125 may be located in the sterile field, for example, the computer visual guidance system 125 may comprise a touchscreen tablet mounted to the surgical table or to a boom-type tablet support. The computer visual guidance system 125 may be covered by a sterile drape to maintain the surgeon's sterility as he or she operates the touchscreen tablet. Alternatively, computer visual guidance system 125 may comprise other general purpose computers with appropriate programming and input/output functionality, e.g., a desktop or laptop computer with a keyboard, mouse, touchscreen display, heads-up display, voice activation feature, pupil reading device, etc.

Figure 20:
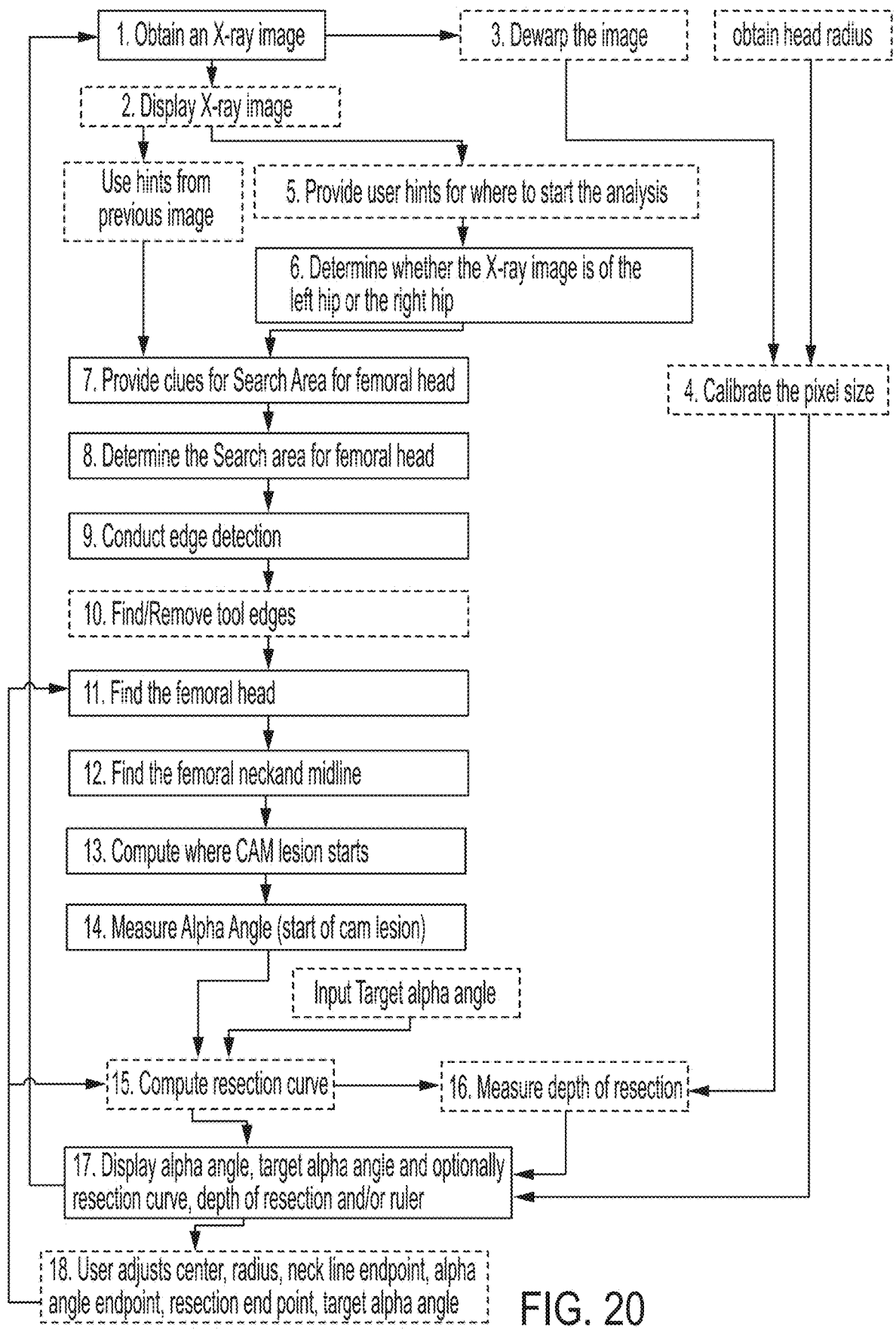
FIG. 20 is a flowchart which shows a method, in accordance with some embodiments.

In some embodiments, a method comprises the steps discussed below and shown in an exemplary flowchart form in FIG. 20.

Step 1 According to Various Embodiments: Obtaining the X-Ray Image

In some embodiments, the first step is to obtain the X-ray image. There are multiple ways to effect this as illustrated by the examples below, including directly from a C-arm X-ray machine, previous image data from surgery, previous image data taken prior to surgery.

1A. Obtaining the X-Ray Image Directly from a C-Arm X-Ray Machine

In some embodiments, the X-ray image is obtained directly from a C-arm X-ray device, e.g., C-arm X-ray machine 115 (FIG. 19). This may be done by wire or wireless connection between C-arm X-ray machine 115 and computer visual guidance system 125.

These images from the C-arm X-ray device are typically circular with a black background. Bones are dark, soft tissue is lighter, no X-ray absorption is white (see FIG. 21).

Since the computer visual guidance system 125 (FIG. 19) is separate from the C-arm X-ray device, it is necessary to detect when a new image has been taken by the C-arm X-ray device. This may be done by connecting the computer visual guidance system 125 directly to the video output of the C-arm X-ray device, and using the method described, for example, in International (PCT) Patent Application Publication No. WO 2012/149664A1 (which corresponds to International (PCT) Patent Application No. PCT/EP2011/057105) to detect when a new image is taken. In essence, this method looks at image blocks to see if there is a significant change between one image block and the previous image block. If there is a large change between image blocks, then an image is captured and this captured image is the image used in the method disclosed herein, in some embodiments.

Alternatively, other approaches well known in the art of X-ray imaging may be used to detect when a new image is taken.

The X-ray image may also be transmitted from C-arm X-ray machine 115 to computer visual guidance system 125 over a local area network. In some embodiments, C-arm X-ray machine 115 communicates with the local area network with, for example, a wireless or wired connection. In some embodiments, computer visual guidance system 125 receives the X-ray image from the local area network. Depending on the network speed, this can occur substantially instantaneously.

1B. Obtaining Previous Image from Surgery

A surgeon may also want to use an image taken earlier in the surgical procedure. In this scenario, a previous image can be retrieved from, for example, the C-arm X-ray machine 115 and imported into computer visual guidance system 125. A previous image may, alternatively, be retrieved from the computer visual guidance system 125 and used for further analysis.

1C. Obtaining Previous Image Taken Prior to Surgery

A surgeon may also want to use an image taken during pre-operative diagnostic X-rays, etc. In some embodiments, computer visual guidance system 125 communicates with the hospital's PACS servers, and an image taken previously is downloaded and the image used in the method disclosed herein. Where a pre-operative image is used, the pre-operative image is typically rectangular with no black background. The pre-op images are inverted relative to the C-arm images. Bones are light, soft tissue is darker, no X-ray absorption is black. A pre-op image needs to be inverted for analysis (i.e., so as to be similar to a C-arm image) and then inverted back after analysis for viewing. See FIG. 22.

It should be appreciated that other pre-operative image configurations may also be used—what is important is that both pre-operative and intra-operative images can be utilized with computer visual guidance system 125. In various embodiments, a pre-operative image may be provided to computer visual guidance system 125 by other means, e.g., a USB drive or other static drive or portable storage device, etc.

Step 2 According to Various Embodiments: Displaying the Image

Figure 21:
FIG. 21 is a schematic view showing a typical image acquired by a C-arm X-ray device.
Figure 22:
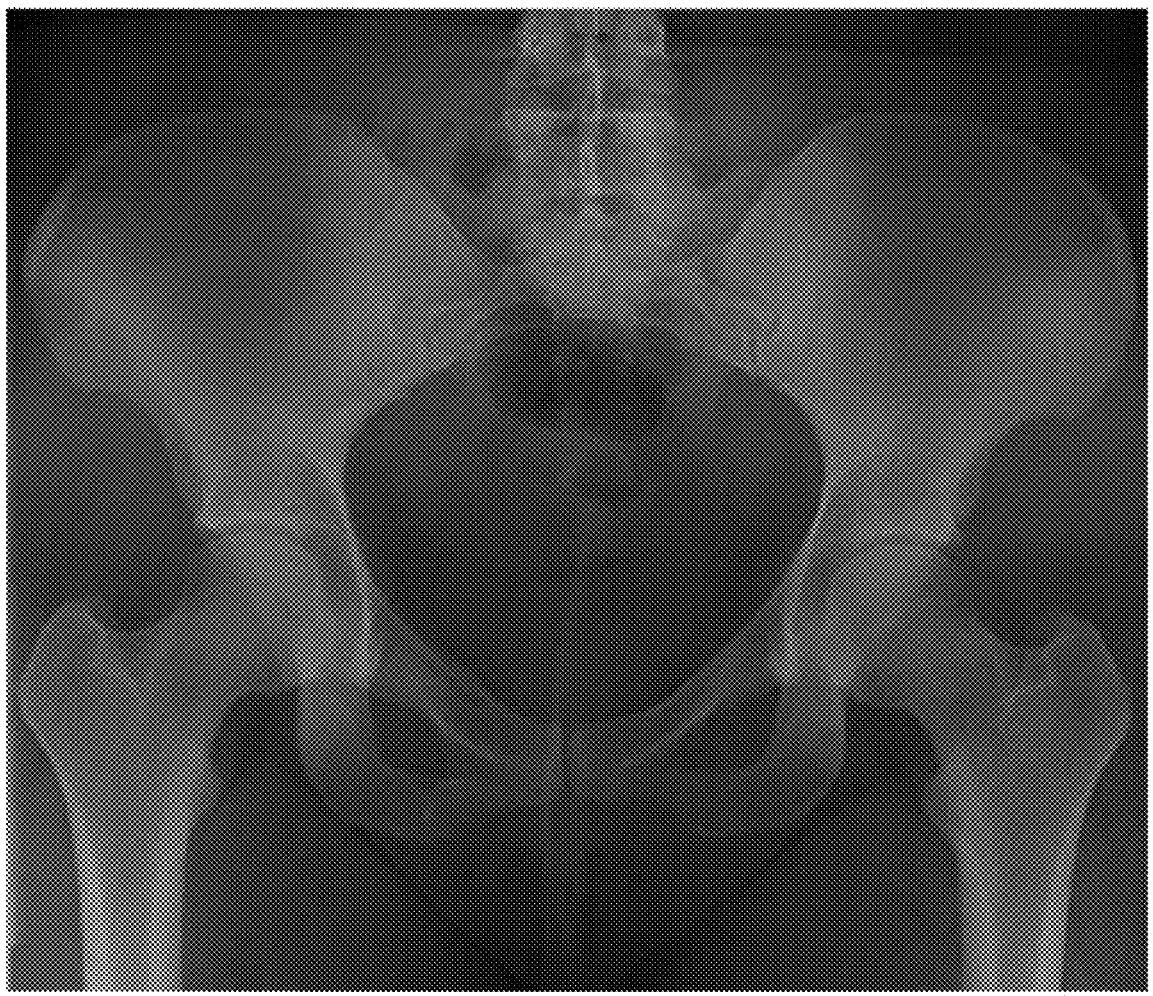
FIG. 22 is a schematic view showing a typical image acquired from a medical center's PACS servers.

After the X-ray image is acquired, it is displayed to the surgeon on computer visual guidance system 125 and/or monitor 110 (see FIGS. 21 and 22). One advantage of displaying the X-ray image to the surgeon prior to making measurements from that X-ray image is that the surgeon can view the acquired image and determine if it is an appropriate image to analyze and, if not, take another X-ray image without losing valuable operating room (OR) time while waiting for computer visual guidance system 125 to process the image.

Step 3 According to Various Embodiments: De-Warping the Image

In some embodiments, the next step is to de-warp the intra-operative X-ray image.

Figure 23:
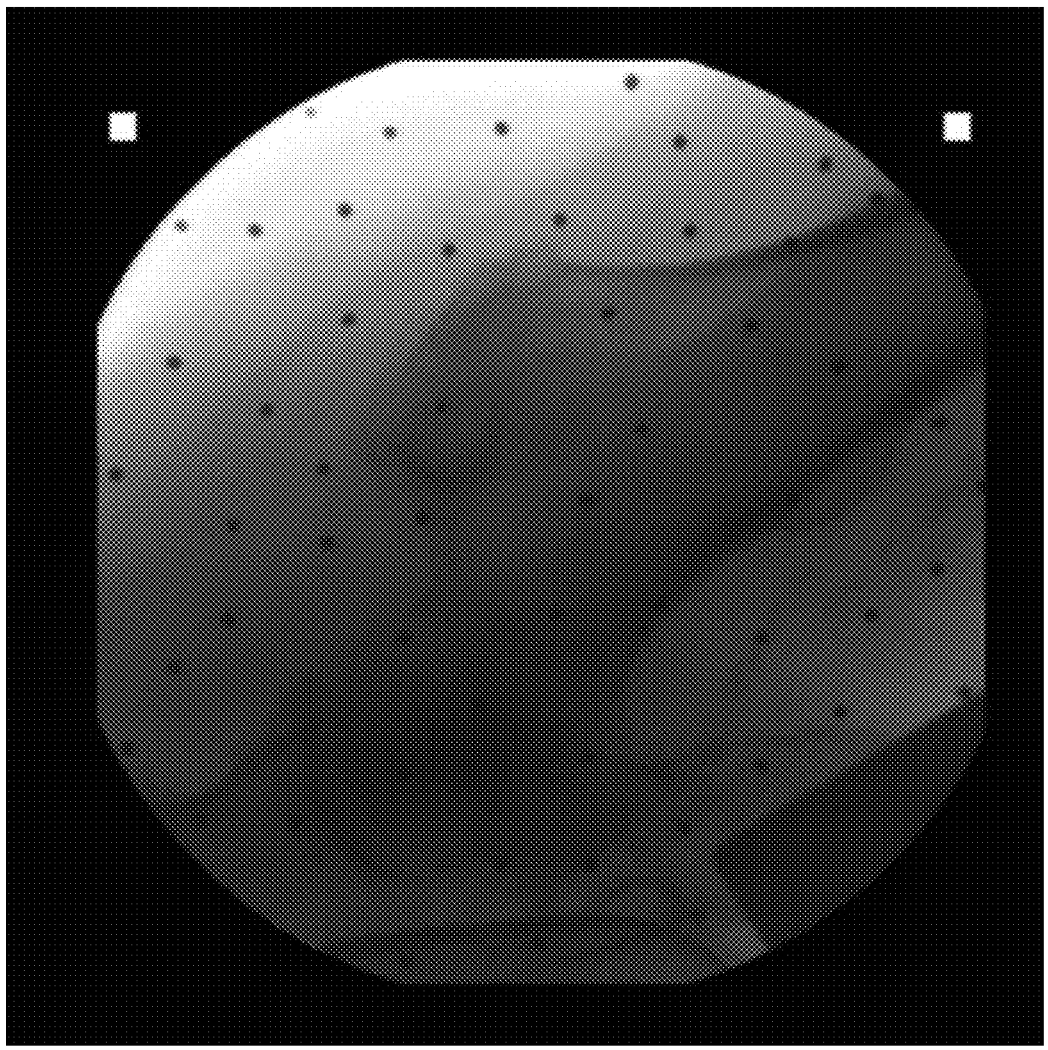
FIG. 23 is a schematic view showing how an X-ray image can be de-warped.

For example, images from some C-arm X-ray machines 115 are often distorted ("warped") such that every object in the image may not be scaled identically. This is due to the fact that the X-ray beam is not perfectly linear. Typically, objects closer to the X-ray source of the C-arm X-ray device appear larger (and comprise more pixels). Correspondingly, other objects of the same size located further away from the X-ray source of the C-arm X-ray device will appear smaller (and comprise less pixels). To make precise measurements, this warping needs to be removed. For example, the Stryker "Fluoro Disc" product provides this de-warping function by projecting a predetermined pattern onto the intra-operative X-ray image (see FIG. 23).

It should be appreciated that this de-warping step is optional, however, it makes calibration and any subsequent measurements more accurate (e.g., see Step 16 below), and is generally desirable since it makes the Alpha Angle measurement more accurate by correcting for image distortion via the de-warping process. Some newer C-arm X-ray devices (e.g., those with a flat panel detector) may automatically provide de-warped images and therefore may not require this de-warping step.

Step 4 According to Various Embodiments: Calibrating the Pixel Size

In some embodiments, the next step comprises calibrating the pixel size. Such pixel calibration step is optional, however, it is required for the measurement function in Step 16, and is generally desirable since it makes measurements of features shown on an X-ray image more accurate. Some newer C-arm X-ray devices (e.g., those with a flat panel detector with integrated DICOM) may provide calibrated pixel sizes and therefore may not require this pixel calibration step.

In order to accurately measure distances in the image, pixels may first be calibrated (i.e., so that a pixel in a given image is correlated to a real-world dimension). It is also helpful to know the pixel size when trying to limit the diameters of the femoral head that are being analyzed (see Step 11A below).

It is important to note that de-warping the image (as described above in Step 3) will improve the accuracy of pixel calibration.

There are multiple ways to calibrate pixel size. Some example approaches are described below.

4A. External Calibration Marker

Figure 24:
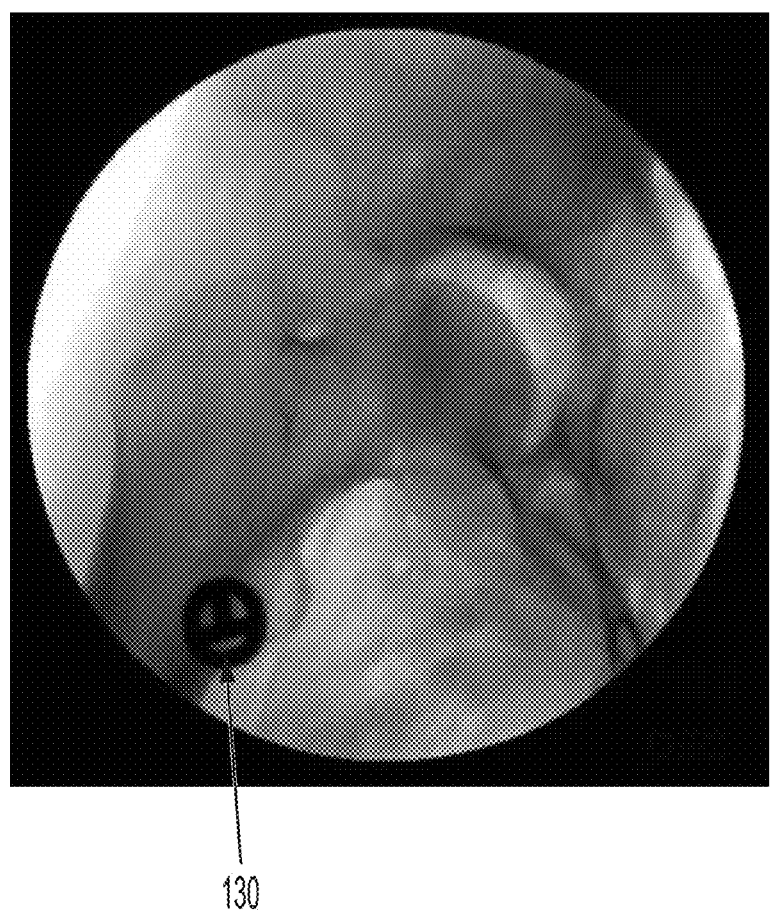
FIG. 24 is a schematic view showing one way for calibrating pixel size.

An example of calibrating pixel size entails marking the skin of the patient with a radio-opaque marker that is visible in the X-ray image. This radio-opaque marker can be large and placed a few centimeters distal from the greater trochanter. The radio-opaque marker may have an adhesive on its rear side to stick to the patient's skin. The radio-opaque marker may be disposable. In some embodiments, the marker may be flat, circular and simple to identify with computer vision. Since the marker is of known size (mm), and the number of pixels can be counted on the X-ray (px), it is a simple matter to calculate mm/px (i.e., to calculate the pixel size). In some embodiments, it may be helpful to treat the circle as an ellipse, since the radio-opaque marker does not always lie flat on the patient. Therefore, one can use the major axis of the ellipse for calibration. This approach for calibrating pixel size is the furthest "out of plane" (i.e., out of the plane of the object of interest, since the marker is on the surface of the skin and the object of interest is at an internal site), so it likely has calibration error without de-warping the image. FIG. 24 shows a radio-opaque marker 130 visible in the X-ray image.

In some embodiments, the system may be configured to automatically determine, using one or more image analysis techniques, whether a radio-opaque marker or other tool (also referred to herein as instruments) captured in an image is in an unacceptable or non-optimal position. For example, the system may be configured to determine whether a marker or tool is taking up too large an area of an image, whether a marker or tool is blocking view of one or more anatomical features in an image, and/or whether a marker or tool is a likely cause of an erroneous computation (such as an erroneous resection curve computation discussed further below with respect to FIG. 56). The system can identify tools in an image using any suitable image processing technique, including, for example, machine learning. In some embodiments, the system is configured to identify one or more tools in an image by looking for parallel lines (such as by using a Hough transform), which may indicate the perimeter of a shaft of a tool, such as a shaft of a resection tool or a shaft of an endoscope. In accordance with a determination that a marker or tool captured in an image is in an unacceptable or non-optimal position, the system may display one or more warnings (e.g., pop-up windows, drop-down windows, etc.) indicating information regarding the reason that the warning was triggered and/or advising the operator that the tool should be moved (for example, to a more optimal position) and a new image should be captured, or that a different image should be used.

4B. Internal Calibration Marker

Figure 25:
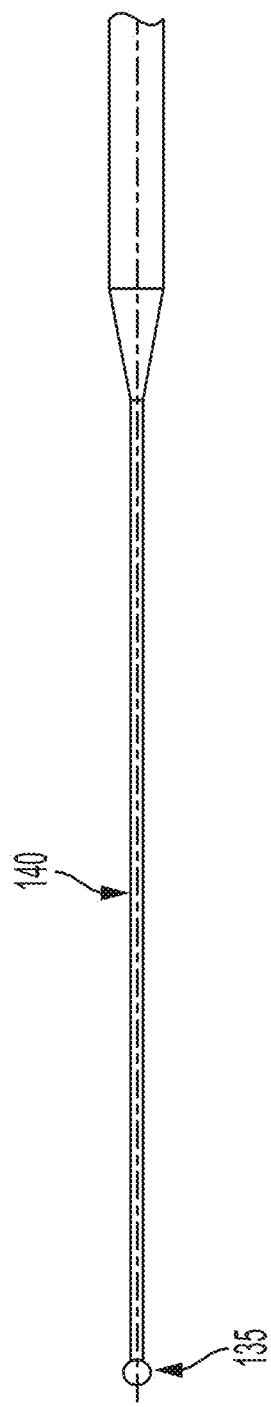
FIGS. 25 and 26 are schematic views showing another way for calibrating pixel size.
Figure 26:
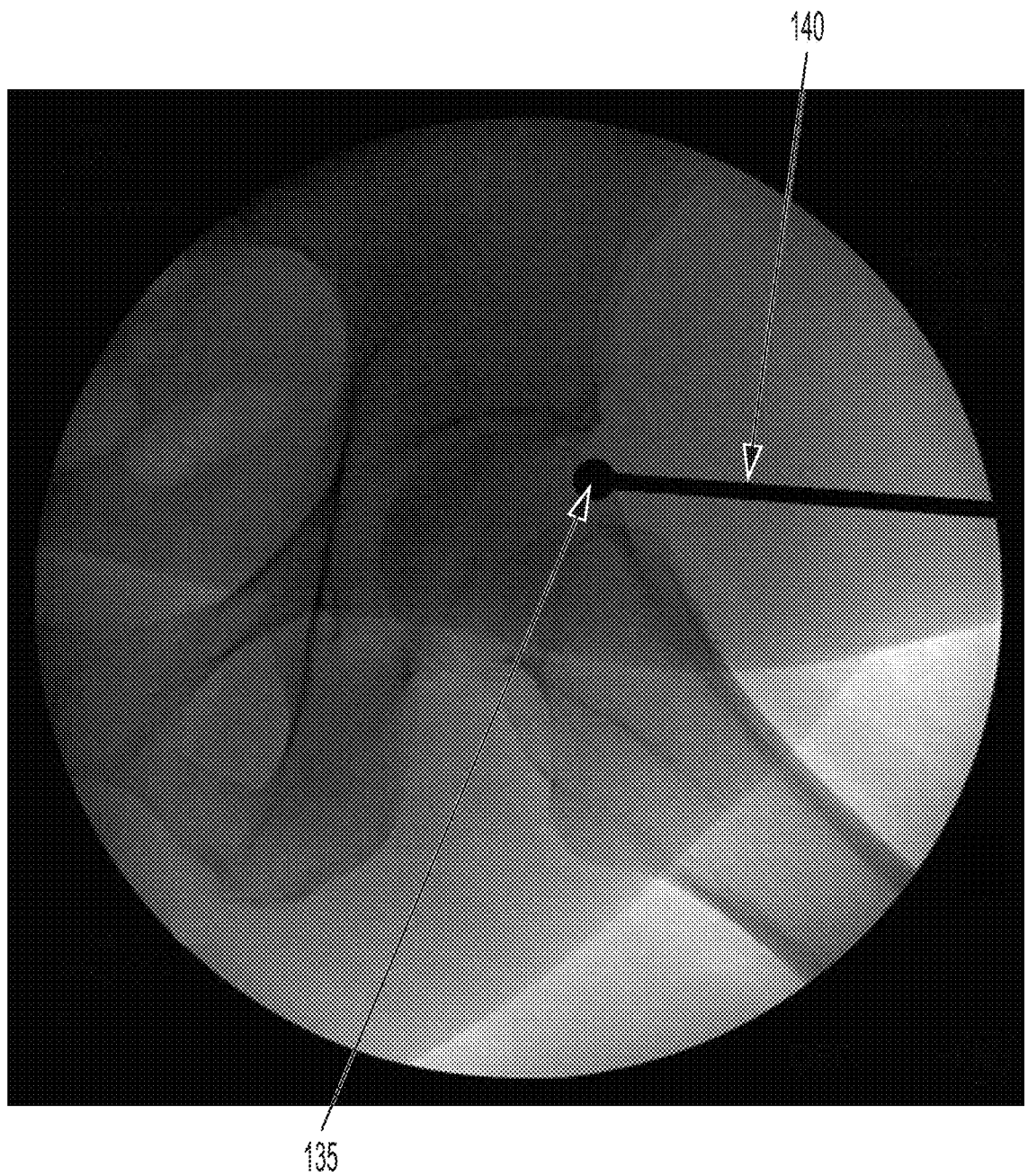

In other embodiments, instead of using an external calibration marker, pixel calibration can be effected by placing a calibration marker of known size into the joint space and, more preferably, directly on the bone. The calibration marker may be radio-opaque and thus will be visible on X-ray. It is preferably highly radio-opaque, for example constructed of solid metal, and thus will have high contrast with the anatomy. This would make the "plane" of the pixel calibration more accurate, i.e., the calibration marker will lie closer to the plane of the object of interest. This calibration marker can be re-usable and sterilized by almost any method due to its simplicity. FIGS. 25 and 26, which show a radio-opaque calibration marker 135 at the distal end of an instrument 140.

4C. Using the Burr/Scope in the X-Ray Image

Figure 27:
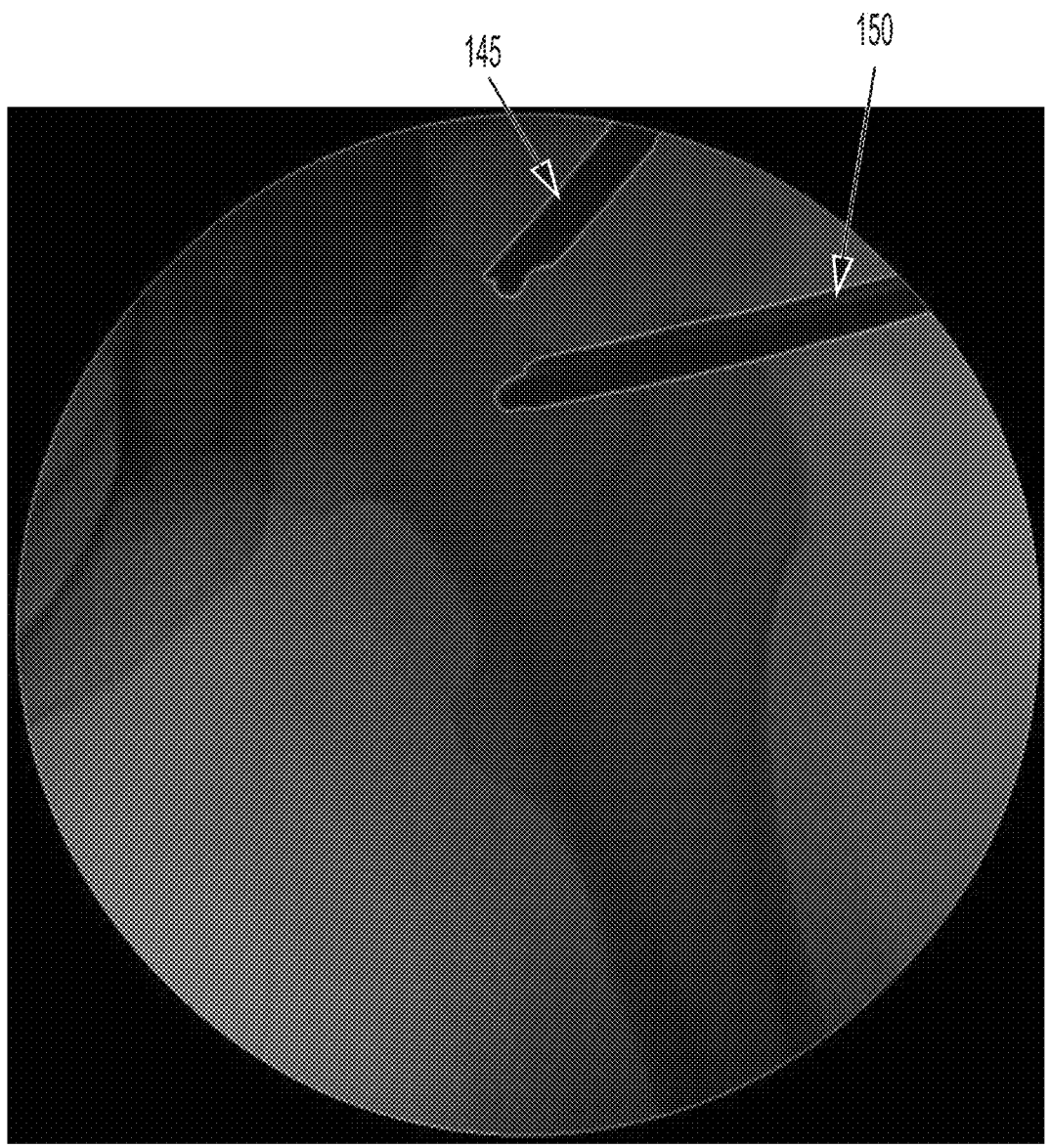
FIG. 27 is a schematic view showing still another way for calibrating pixel size.

One downside of using a dedicated calibration marker is that it adds an additional instrument to the procedure, and can disrupt the natural workflow of the medical procedure. If, instead, surgical instruments of known size that are already present in the image (e.g., the burr and scope) can be used, this disruption can be avoided. These surgical instruments (e.g., burr and scope) are much more complex shapes, however, and tend to be more difficult to identify with computer vision. 3D computer models of these surgical instruments are generally available, so these 3D models can be matched up to the 2D X-ray images from the C-arm X-ray machine 115 to first identify the surgical instruments, and then their known dimensions can be used for pixel calibration. Alternatively, some surgical instruments include encoded information that identifies the surgical instrument. For example, this information can be encoded into the surgical instrument by way of an EPROM carried by the surgical instrument. This identifying information can include the make and model number of the surgical instrument, or may include physical dimensions. This information can be passed to computer visual guidance system 125 so that a known dimension of the surgical instrument can be used for pixel calibration. If the information is in the form of a make and model number, then computer visual guidance system 125 may comprise a table of dimensions associated with that particular surgical instrument. See FIG. 27, which shows a burr 145 and a scope 150.

4D. Using a Pre-Operative Image

The pixel size in the image may also be calibrated based on pre-operative images that have a known scale, such as MRI or CT images. For example, if the pre-operative image has a known scale, then an object appearing in both the pre-operative image and intra-operative image can be compared to determine pixel calibration. For example, the radius of the femoral head can be measured. The femoral head radius can be determined from the X-ray image in number of pixels and, using the known femoral head radius measured pre-operatively, the pixel size relative to real-world distance can be computed. However, if the pre-operative and intra-operative images are not taken in the same plane, a small error may be present due to imperfect femoral head symmetry. Creating 2D images from a 3D computer model increases the ability to match the images well and minimize error.

In some embodiments, the pixel size in the X-ray image obtained from C-arm X-ray machine 115 is calibrated by (i) first obtaining a measurement of the radius of the femoral head from a pre-operative image, and then (ii) correlating the pixel count of the radius of the femoral head with the previously-obtained measurement of the radius of the femoral head in order to calibrate the pixel size in the X-ray image obtained from C-arm X-ray machine 115. In some embodiments, the measurement from the pre-operative image can be manually input into computer visual guidance system 125 by the operator (for example, the surgeon). In another embodiment, computer visual guidance system 125 can read the measurement from a file that it accesses. For example, the femoral head size could be meta data associated with a pdf file that computer visual guidance system 125 accesses. In this embodiment, the pdf file can be a pre-operative plan generated from a pre-operative 3D image (e.g., a CT scan).

In order to calibrate pixel size by this method, the sequence of steps may be changed. In various embodiments, this Step 4D would come after the femoral head has been found using computer vision, e.g., after Step 11 below.

Step 5 According to Various Embodiments: Providing Hints

In some embodiments, the next step comprises providing "hints" to the system. These "hints" may serve to speed up the analysis, and they can also be used for other purposes, e.g., to help identify whether the X-ray image is of the left hip or the right hip, or to help in computing the resection curve (see below), etc.

Figure 28:
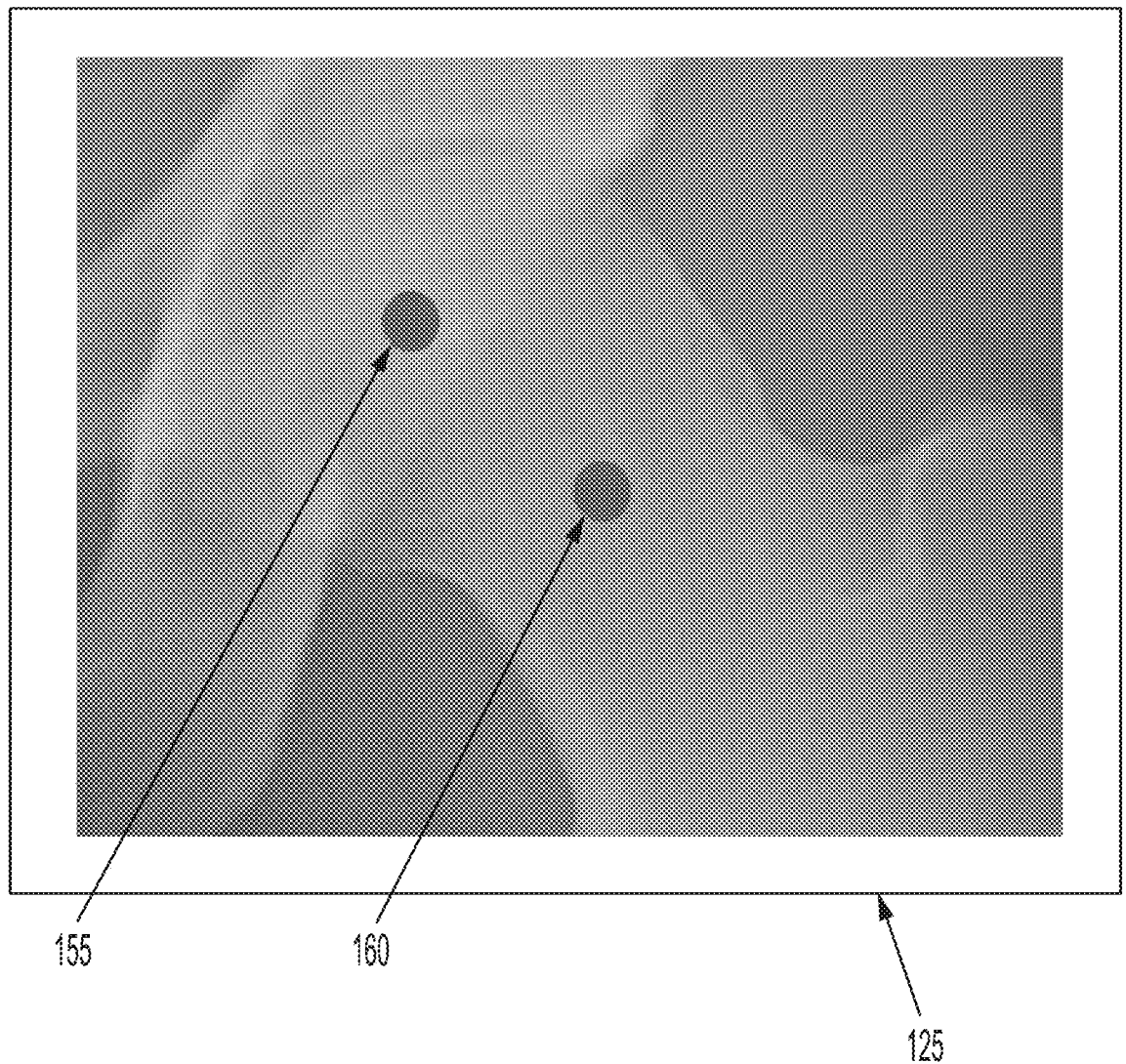
FIG. 28 is a schematic view showing how a surgeon can provide "hints" to the system using touchscreen tablet 130.

In some embodiments, and with reference to FIG. 28, the surgeon may provide, for example, two hints to the system: a femoral head hint 155 and a femoral neck hint 160. This may be done by displaying the X-ray image obtained by C-arm X-ray machine 115 onto an output screen of computer visual guidance system 125 (e.g., the touchscreen of a tablet comprising computer visual guidance system 125), and then prompting the surgeon to (i) touch the center of the femoral head so as to provide a femoral head hint 155, and (ii) prompting the surgeon to touch the mid-line of the femoral neck so as to provide a femoral neck hint 160.

Once the surgeon provides the femoral head hint 155 and the femoral neck hint 160 to the system, these hints may be automatically incorporated into subsequent images obtained by C-arm X-ray machine 115. In some embodiments, a new X-ray image is compared to a previous image containing the femoral head hint 155 and the femoral neck hint 160. If the new image is sufficiently similar to the previous image, then the femoral head hint 155 and the femoral neck hint 160 from the previous image are used for the new image. This will save valuable OR time and be convenient for the surgeon in that the surgeon will not have to provide new hints to computer visual guidance system 125 for each new image acquired.

In some embodiments the system may be configured to display one or more warnings in accordance with a determination that a hint meets one or more predefined criteria. For example, the system may be configured to determine whether a hint provided by the surgeon is outside of a predefined range, or whether a hint provided by the surgeon appears to be in an incorrect area of an image, or whether a hint provided by the surgeon does not enable the system to make a determination as to the location of one or more anatomical features on the basis of the hint. If the one or more predefined criteria for displaying a warning in response to receiving a hint is satisfied, then the system may display a warning in the form of a popup window or drop-down window. In some embodiments, the warning may display information regarding the satisfied criteria that caused display of the warning. In some embodiments, the warning may prompt the surgeon to re-enter a new hint.

Step 6 According to Various Embodiments: Determining Whether the X-Ray Image is of the Left Hip or the Right Hip In some embodiments, the next step may comprise determining whether the X-ray image is of the left or the right hip.

Knowing whether a left hip or right hip is being imaged enables computer visual guidance system 125 to more efficiently analyze the X-ray image; for example, to search for the femoral neck, computer visual guidance system 125 only need look on the right side of the femoral head for a left hip or on the left side of the femoral head for a right hip.

There are multiple ways to determine whether the X-ray image is of the left or the right hip. In any method, it is assumed that the X-ray image is provided to the visual guidance system in the correct manner, and has not been flipped (e.g., reversed), and is generally oriented with the top of the image being in the superior (i.e., cephalad) direction of the patient.

6A. Patient Data

Prior to surgery, patient data entry may include identification of the left hip or the right hip. Computer visual guidance system 125 can subsequently read this data. For example, a patient data file may include the hip type, and computer visual guidance system 125 obtains this information by accessing the patient data file. Alternatively, the left or the right hip can be ascertained by pre-operative software from a 3D image (e.g., CT, MRI) or 2D image (e.g., X-ray) and subsequently read by computer visual guidance system 125

6B. Light/Dark Side

Figure 29:
FIG. 29 is a schematic view showing one way of determining whether the X-ray image is of the left hip or the right hip.

X-ray technicians will usually rotate the C-arm image so that "up" on the image correlates to "superior" on the anatomy—if one assumes that this is true, then one can just look at the left and right sides of the beam cone to see which is darker on average. If the left side of the X-ray image is darker, then the image is of the left hip. If the left side of the X-ray image is lighter, then the image is of the right hip. This is because bone tissue absorbs X-rays and appears darker on the image. Air or soft tissue attenuates less X-rays, so they appear much lighter on the image, for example, see FIG. 29, where the left side 165 of the X-ray image is darker and the right side 170 of the X-ray image is lighter.

The Light/Dark Side method is not useful if the C-arm image is not rotated so that "up" on the image correlates to "superior" on the anatomy.

6C: Using the Surgeon-Supplied Hints

Figure 30:
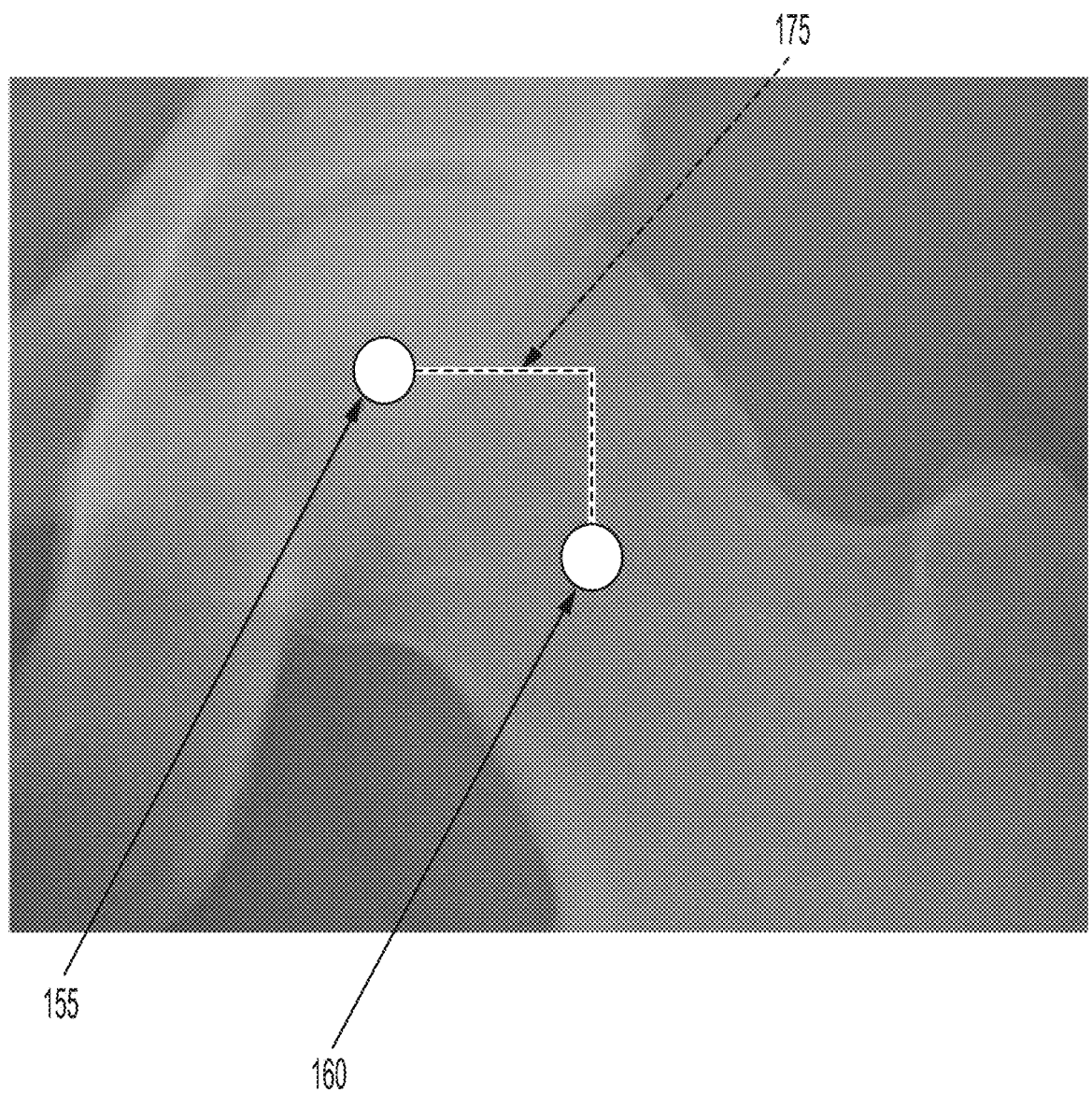
FIG. 30 is a schematic view showing how the surgeon-supplied "hints" may be used to determine whether the X-ray image is of the left hip or the right hip.

In some embodiments, femoral head hint 155 and femoral neck hint 160 are used to determine whether the X-ray image is of the left hip or the right hip. For example, in FIG. 30, the horizontal distance 175 from femoral head hint 155 and femoral neck hint 160 is determined. If femoral head hint 155 is to the left of femoral neck hint 160, the X-ray image is of the left hip, if femoral head hint 155 is to the right of femoral neck hint 160, the X-ray image is of the right hip.

6D: Instrument Position

In some embodiments, if an instrument is in the X-ray image, computer visual guidance system 125 can use the location and orientation of the instrument to determine if the hip being imaged is a left hip or a right hip. Typically, instruments are introduced on the lateral side of the femoral head, with a trajectory from lateral to medial. Given this fact, computer visual guidance system 125 can first locate an instrument in the X-ray image, then identify the location and orientation of the instrument within the X-ray image so as to determine if the hip being imaged is a left hip or a right hip.

Step 7 According to Various Embodiments: Providing Clues for where to Create the Search Area for Femoral Head In some embodiments, the next step is to provide computer visual guidance system 125 with clues for where to start its analysis of the anatomy. This is desirable because processing will run faster if the analysis starts with an intelligent "guess" of the anatomy to center on.

There are multiple ways to provide clues for where to start, examples of which are described below.

7A. Center of Search Area

In one approach, it is possible to simply use femoral head hint 155 (at the center of the femoral head) as the place to start the analysis.

7B. Tips of Instruments

Figure 31:
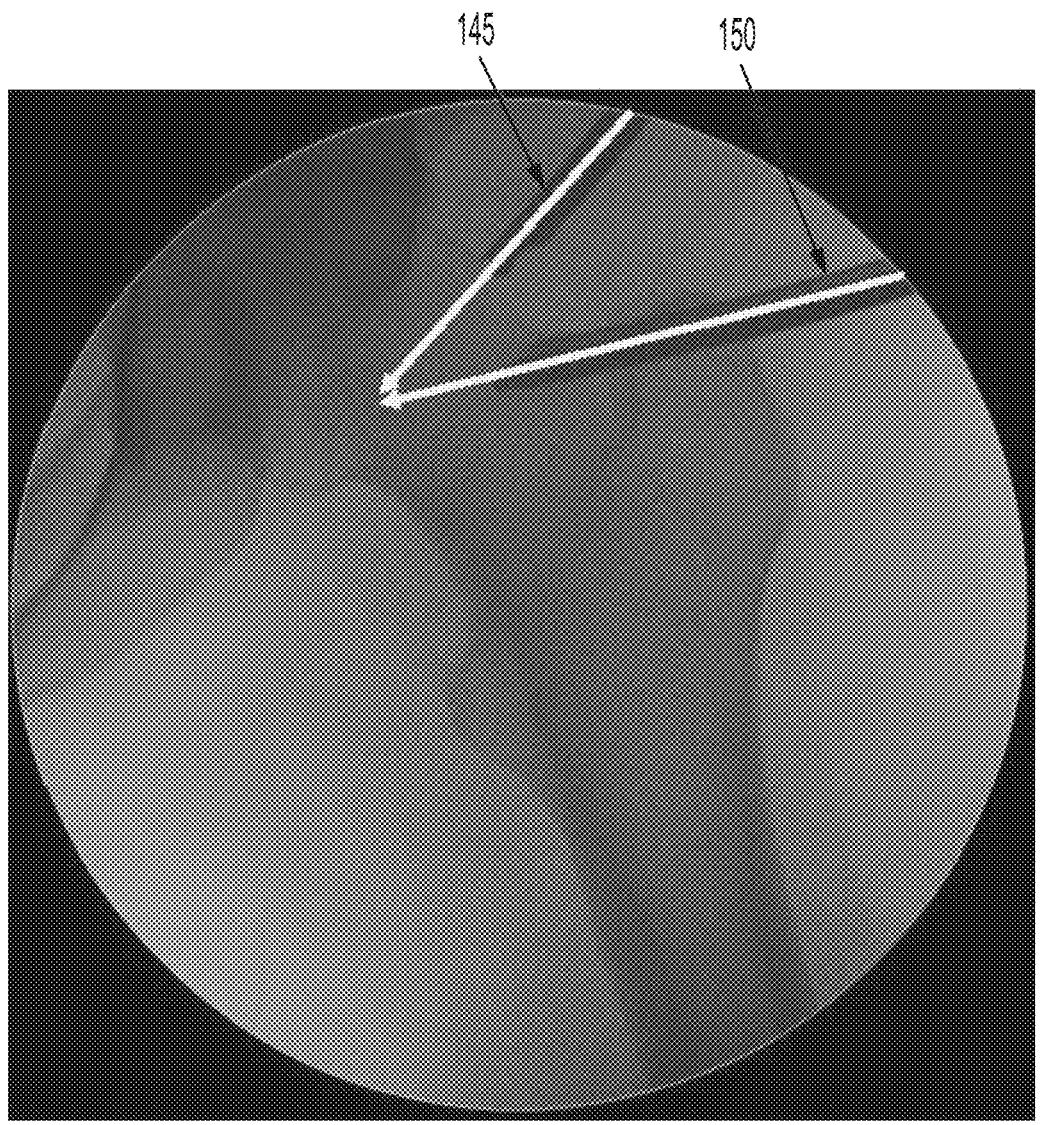
FIG. 31 is a schematic view showing one way for providing a clue of where to start the analysis of the anatomy.

Another way to intelligently guess where to start the analysis is to use the tips of the medical instruments present in the surgical field. Even if one does not know what the medical instruments are, they typically have an elongated shape and a Hough transform can be used to look for parallel lines (which indicate the profiles of the elongated medical instruments). The center of the femoral head will typically be somewhere near the tips of the medical instruments, at least within one diameter of the largest possible femoral head, and usually in front of the medical instruments. If two medical instruments are present in the X-ray image (there typically will be), then the estimate of where to start the analysis becomes more accurate, since one can limit the region of interest to the intersection of the parallel lines of the medical instruments (i.e., the side profiles of the medical instruments). See FIG. 31, where the tips of burr 145 and scope 150 are used to provide a clue as to where to start the analysis of the anatomy.

Step 8 According to Various Embodiments: Determining the Search Area for Femoral Head In some embodiments, the next step may comprise a determination of the search area. This is desirable because the more pixels that computer visual guidance system 125 has to look at, the longer the search time. So anything that can reduce the search area will speed up processing time.

Figure 32:
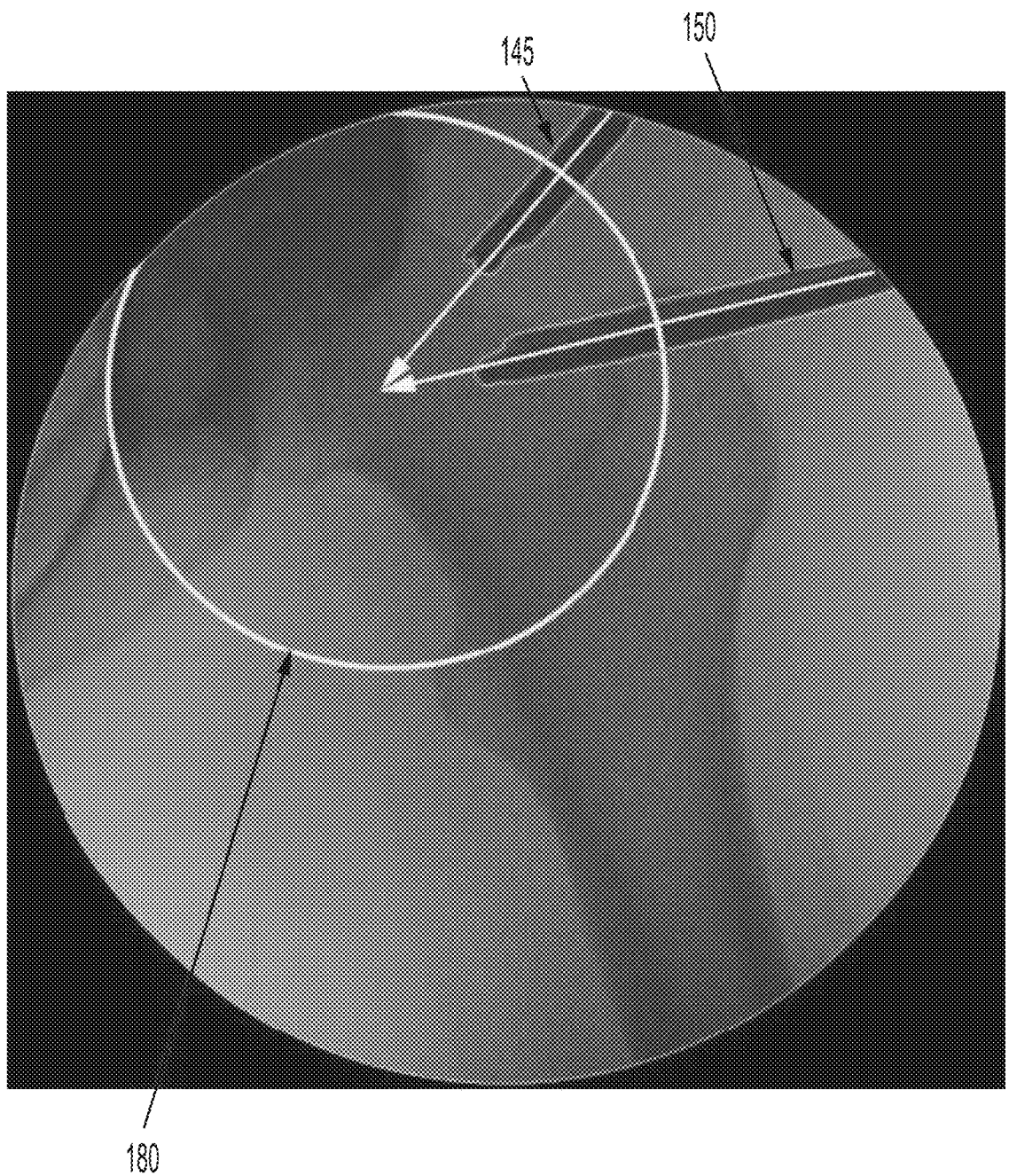
FIG. 32 is a schematic view showing one way for determining the search area.

There are multiple ways to determine the search area. In some embodiments, the image area outside the beam cone is eliminated. Most C-arms provide a circular image on a black background. This is because the beam of X-rays is arranged in a cone, and is received by a circular image intensifier. It is not necessary to search the black areas of the X-ray image. In fact, it can be assumed that the femoral head will be mostly, if not entirely, inside the beam cone of the X-ray image. It is possible, therefore, to narrow the search for the femoral head to those structures that have a center point well inside the beam cone. A search area is defined around the clue from Step 7. In FIG. 32, a search area 180 is shown defined around the clue from Step 7.

Step 9 According to Various Embodiments: Conducting Edge Detection

Figure 33A:
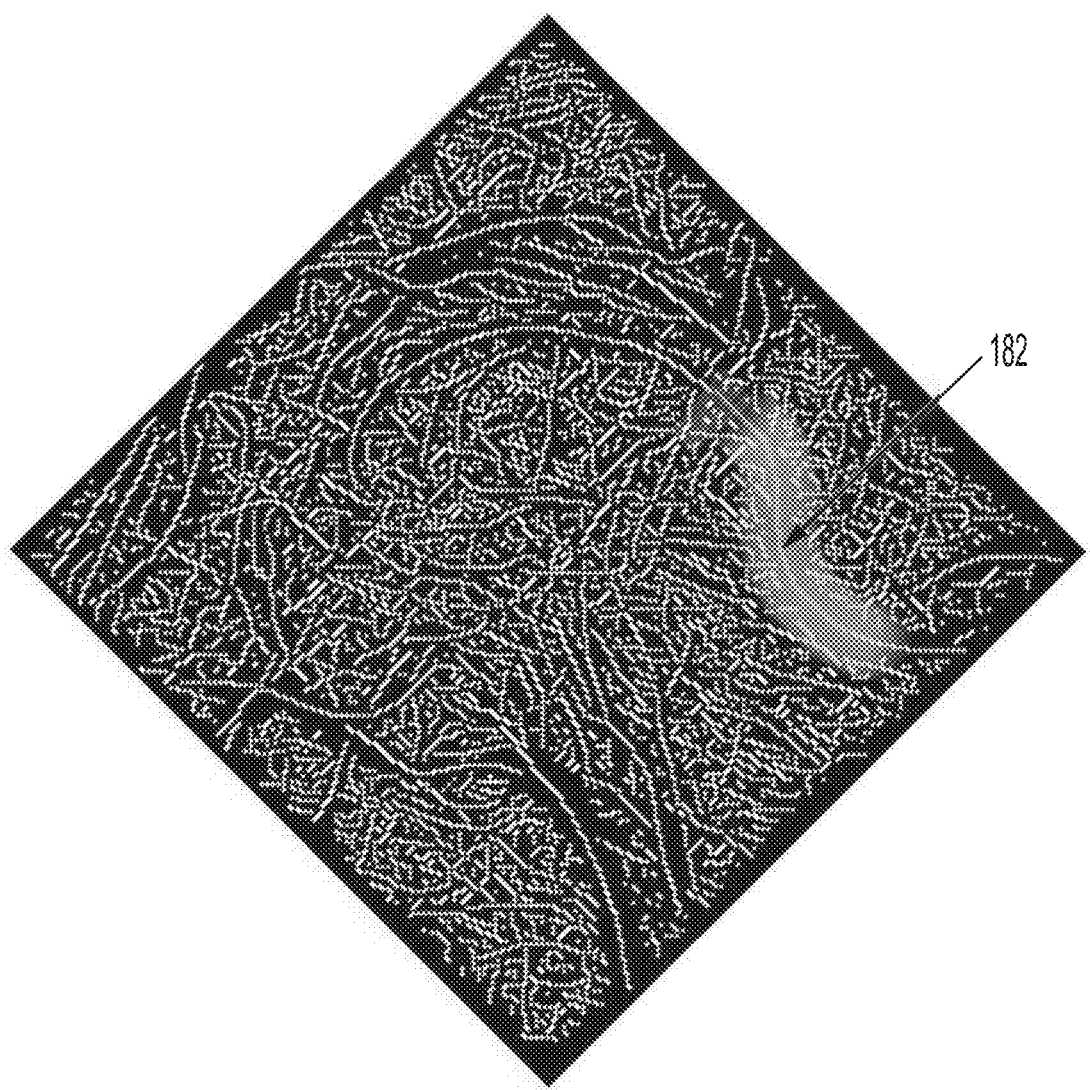
FIG. 33A is a schematic view showing edge detection.

In some embodiments, the next step comprises conducting edge detection of the relevant anatomy to determine the edges of the femoral head. There are multiple ways to carry this out including industry standard methods such as canny edge detection. For example, see FIG. 33A, which shows edge detection for the femoral head.

Step 10 According to Various Embodiments: Finding/Removing Instrument Edges

After edge detection has been effected, it is desirable to find and remove the edges of any instruments that are in the search area, since the presence of instrument edges in the image can complicate subsequent processing steps (e.g., finding the femoral head, finding the femoral neck, etc.). Finding and removing instrument edges may be effected in ways well known in the art of image processing.

According to various embodiments, the system 125 may determine that an instrument is in suboptimal location in the X-ray image such that the edges associated with the instrument are unacceptably interfering with one or more processing steps. The system 125 may either remove the edges associated with the instrument and continue processing or may determine that removal of the edges is either not viable or not sufficiently effective to alleviate the interference with processing steps. Upon determining that removal of the edges is insufficient, the system 125 may provide guidance to the user that the instrument should be moved and a new X-ray image generated. This can be done in any suitable manner, including as discussed below with respect to FIG. 56.

Step 11 According to Various Embodiments: Finding the Femoral Head

In some embodiments, the next step comprises finding the femoral head. There are multiple ways to find the femoral head as illustrated by the examples below.

11A. Hough Transform

Figure 33B:
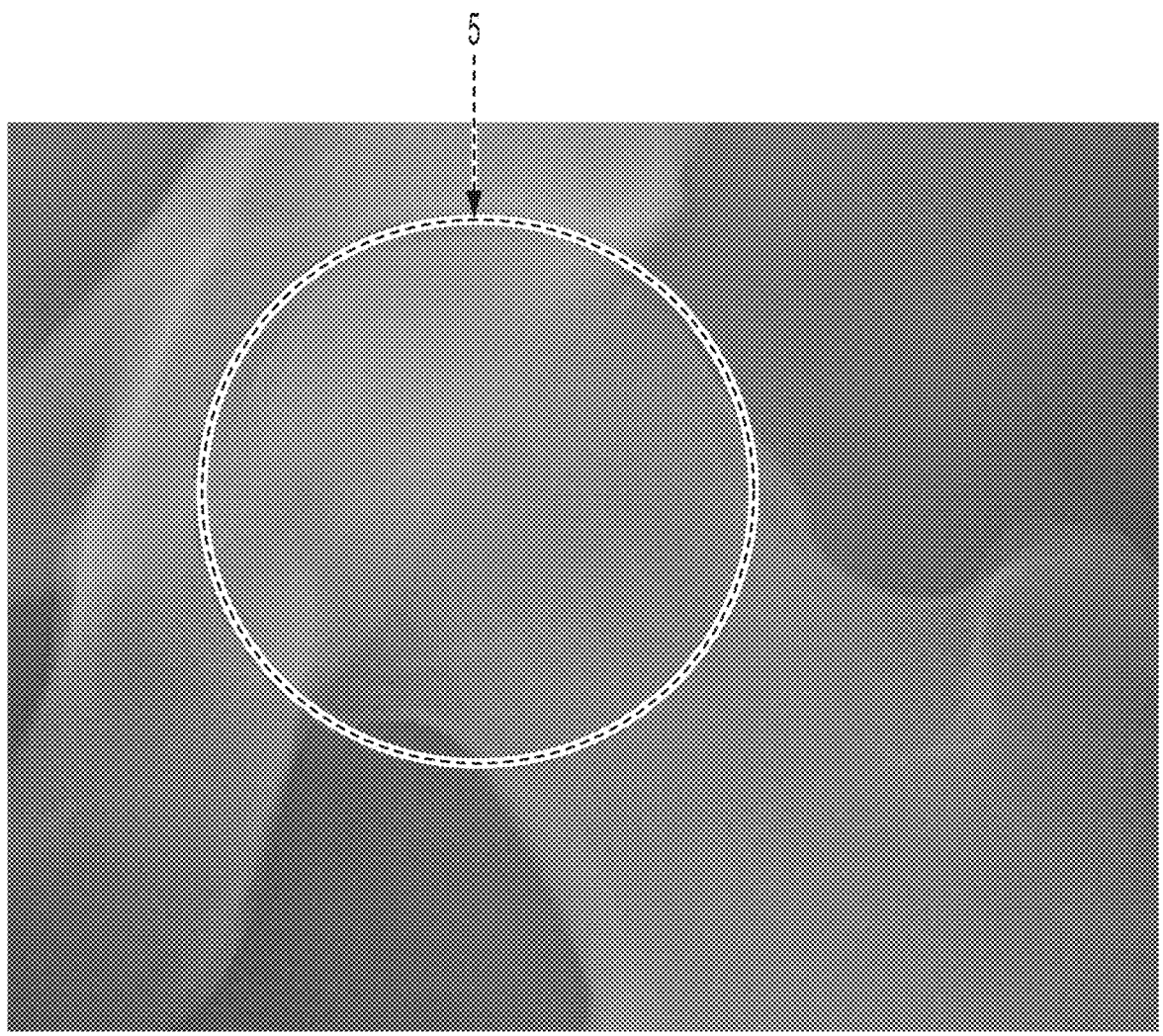
FIG. 33B is a schematic view showing estimation of the femoral head.

The simplest method to find the femoral head is to use a Hough transform, looking for circles. These circles are limited in the range of the smallest and largest possible femoral heads. The Hough transform produces a list of possible answers and the best possible answer is selected. This method works well in high quality images, although it can fail in low quality images. For example, see FIG. 33B, which shows circle 5 encircling the femoral head.

11B. Ray Tracing

One problem with the aforementioned Hough transform approach is that it is looking for circles that perfectly overlap with edges in the X-ray image. In some cases, there is almost no perfect circle in the X-ray image, especially with poor image quality and a large cam pathology.

Therefore, in another approach, a center point is picked, and then computer visual guidance system 125 starts tracing along lines looking for edges between the minimum and maximum possible radii (which correlates to the smallest and largest possible femoral head). In this approach, computer visual guidance system 125 selects the point that has the strongest edge in each ray, and then checks to see if these points end up in a circle. Then another point is selected, and the process is repeated. This is done iteratively until the best point is found, using previous points as a guide for where to look next.

This approach can be further improved in the following ways:
- perform a radial blur at each point before running edge detection—this will obscure hard edges that are not circles;
- look for strong edges, and check their gradients to see if they are dark→light (femoral head) or light→dark (acetabulum); and
- look for partial circles, rather than full circles—the correct outline of the femoral head will not have an edge where the femoral neck connects to the femoral head.

11C. Active Shape Modeling (ASM)

Figure 34:
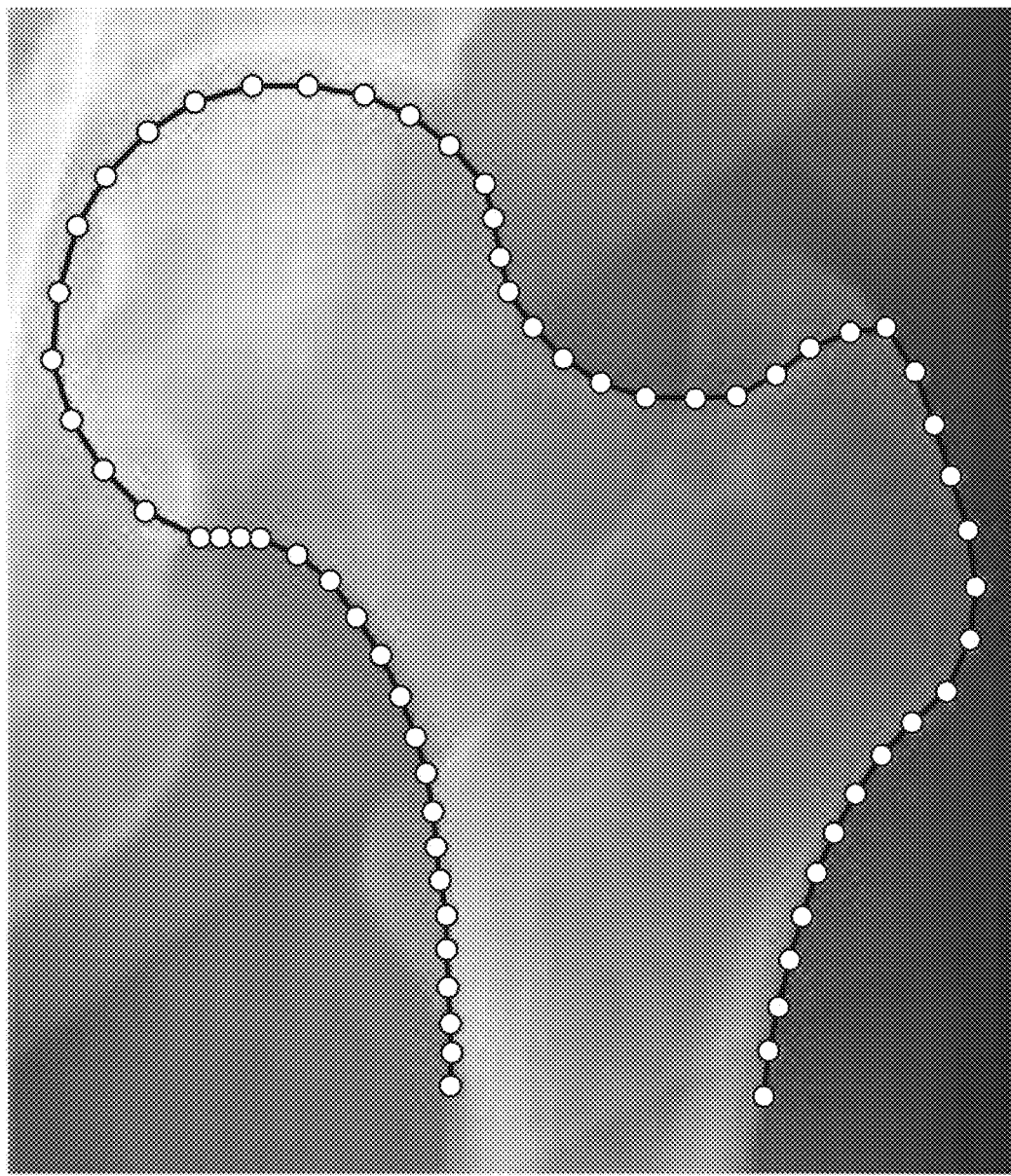
FIG. 34 is a schematic view showing another way for finding the femoral head.

In Active Shape Modeling (ASM), computer visual guidance system 125 is trained with hundreds (or thousands) of hip X-ray images, where dozens of specific locations are selected around the profile of the femoral head. Then computer visual guidance system 125 is presented with a new X-ray image and a "good guess" as to where the femur is in that image. This "good guess" does not have to be highly accurate, it simply needs to be in the right ballpark. Step 7 (providing clues where to start) may be completed for this approach to be used. Once computer visual guidance system 125 has the image and the "good guess" of where to start, the ASM process will overlay a set of points in the shape of a femur and then work to reduce the error between the set of points and the strong edges in the image. See FIG. 34. Once the ASM process is completed by the computer visual guidance system, one can just select the specific points from the femur and calculate a best-fit circle for the femoral head.

Step 12 According to Various Embodiments: Finding the Femoral Neck and its Mid-Line In some embodiments, the next step comprises finding the femoral neck and its mid-line. There are multiple ways to find the femoral neck and its mid-line as illustrated in the examples below.

12A. Box Sweep

It is generally easier to find the femoral neck once the femoral head has been identified. With the Box Sweep method, computer visual guidance system 125 sweeps a box around the femoral head (where the box has its mid-line passing through the center of the femoral head) and looks to see if the sides of that box line up with the edges of the femoral neck (edge detection is used to identify the edges of the femoral neck). This is repeated for boxes of multiple sizes. The box that lines up with the strongest edges of the femoral neck is chosen. The center of the box is then used to determine the mid-line of the femoral neck.

12B. Active Shape Modeling (ASM)

This approach works in a manner similar to how ASM is used to find the femoral head, except that one selects the points on the femoral neck, then determines a mid-line, and then finds the average location of those points to determine the mid-line of the femoral neck.

Step 13 According to Various Embodiments: Finding where the Femoral Head Stops being Round and the Cam Pathology Starts In some embodiments, the next step comprises finding where the femoral head stops being round and the cam pathology starts.

Figure 35:
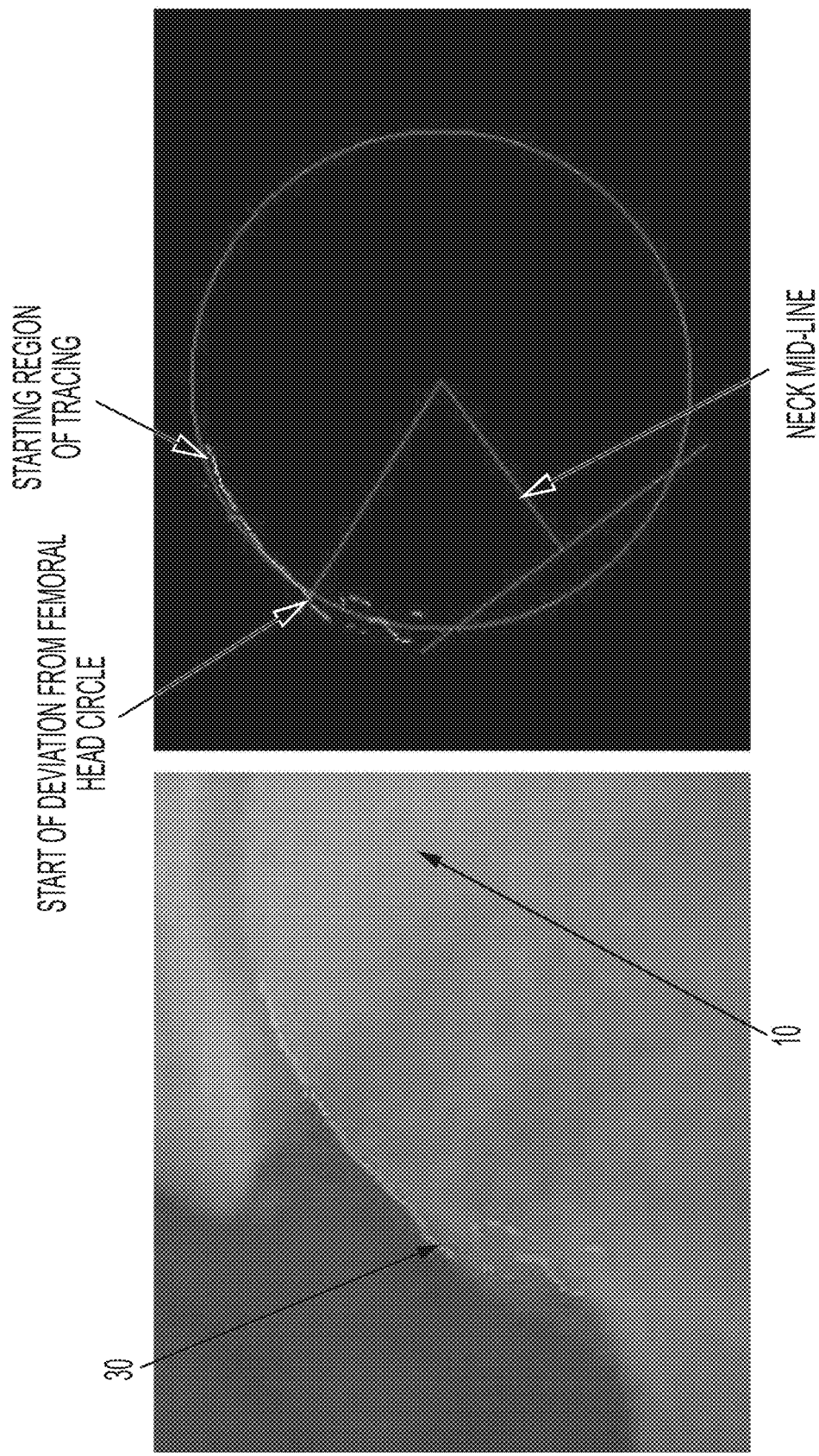
FIG. 35 is a schematic view showing one way for finding where the femoral neck stops being round and the cam legion starts.

For example, the strongest edges (e.g., as shown at 182 in FIG. 33A) of the bone surface are traced (e.g., using the results of edge detection) until a deviation from the circle around the femoral head is found. As the region of interest is known, the tracing does not need to include the entire femoral head but rather just the region of interest. In one embodiment, the region of interest starts at a location on the femoral head which is approximately 110 degrees from the femoral neck mid-line in the superior direction (in other words, for a right hip as shown in FIG. 35, between the 9 o'clock position and the 12 noon position). In identifying a deviation, a threshold level for the deviation can be used to ignore small deviations which may be a result of imperfections in edge detection rather than being the actual cam pathology. In one embodiment, the deviation threshold is a small percentage of the femoral head diameter, for example, 3-6% of the femoral head diameter, and more preferably 4% of the femoral head diameter. In another embodiment, the deviation threshold is a fixed value, for example, 0.5-2 mm, and more preferably 1 mm. In this embodiment, it is preferable to have calibrated the pixels of the image, so that the relative pixel size to the size of the anatomy is known. See FIG. 35.

Step 14 According to Various Embodiments: Measuring the Alpha Angle and Inputting the Target Alpha Angle In some embodiments, the next step comprises measuring the Alpha Angle.

Figure 36:
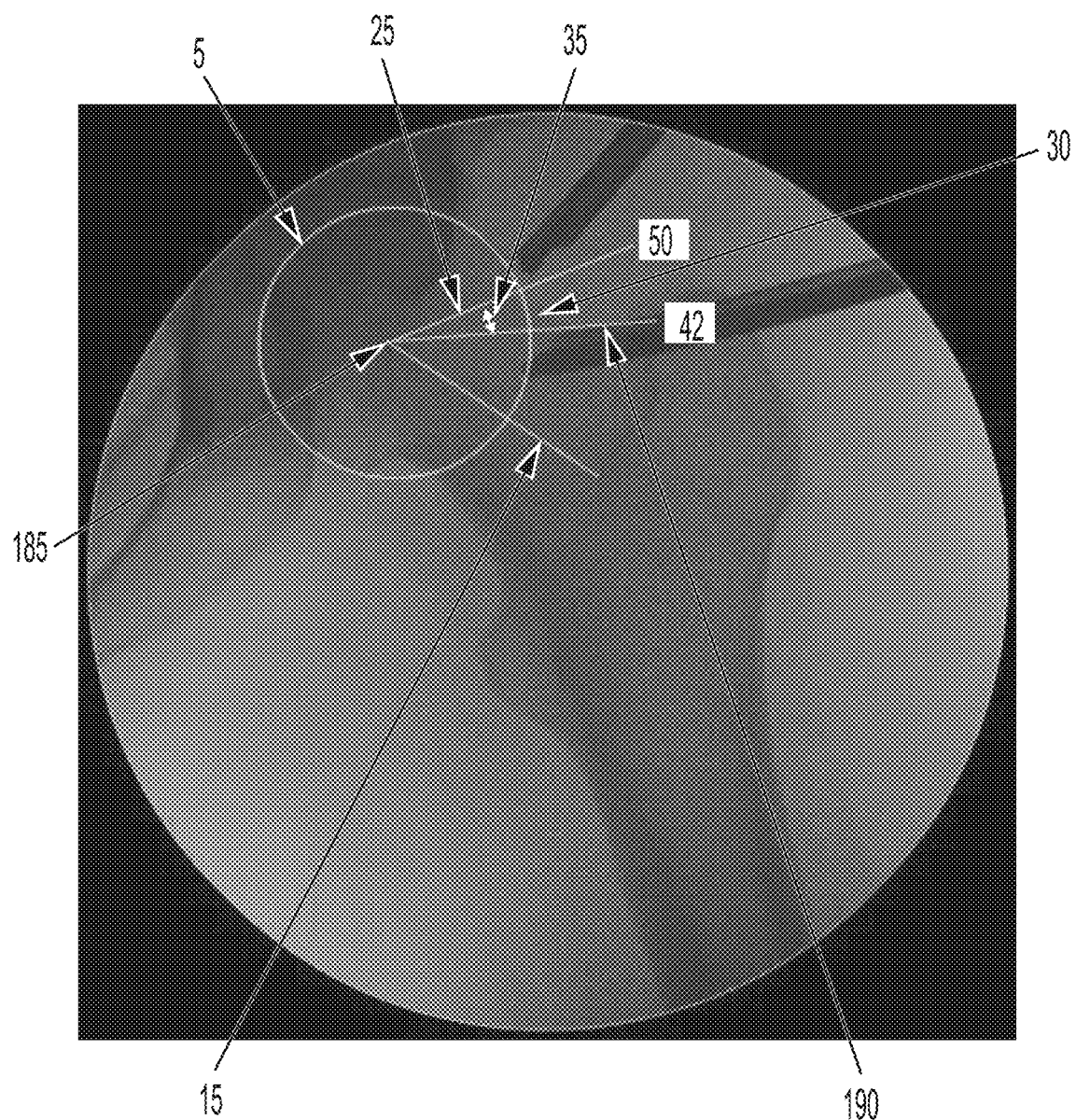
FIG. 36 is a schematic view showing one way of measuring the Alpha Angle and for drawing extra features on the X-ray image.

As illustrated in the example in FIG. 36, the Alpha Angle 35 is calculated as the angle between these image features:
- the center line 15 of the femoral neck;
- the center point 185 of the femoral head; and
- the location of the start of the cam pathology 30 at the femoral head/neck junction.

In other words, the Alpha Angle is the angle measured between (i) the line 15 originating at the center of the femoral head and extending along the center of the femoral neck, and (ii) the line 25 originating at the center of the femoral head and passing through the location at the start of the cam pathology.

This Alpha Angle can be annotated onto the X-ray image, as shown in FIG. 36, along with circle 5 enscribing the femoral head and line 15 showing the center of the femoral neck, and this annotated X-ray image can be presented to the surgeon on computer visual guidance system 125 or monitor 110.

The surgeon may also find it useful to know the size of the cam pathology by way of the angle subtended between the Alpha Angle and the target Alpha Angle (i.e., the desired Alpha Angle). The target Alpha Angle is established, either with input from the surgeon or another source. The computer visual guidance system 125 then displays the target Alpha Angle (line 190 in FIG. 36). The greater the difference between the current Alpha Angle line 25 and the target Alpha Angle line 190, the larger the cam pathology and hence more bone removal is required. See FIG. 36, where the target Alpha Angle of 42 degrees is presented as line 190 on the X-ray image, along with the actual Alpha Angle line 25, circle 5 enscribing the femoral head, and line 15 showing the center of the femoral neck.

Step 15 According to Various Embodiments: Computing the Resection Curve

Figure 37:
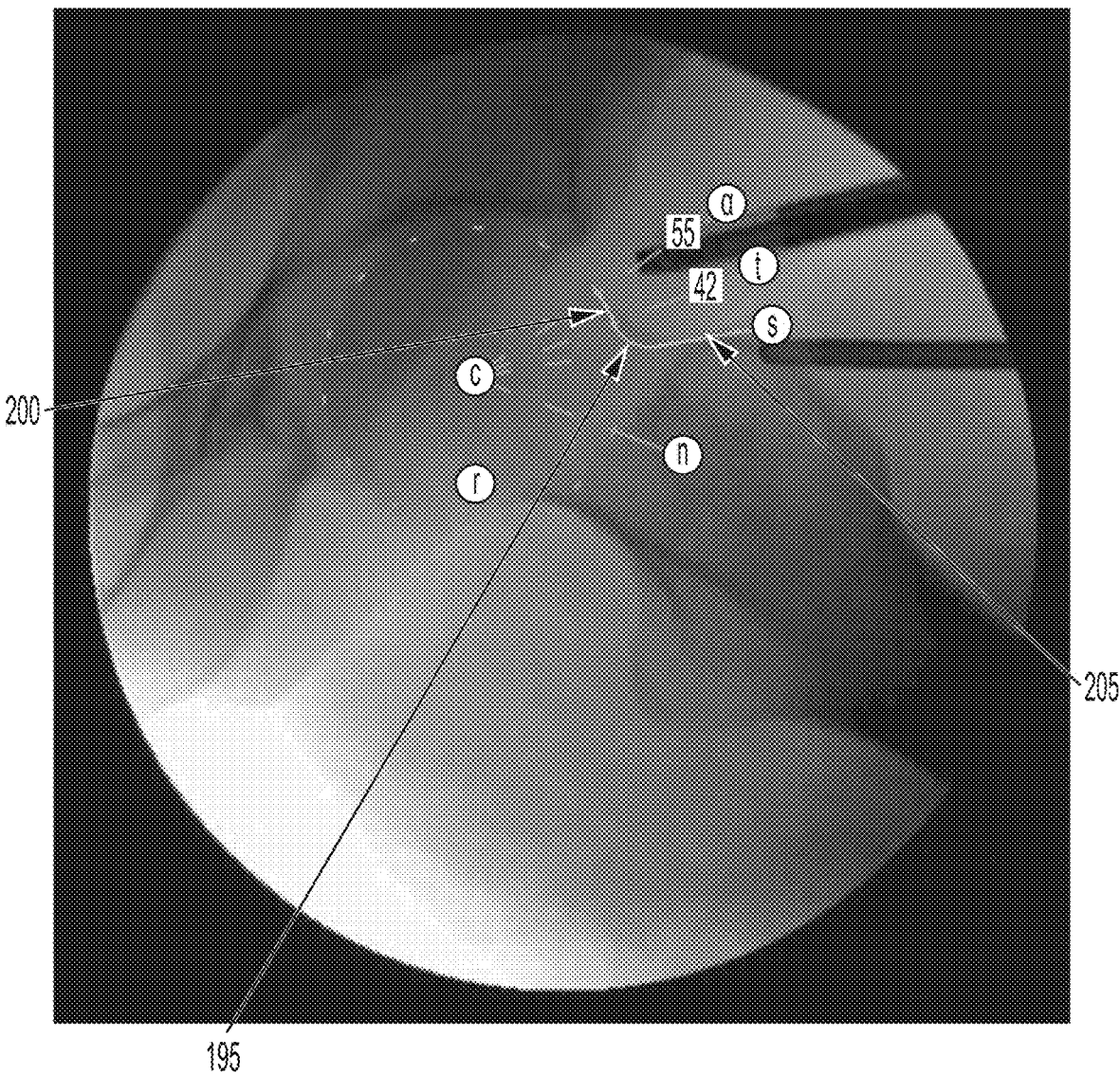
FIG. 37 is a schematic view showing the resection curve for treating cam-type femoroacetabular impingement.

Referring to FIG. 37, the resection curve 195 comprises a first resection curve 200 adjacent to the femoral head, and a second resection curve 205 adjacent to the femoral neck.

First resection curve 200 starts at the Alpha Angle Line 25 and ends at the target Alpha Angle line 190. Note that first resection curve 200 is simply the continuation of the circle of the femoral head.

Second resection curve 205 starts at the end of first resection curve 200 (i.e., at the target Alpha Angle line 190) and extends down the neck. In some embodiments, second resection curve 205 may be concatenated to the end of first resection curve 200 so as to produce the overall resection curve 195. In some embodiments first resection curve 200 may comprise one or more curves and/or one or more lines, and/or may be referred to as a "resection curve portion" or simply a "portion." In some embodiments, second resection curve 205 may comprise one or more curves and/or one or more lines, and/or may be referred to as a "resection curve portion" or simply a "portion." In cases where the actual alpha angle is smaller than the target alpha angle, first resection curve 200 ends at the intersection of the actual alpha angle and the circle.

Figure 38:
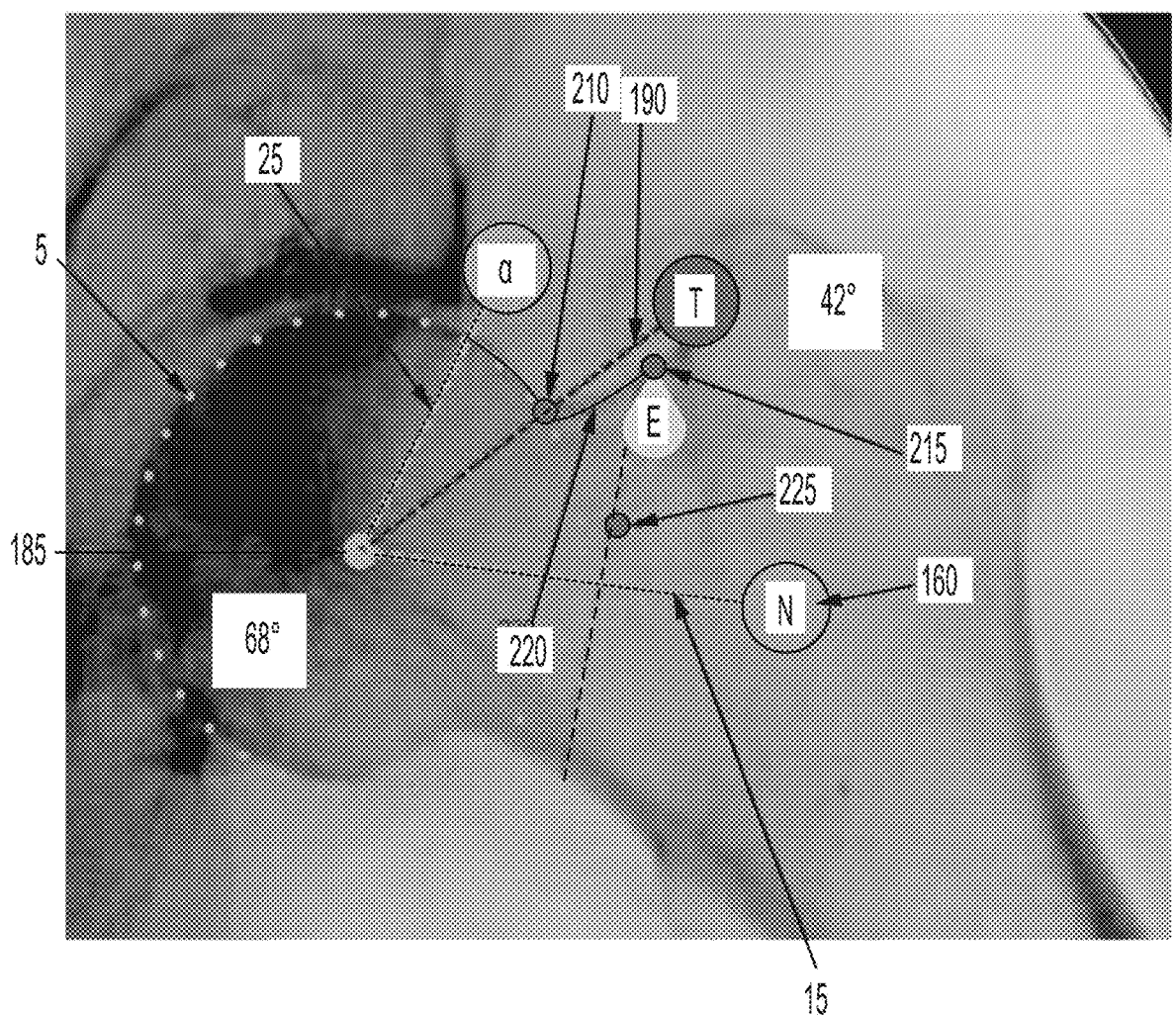
FIG. 38 is a schematic view showing another way of drawing extra features on the X-ray image.

In some embodiments, second resection curve 205 is calculated as follows. First, and with reference to FIG. 38, the start point 210 and end point 215 of second resection curve 205 are found. As illustrated in FIG. 38, start point 210 is the point at which target Alpha Angle line 190 intersects the femoral head circle. Note that start point 210 is also the endpoint of first section curve 200. In some embodiments, end point 215 is found by determining the shortest distance between femoral neck hint 160 and the femoral neck boundary (edge): where this shortest line intersects the edge of the femoral neck defines end point 215. In some embodiments, end point 215 is on the edge of the femoral neck at its narrowest point. Then a spline 220 is generated, using start point 210, end point 215 and a control point 225 for spline 220. Note that spline 220 is second resection curve 205. The beginning of the second resection curve 205 can be tangent to the circle 5. Control point 225 for spline 220 may be generated in a variety of ways. By way of example but not limitation, control point 225 may be obtained by studying a set of "normal" patient anatomies and determining an appropriate control point for a given start point 210 and a given endpoint 215 in order to provide a spline approximating a normal anatomy. In some embodiments, control point 225 may be obtained by polling a group of experts to determine an appropriate control point for a given start point 210 and a given endpoint 215 in order to provide a spline approximating a normal anatomy. In some embodiments, control point 225 may be obtained on a line extending tangent to the end of first resection curve 200 a distance that is proportional to the radius of the femoral head. In some embodiments, after start point 210, end point 215 and control point 225 have been determined, spline 220 (i.e., second resection curve 205) is generated and displayed with the X-ray image. In some embodiments, spline 220 is a Bezier curve.

15A. Resection Curves Accounting for Endospherical Femoral Heads and Exospherical Femoral Heads According to various embodiments, resection curves can be generated that account for whether the portion of the femoral head planned for resection deviates inwardly or outwardly from the general spherical shape of the femoral head. The inventors discovered that, at least for some embodiments, better resection curves may be generated by factoring in these two different morphology types, which are referred to herein as endospherical and exospherical. Thus, in some embodiments, resection curves may be generated that account for endospherical and exospherical patient anatomy.

Endospherical anatomy refers to a femoral head in which one or more portions of the outer surface of the femoral head are located inside the best-fit circle (e.g., circle 5) for the femoral head. For example, in FIG. 50, a portion 514 of the femoral head is within the best-fit circle 508. In some embodiments, a femoral head may be termed endospherical when a portion of the outer surface of the femoral head is located more than a threshold distance inside the best-fit circle. In some embodiments, the threshold distance may be a predetermined absolute distance, or it may be a predetermined percentage of the diameter of the best-fit circle.

Exospherical anatomy refers to a femoral head in which one or more portions of the outer surface of the femoral head are located outside the best-fit circle (e.g., circle 5) for the femoral head; most CAM type bony pathology is exospherical. For example, in FIG. 51 a portion 5102 of the femoral head is outside the best-fit circle 5104. In some embodiments, a femoral head may be termed exospherical when a portion of the outer surface of the femoral head is located more than a threshold distance outside the best-fit circle. In some embodiments, the threshold distance may be a predetermined absolute distance, or it may be a predetermined percentage of the diameter of the best-fit circle.

As discussed elsewhere herein, a resection curve (e.g., resection curve 195) may in some embodiments be placed such that a point defining an end of a first portion of the resection curve (e.g., resection curve 200) is aligned with the best-fit circle for the femoral head, such as point 210 aligned with circle 5 in FIG. 38. However, a curve defined according to such a point may not be ideal for a patient with an endospherical femoral head, or for a patient with a combination of both endospherical and exospherical femoral head.

Figure 50:
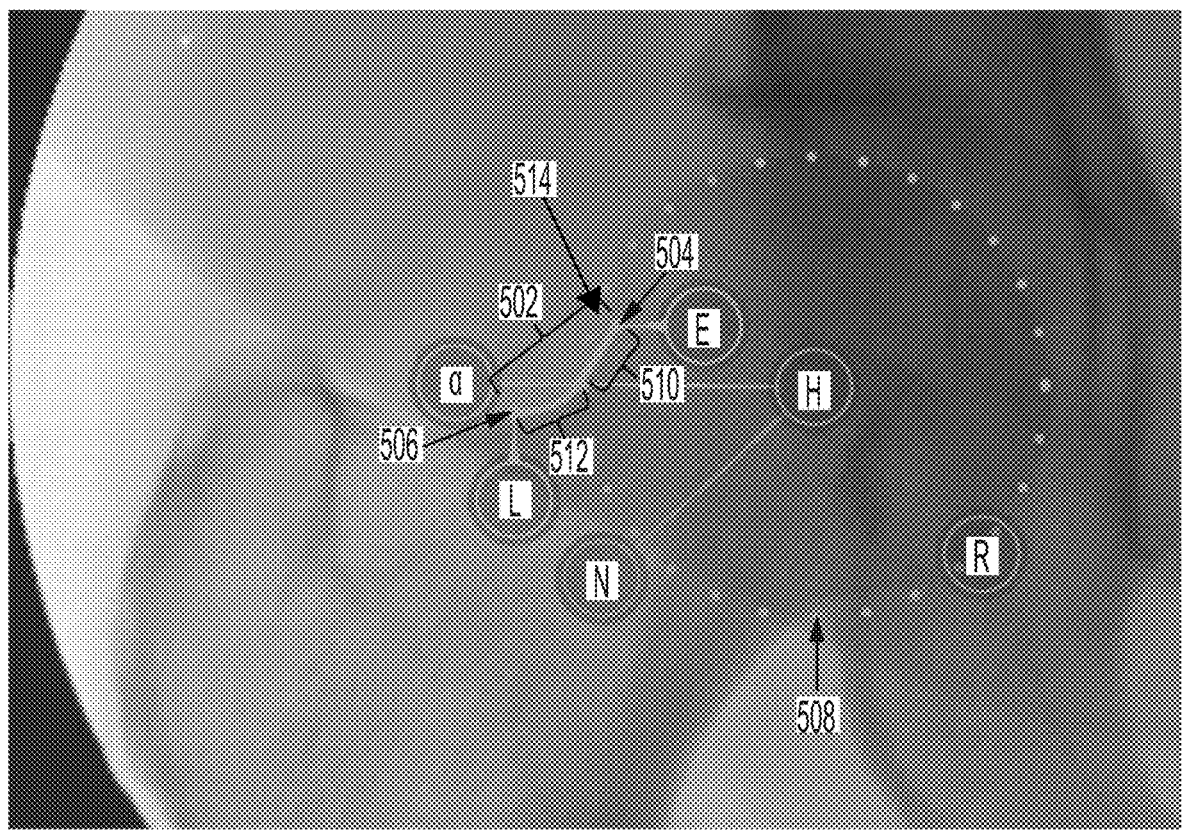
FIG. 50 is a schematic view showing a resection curve overlaid on an X-ray image of an endospherical femoral head, in accordance with some embodiments.

For endospherical femoral heads, a resection curve may be defined in accordance with an inner point that aligns with the most endospherical point of the femoral head (e.g., aligns with the point of the femoral head surface that is furthest inside the best-fit circle). Thus, a resection curve for a patient with an endospherical femoral head may comprise (a) a first resection curve portion beginning at the inner point and ending at the intersection of the best-fit circle and target alpha angle line (wherein that intersection point may be referred to as a "target point"), and (b) a second resection curve portion beginning at the end of the first resection curve portion and ending on the femoral neck. The first resection curve portion may comprise a line (e.g., as shown in FIG. 50) and/or a curve or arc, including a spline. The second resection curve portion may comprise an arc, line or spline. The second resection curve portion may comprise a Bezier spline. The Bezier spline may, in some embodiments, be tangent to (e.g., aligned with) the adjoining portion of the first resection curve portion.

For example, FIG. 50 shows a schematic view showing a resection curve overlaid on an X-ray image of an endospherical femoral head, in accordance with some embodiments. As shown, resection curve 502 extends from the point labeled "E" and the point labeled "L." The point labeled "E" corresponds to inner point 504, which is the most endospherical point on the femoral head. The point labeled "L" is a point 506 on the surface of the femoral neck. Notably, inner point 504 is located inside best-fit circle 508, rather than aligned with best-fit circle 508, such that first resection curve portion 510 extends inside best-fit circle 508. In cases where the alpha angle is smaller than the target alpha angle, first resection curve portion 510 may end at the intersection of the Alpha Angle and the best-fit circle 508. Second resection curve portion 512 joins to and aligns tangent with first resection curve 510 at the point at which the target Alpha Angle (or actual Alpha Angle in cases where the actual Alpha Angle is smaller than the target Alpha Angle) intersects best-fit circle 508. Second resection curve portion 512 continues as a Bezier spline to point 506. Point 506 may be determined as previously described (e.g. narrowest point of femoral neck, etc.). The control point for the Bezier spline may be determined as previously described (e.g. polling experts, groups of normal patient anatomy normalized, etc.)

For exospherical femoral heads and/or femoral heads that are not endospherical (e.g., as described elsewhere herein), a resection curve may comprise (a) a first portion comprising an arc and (b) a second portion comprising a Bezier spline, the second portion starting at the point where the bone first deviates from the best-fit circle, going through the point where the best-fit circle intersects with the target Alpha Angle line (this intersection point may be called the "target point"), and ending on the femoral neck.

Figure 51:
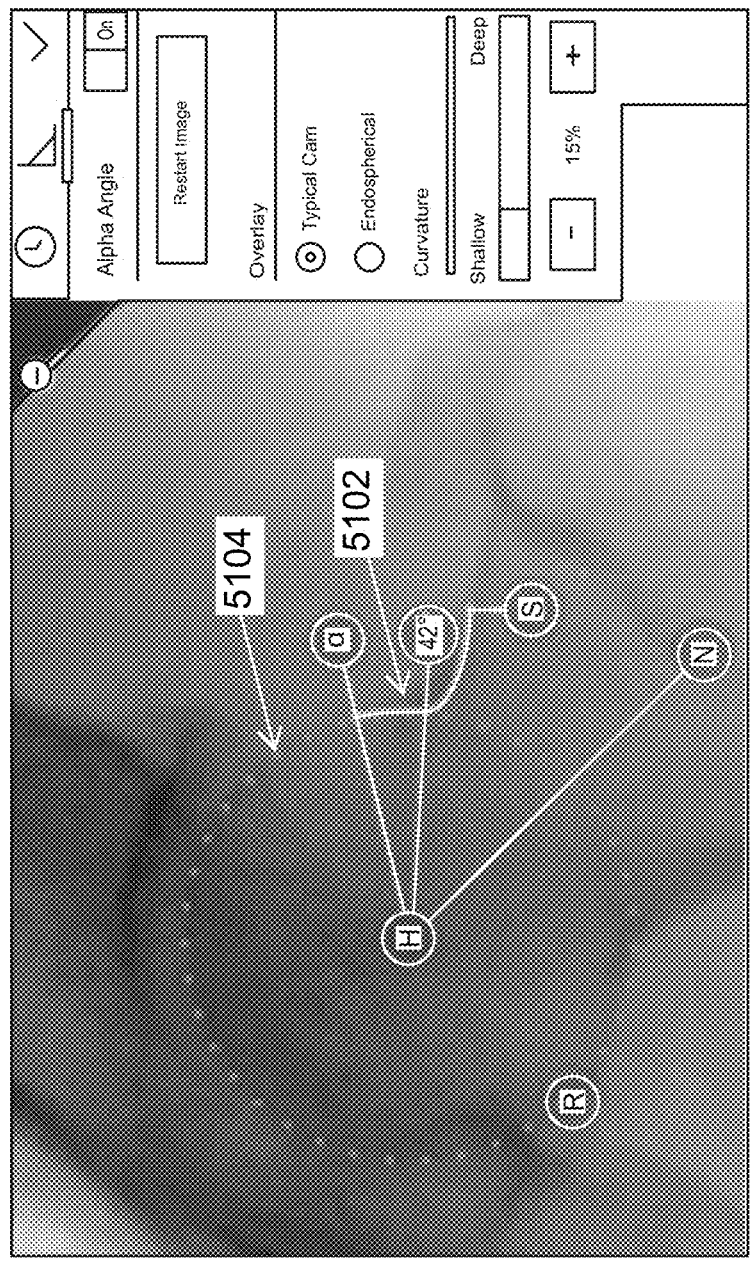
FIG. 51 is a schematic view showing a resection curve overlaid on an X-ray image of an exospherical femoral head, in accordance with some embodiments.

For example, FIG. 51 shows a schematic view showing a resection curve overlaid on an X-ray image of an exospherical femoral head, in accordance with some embodiments. This resection curve is consistent with the resection curves explained elsewhere herein for femoral heads that are not endospherical. Note the femoral head portion that is located outside the best-fit circle and above the target alpha angle line (depicted at 42 deg. in FIG. 51); this defines the femoral head portion to be removed to create a more normal femoral head shape. As shown, the first portion of the resection curve comprises an arc above the target alpha angle line, the arc aligning with the best-fit circle, while the second portion of the resection curve comprises a Bezier spline that is tangent at its endpoint to the best-fit circle and extends down the femoral neck to the point indicated as 'S' in FIG. 51.

Both resection curves explained above (the endospherical curve and the exospherical curve) are novel in that they may provide a mathematically defined curvature for the resection of CAM bony pathology. The user is provided an option to modify the mathematically defined curvature by, for example, using a touch screen display. For example, the Bezier spline's control point may be adjusted by the user to allow for a more shallow or deep resection path along the second portion of the resection curve (e.g., the Bezier spline portion). The starting and ending points may also be adjusted by the user to modify how proximal/distal the resection curve is shown. The endospherical resection curve is novel in that placing the starting point of the curve at the most endospherical point of the patient's femoral head may provide a smooth transition in the resection path.

15B. Mathematical Modeling Based on Sample Anatomy to Determine a Resection Curve In some embodiments, a second resection curve portion, such as second resection curve 205 or second resection curve portion 512, may be calculated based at least in part on a mathematical model that may be generated based on a set of sample patient anatomies, which may be represented by anatomical measurement data and/or image data such as X-ray data. For example, a set of patient anatomies or patient population anatomies may be selected such that the anatomies represent a range of "normal" and/or "healthy" and/or "baseline" patient anatomies or patient population anatomies. In some embodiments, patient anatomies or patient population anatomies may be selected for inclusion in the set such that sufficient variation in shape and size is represented in the set. In some embodiments, patient anatomies or patient population anatomies may be selected for inclusion in the set without regard to specific characteristics of the patient anatomies (e.g., an entire corpus of patient anatomy data may be used without manual human selection of a subset of the preexisting corpus of data). One or more X-ray images for each anatomy included in the set may be obtained and stored.

Based at least in part on the X-ray images in the set, a mathematical model may be created that represents characteristics of healthy patient anatomy. The mathematical model may be based specifically in part on the femoral head and neck curvatures represented in the X-ray images of the anatomies in the set. The mathematical model may be configured to accept characteristics of a patient's anatomy as input, and to generate a resection curve for the patient as an output. In some embodiments, the characteristics of the patient's anatomy that may be accepted as input by the mathematical model may comprise: femoral head radius; femoral neck width; endospherical femoral head shape; exospherical femoral head shape; distance from the femoral neck center to the target Alpha Angle; and/or angle formed from the points (a) femoral neck width upper point, (b) head center, and (c) and femoral neck width lower point. In some embodiments, the generated output may comprise an end point, which should be placed somewhere on the femoral neck, and/or a depth/shallowness of a control point, which should be somewhere below the spline. In order to ensure that the end point is placed somewhere on the femoral neck, images may be tagged to define which area of the image depicts the femoral neck.

In some embodiments, the mathematical model may comprise a regression model.

In one example, a regression model was utilized as follows. Using the raw XY coordinates, 32 images of subjects were measured. On healthy anatomy, the overlay was adjusted to match the healthy anatomy as closely as possible. This included adjusting the target angle to match the actual alpha angle of that image. On femurs with cam pathology, the overlay was adjusted to align with a target alpha angle of 42 degrees. Using this regression, images were captured on a separate set of images that the regression was not trained on, and surgeons reviewed those captures to determine whether or not the overlays appeared acceptable. The unacceptable images were either those that that had femoral neck lengths that were too long, or those that had an endospherical femoral head, meaning that the femoral head dips inside the best fit circle as described above. To fix the endospherical issue, a second overlay was utilized. In the second overlay, there is a line instead of the arc. This line starts at the endospherical inner point (e.g., point 504 in FIG. 50) and ends at the target point (e.g., the point where the best-fit circle, such as circle 508 in FIG. 50, intersects with the target alpha angle line).

In another example, a regression model was generated as follows. Ninety-one images were selected as a data set, attempting in the selection to maximize variation in shape of the anatomy depicted in the images. To improve consistency and reduce variation, the target alpha angle was left at 42 on all images, whether or not that angle matched the anatomy in the image. A survey was used to determine whether the overlays appeared acceptable, while spline length was kept relatively consistent and of medium length. The images were tagged as endospherical or not endospherical. The spline control point for an exospherical femoral head was located along the line tangent to the end of first resection curve, at a distance from that end proportional to the radius of the femoral head. In some embodiments, a spline control point may be defined in a same or similar manner for endospherical femoral heads, and/or for femoral heads that are neither endospherical nor exospherical. The control point on endosperical hips was updated to align with the endospherical line (as discussed above). A regression equation was then generated in accordance with these images and parameters.

Following creation of the mathematical model, characteristics of the patient's anatomy may be determined from intra-operative images of the patient, and data representing the characteristics of the patient's anatomy may be supplied to the mathematical model as input. On the basis of this input, the mathematical model may then generate the second resection curve portion, such as second resection curve 205 or second resection curve portion 512, for the patient.

Generating Resection Curve Using Head-Neck Offset

An alternative measurement to the Alpha Angle measurement that can be used for diagnosing and treating a cam pathology is the head-neck offset. According to various embodiments, the computer visual guidance system 125 can be configured to provide a user with head-neck offset measurements and resection curves generated based on those measurements as an alternative to Alpha Angle based measurements and resection curve generation. In some embodiments, a user may switch between these two methods based on the user's preference.

Figure 58:
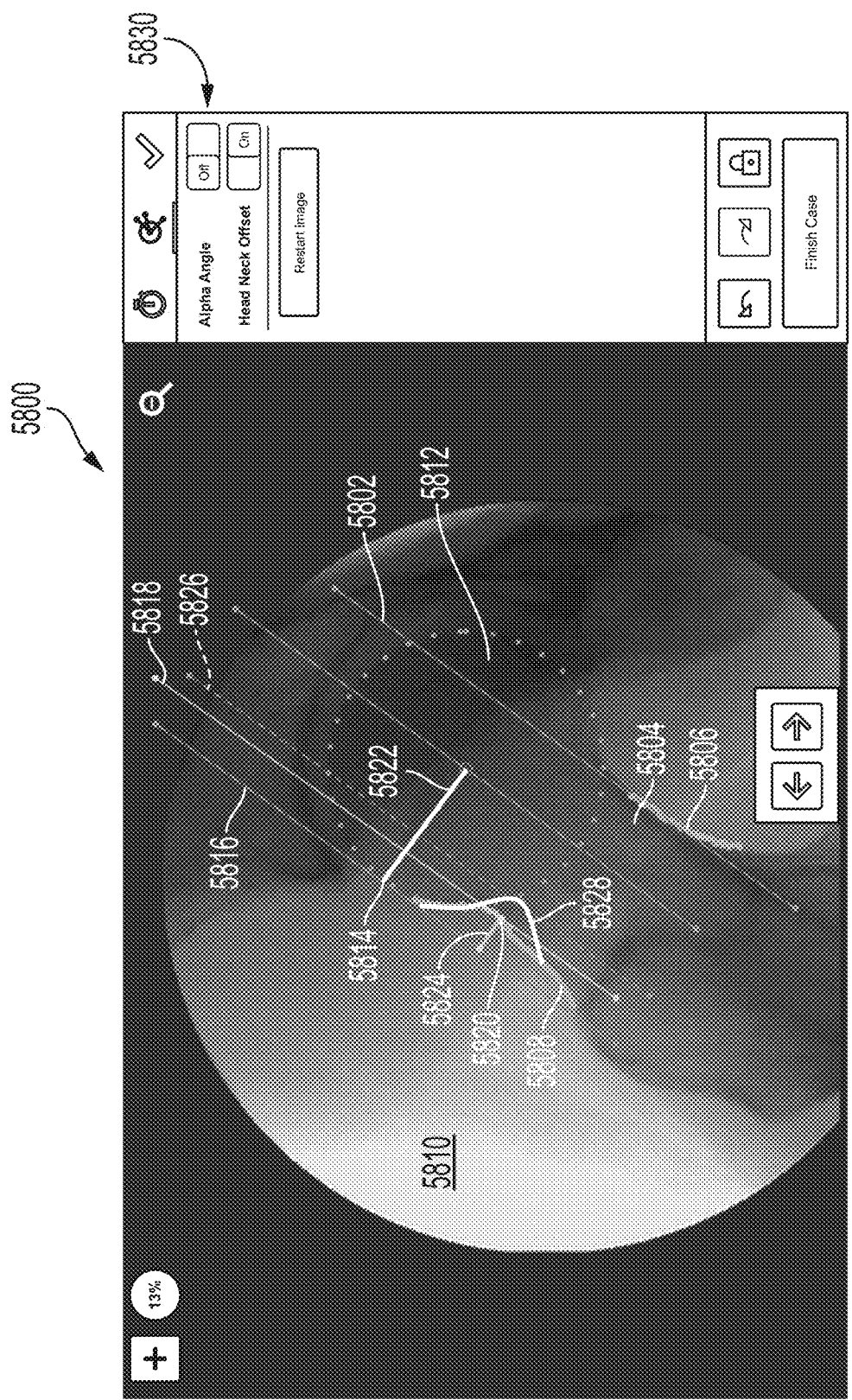
FIG. 58 is a graphical user interface for providing a user with a resection curve based on head-neck offset measurements, according to various embodiments.

FIG. 58 is a graphical user interface 5800 that can be generated by computer visual guidance system 125 for providing a user with head-neck offset measurements and a resection curve based on those measurements, according to various embodiments. With reference to FIG. 58, the system may be configured to determine the head-neck offset and head-neck offset based resection curve using the following steps.

In a first step for determining the head-neck offset, a line 5802 that extends along the lower edge 5806 of the femoral neck is estimated, such as by locating the lower edge 5806 in the X-ray image 5810 using any suitable edge detection method and creating a line that passes through a majority of points of the lower edge 5806. Next, two lines that are parallel to line 5602 are determined. A femoral head line 5816 that is parallel to the centerline 5802 and is tangent to the superior side of the femoral head 5812 (the point of tangency is indicated by reference numeral 5814) is determined, and a femoral neck line 5818 that is parallel to centerline 5802 and is tangent to a most-recessed point 5820 of the superior side of the femoral neck 5804 in the image. A neck measurement 5824 is taken from the femoral neck line 5818 to the femoral head line 5816, and the ratio of the neck measurement 5824 to the radius 5822 of the femoral head is the head-neck offset.

A head-neck offset that is too small may be associated with cam pathology and treatment of the cam pathology based on the head-neck offset measurement may include resecting the bone until the head-neck offset (as determined according to the steps above) is at or above a target head-neck offset. The target head-neck offset can be defined by a user or, such as based on measurements in non-pathologic joints (for example, from patient studies reported in literature). In some embodiments, a predefined target value may be adjustable by a user. An example of a target head-neck offset is 17%, which means that head-neck offsets below this number may be associated with a cam pathology.

In FIG. 58, the target head neck offset is shown by the dashed line 5826, which indicates where the most-recessed portion of the neck should be (i.e., wherein the femoral neck line 5818 should be) to achieve the target head-neck morphology. The measured head-neck offset in the illustrated example is 13%, as indicated in the top left of the user interface 5800. Since this value is below the target value (as represented by the target line 5826 being below the femoral neck line 5818) in this example, the head-neck area of the femur should be resected to achieve the target morphology.

The computer visual guidance system 125 may generate a resection curve 5828 based on the target head-neck offset to indicate how the bone should be resected to achieve the target head-neck offset. Generally, according to various embodiments, the resection curve is generated by following the perimeter of the femoral head down to the target line 5826 and then curving back up to align with the edge 5808 of the neck 5804.

According to various embodiments, the graphical user interface 5800 can include one or more user selectors 5830 for selecting between Alpha Angle based resection curve generation and head-neck ratio based resection curve generation. FIG. 58 is merely exemplary of various embodiments of graphical user interface 5800 and it should be understood that any of the visual indications overlaid on the X-ray image in FIG. 58 may be included or excluded, according to various embodiments. For example, in some embodiments, only the resection curve is provided in the overlay. In some embodiments, the features overlaid on the X-ray image 5810 can be user-adjusted. For example, a user may select the centerline 5802 and drag the centerline 5802 (such as via a touchscreen or mouse) to a location that the user determines to be closer to the center of the neck or the user could select and drag the target head-neck offset line 5818 to increase or decrease the depth of the resection curve. According to various embodiments, generation of the resection curve can be based on whether the femoral head is endospherical or exospherical, as discussed above.

Step 16 According to Various Embodiments. Measuring Depth of Resection

If desired, in some embodiments, the depth of resection (i.e., the thickness of bone to be removed) can also be measured and then displayed to the user, using the calibrations of pixel size previously conducted.

Step 17 According to Various Embodiments. Displaying Image Features

In some embodiments, and still looking now at FIG. 38, the following features are presented on the X-ray image:
circle 5 inscribing the femoral head;
centerpoint 185 of the circle inscribing the femoral head;
line 15 originating at the center of the femoral head and extending along the centerline of the femoral neck;
Alpha Angle line 25 originating at the center of the femoral head and passing through the location at the start of the cam pathology;
line 190 showing the target Alpha Angle; and
resection curve 195.

If desired, the numeric value of the Alpha Angle can be presented on the X-ray image (see, for example, FIG. 37 where the numeric value of "55" is placed on the X-ray image to show that the Alpha Angle is 50 degrees), and the numeric value of the target Alpha Angle can be presented on the X-ray image (see, for example, FIG. 37 where the numeric value "42" is placed on the X-ray image to show the target Alpha Angle is 42 degrees).

In some embodiments, one or more of the annotation features indicated above may be displayed with a color coding, or with other visual indicia (e.g., shading, hatching, pattern, line weight, etc.) indicating information to the user regarding the feature. For example, in some embodiments, Alpha Angle line 25 may be color coded according to the value of the Alpha Angle. Predefined angle ranges may be stored, for example, so that Alpha Angles with a value within a predefined "normal" range may be displayed in one color, whereas Alpha Angles with values outside predefined normal ranges may be displayed in one or more different colors, in some embodiments depending on the extent to which the Alpha Angle falls outside a normal range.

In some embodiments, the next step may comprise drawing extra features on the X-ray image.

17A. Ruler

Figure 39:
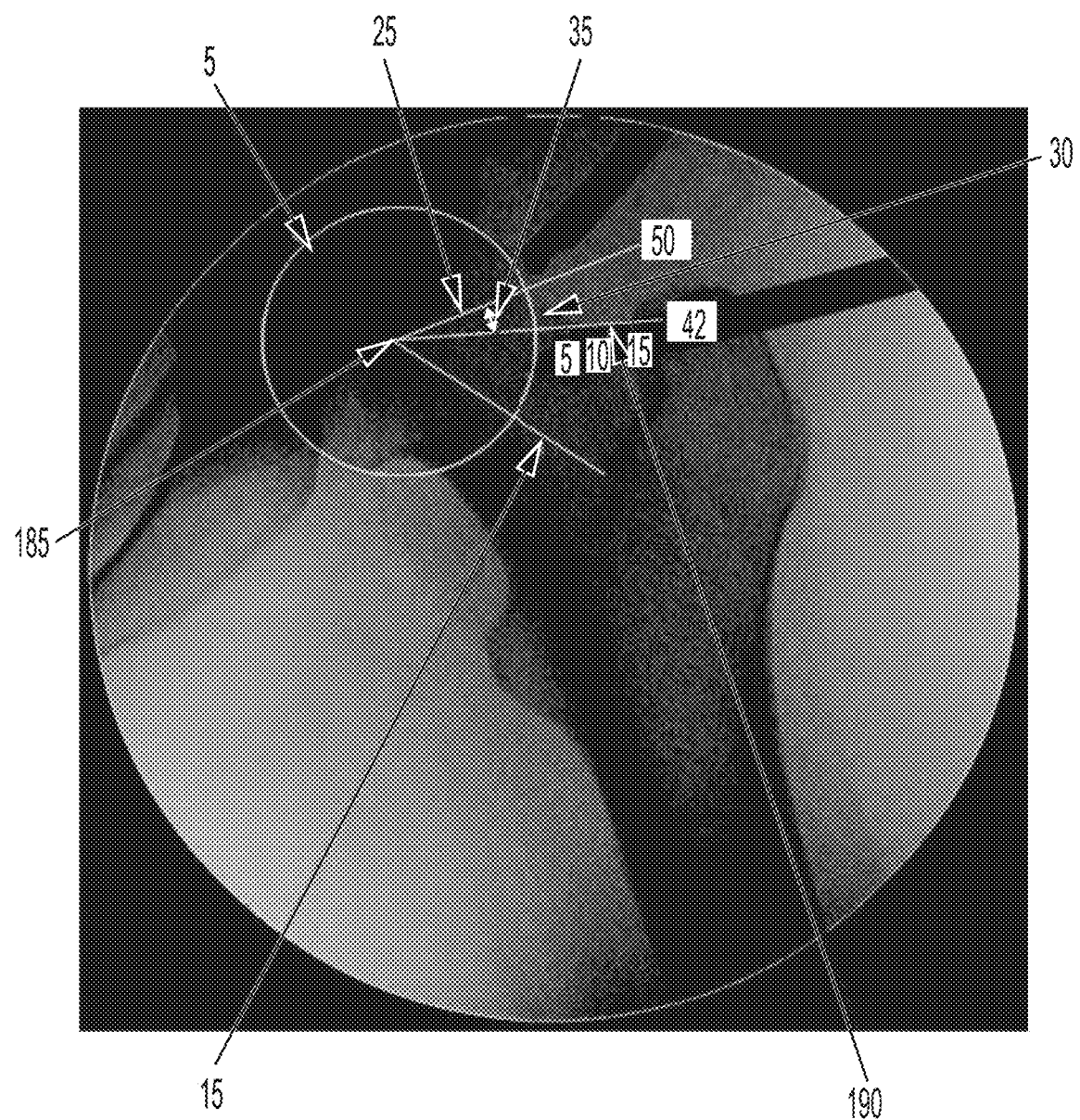
FIG. 39 is a schematic view showing one way of drawing extra features on the X-ray image.

Surgeons may desire to know the size of the cam pathology, so it can be useful to add a ruler to the image. Pixel calibration is needed for this feature, since the ruler needs to identify the "real-world" size of the cam pathology. In some embodiments, computer visual guidance system 125 is configured to draw the ruler just below the cam pathology, which will show the surgeon how much bone they have to remove. See FIG. 39.

17B. False Color 2D Cam Pathology

Figure 40:
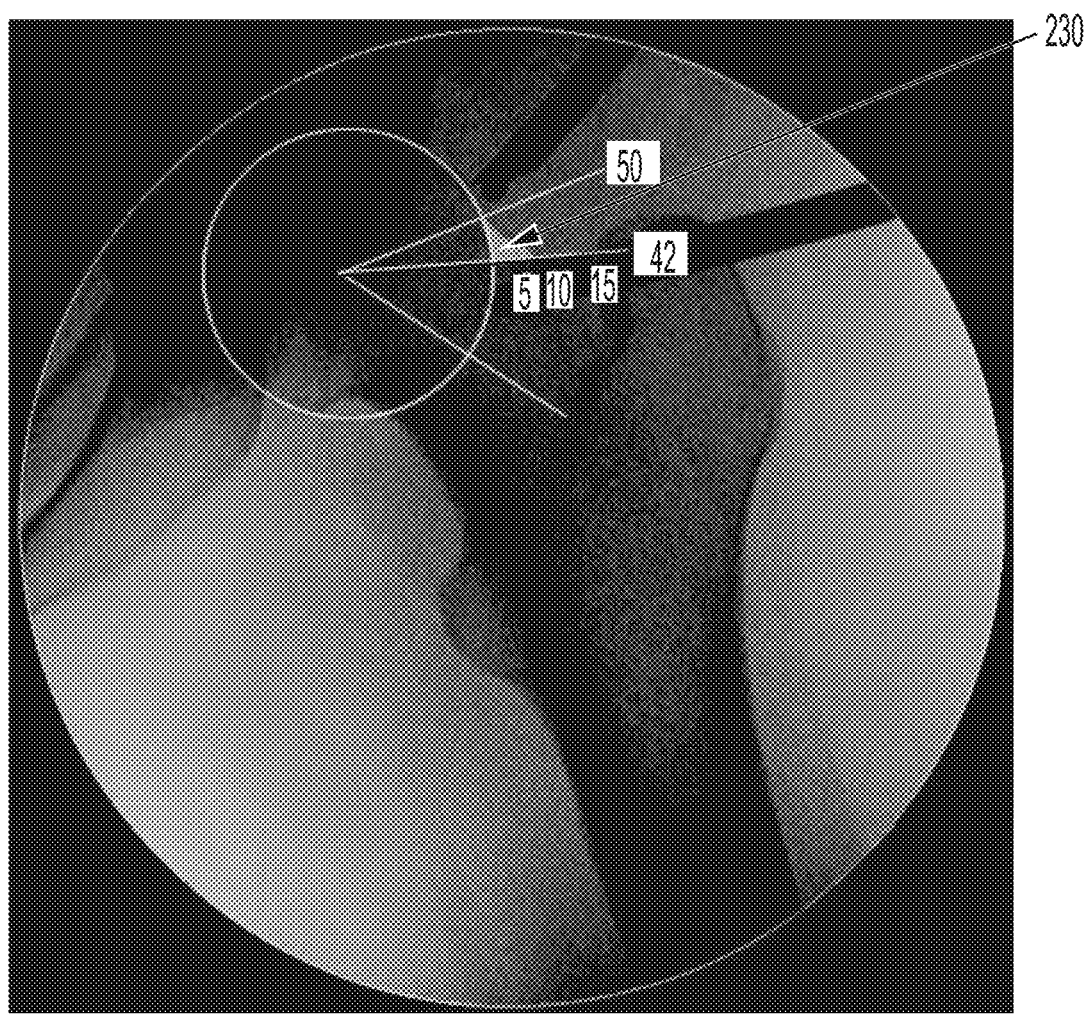
FIG. 40 is a schematic view showing another way of drawing extra features on the X-ray image.

When computer visual guidance system 125 draws the target line for the target Alpha Angle, computer visual guidance system 125 can add false color to the triangular region 230 (FIG. 40) denoting the cam pathology which is to be removed (i.e., the bone which is located between the start of the cam and the target Alpha Angle). Similarly, when computer visual guidance system 125 draws a resection line (for example, based on the Alpha Angle or based on the head-neck offset), the system 125 can add false color to the portion of the bone that is above the resection line denoting the cam pathology which is to be removed.

In some embodiments, multiple C-Arm images (e.g., with the C-arm manipulated through a number of planes) can be acquired and the computer system can generate the false color 3D cam pathology as a resulting set of false color 2D cam pathology images displayed at the same time for the surgeon.

Figure 41:
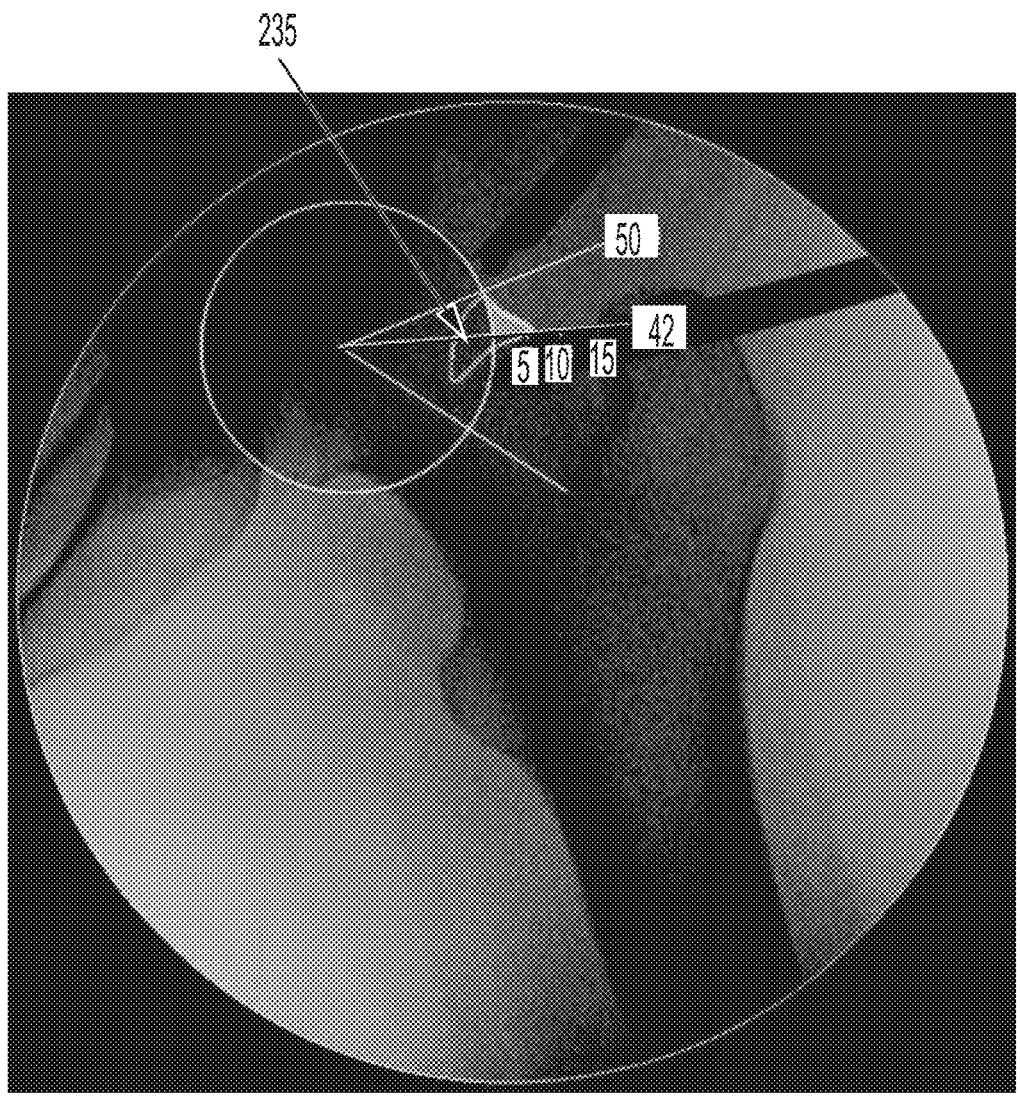
FIG. 41 is a schematic view showing another way of drawing extra features on the X-ray image.
Figure 42:
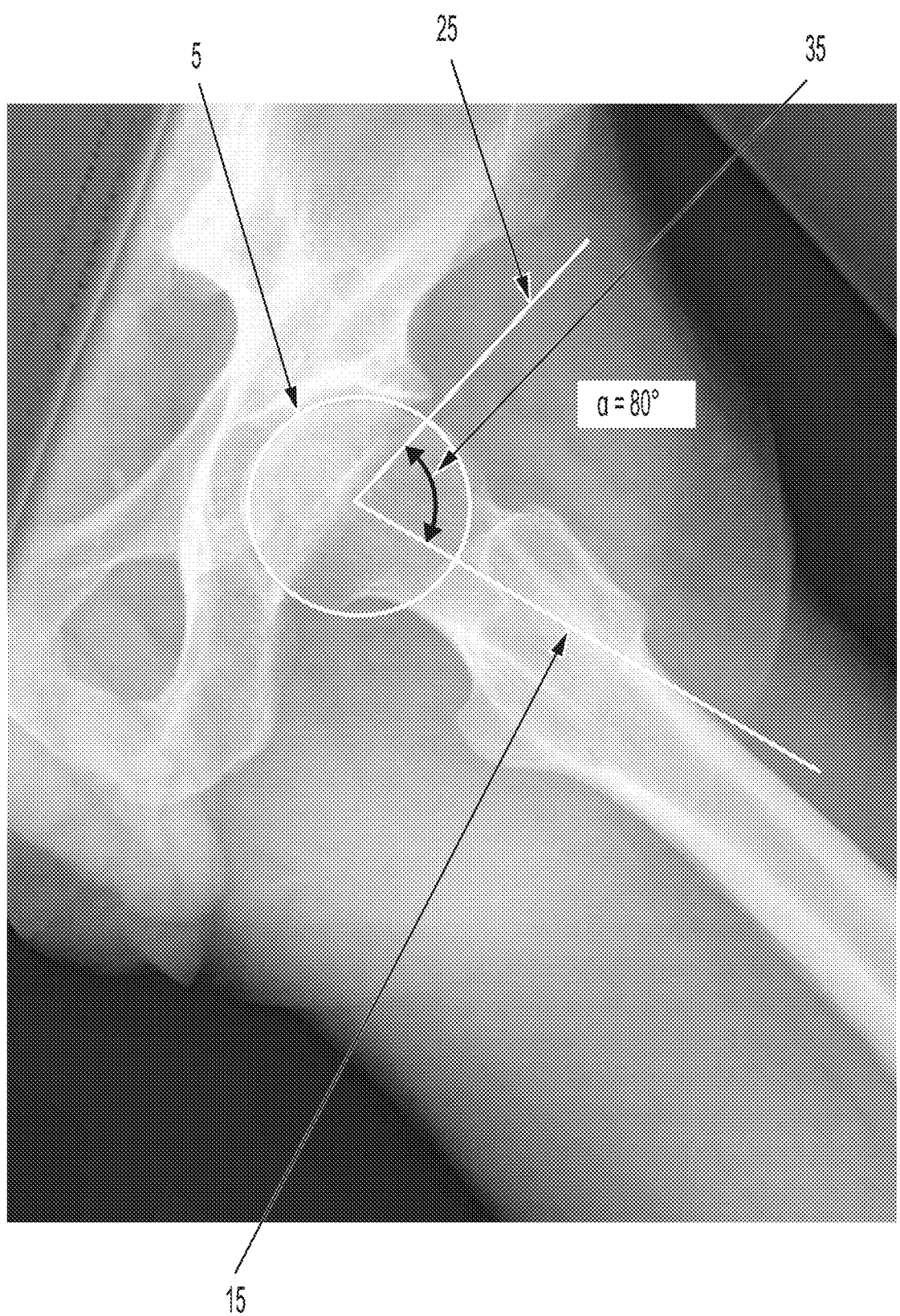
FIGS. 42-44 is a series of schematic views showing Alpha Angle recalculations to track progress during the resecting of a cam pathology.
Figure 43:
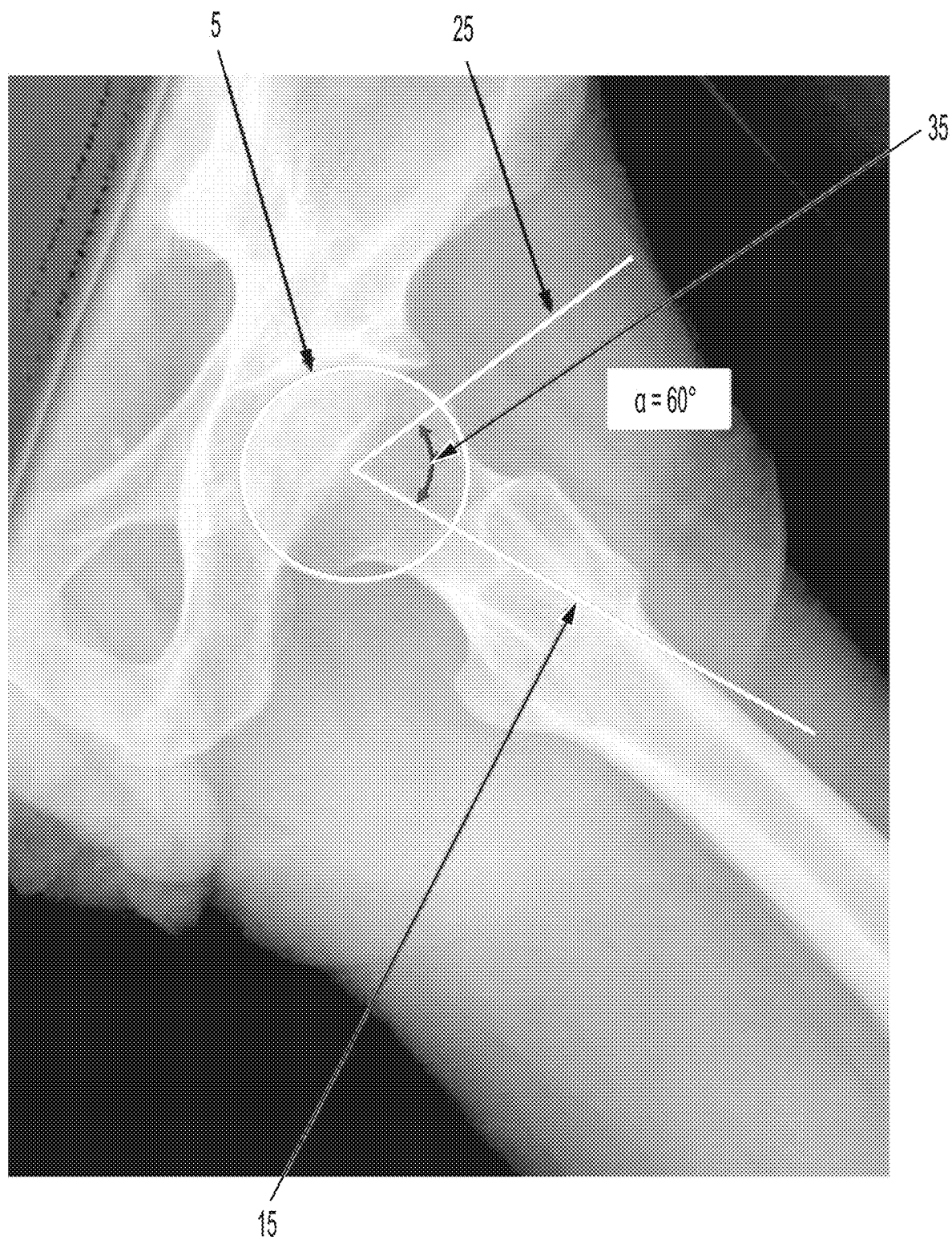
Figure 44:
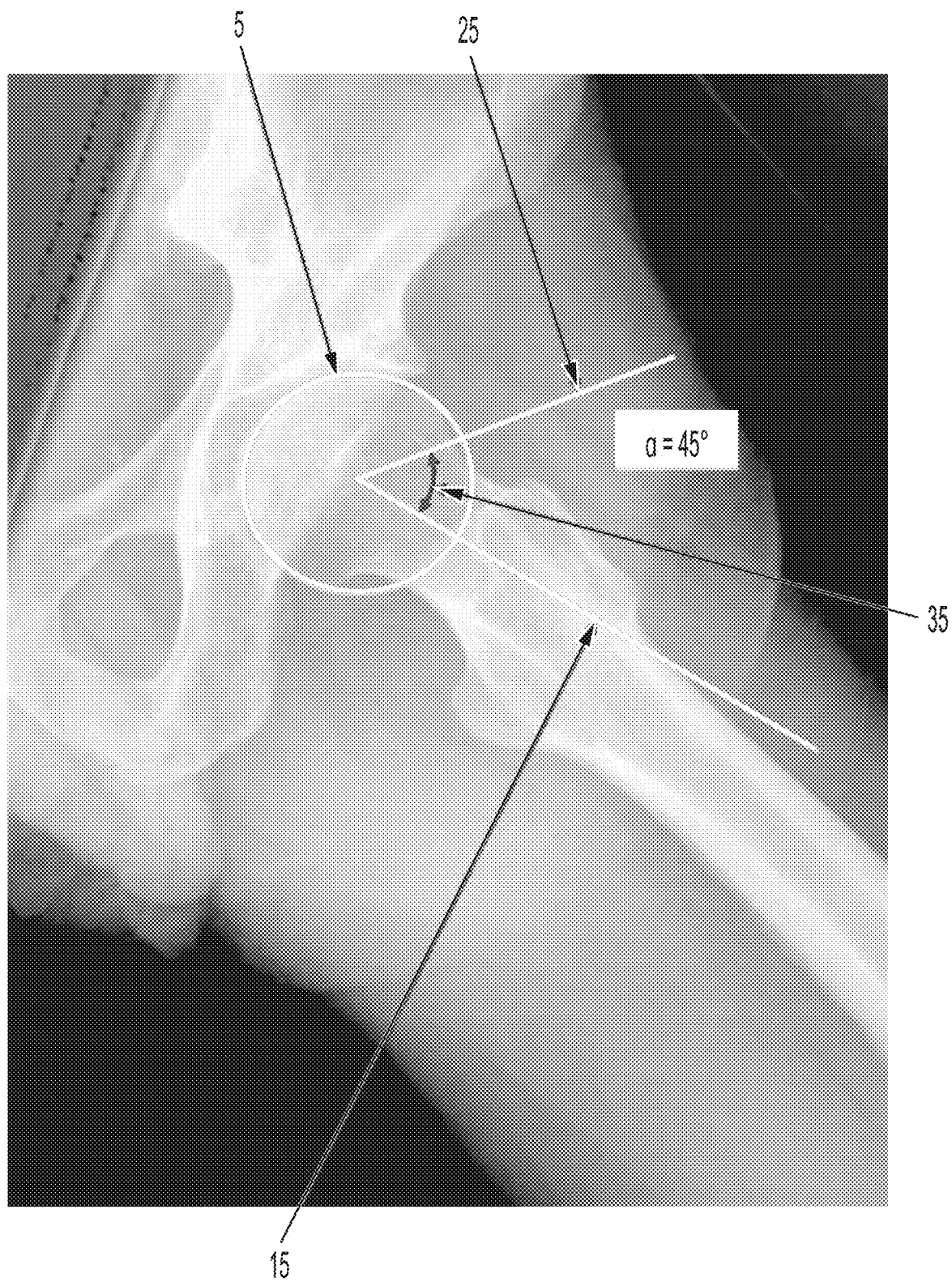
Figure 45:
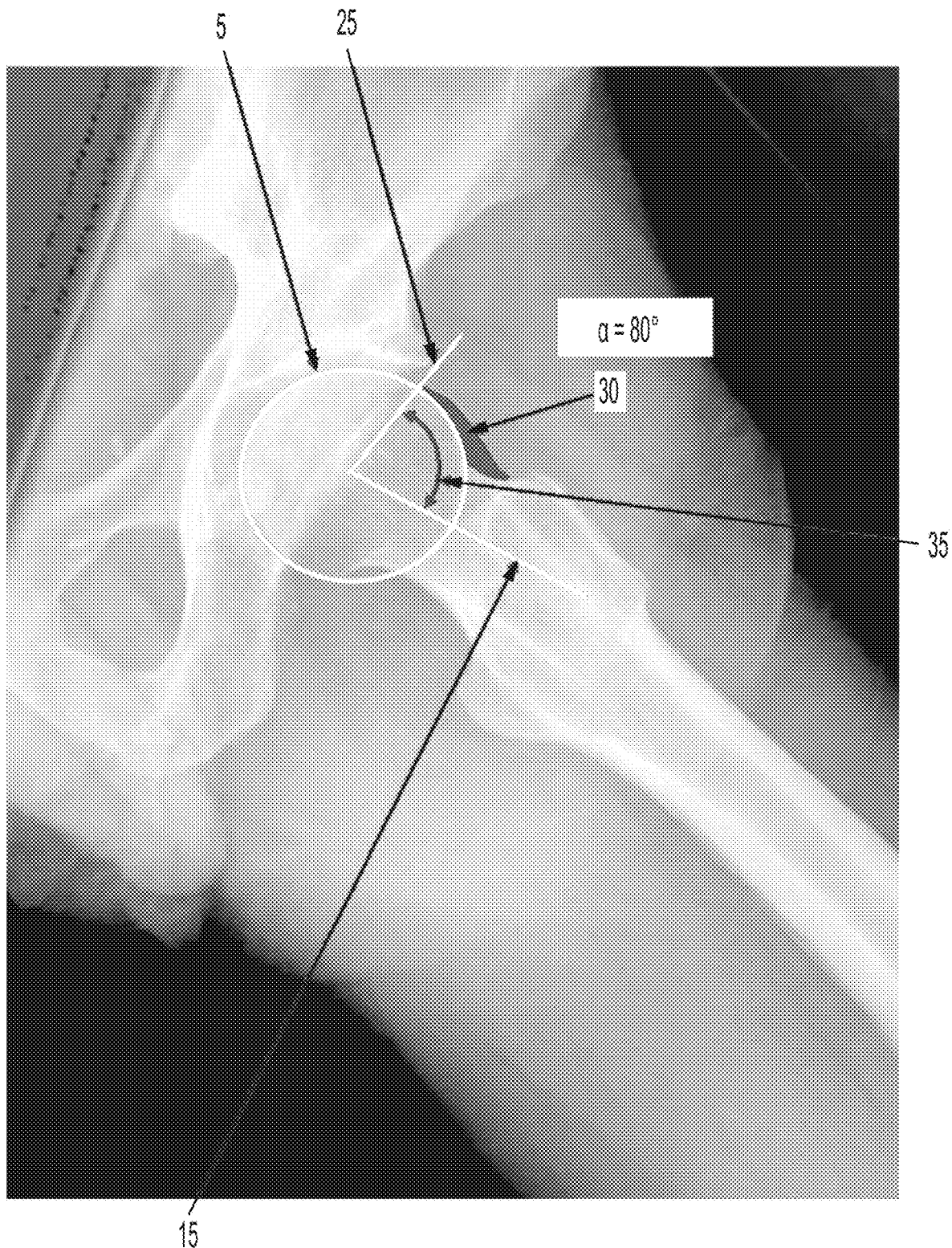
FIGS. 45-47 is a series of schematic views showing Alpha Angle recalculations to track progress during the resecting of a cam pathology.
Figure 46:
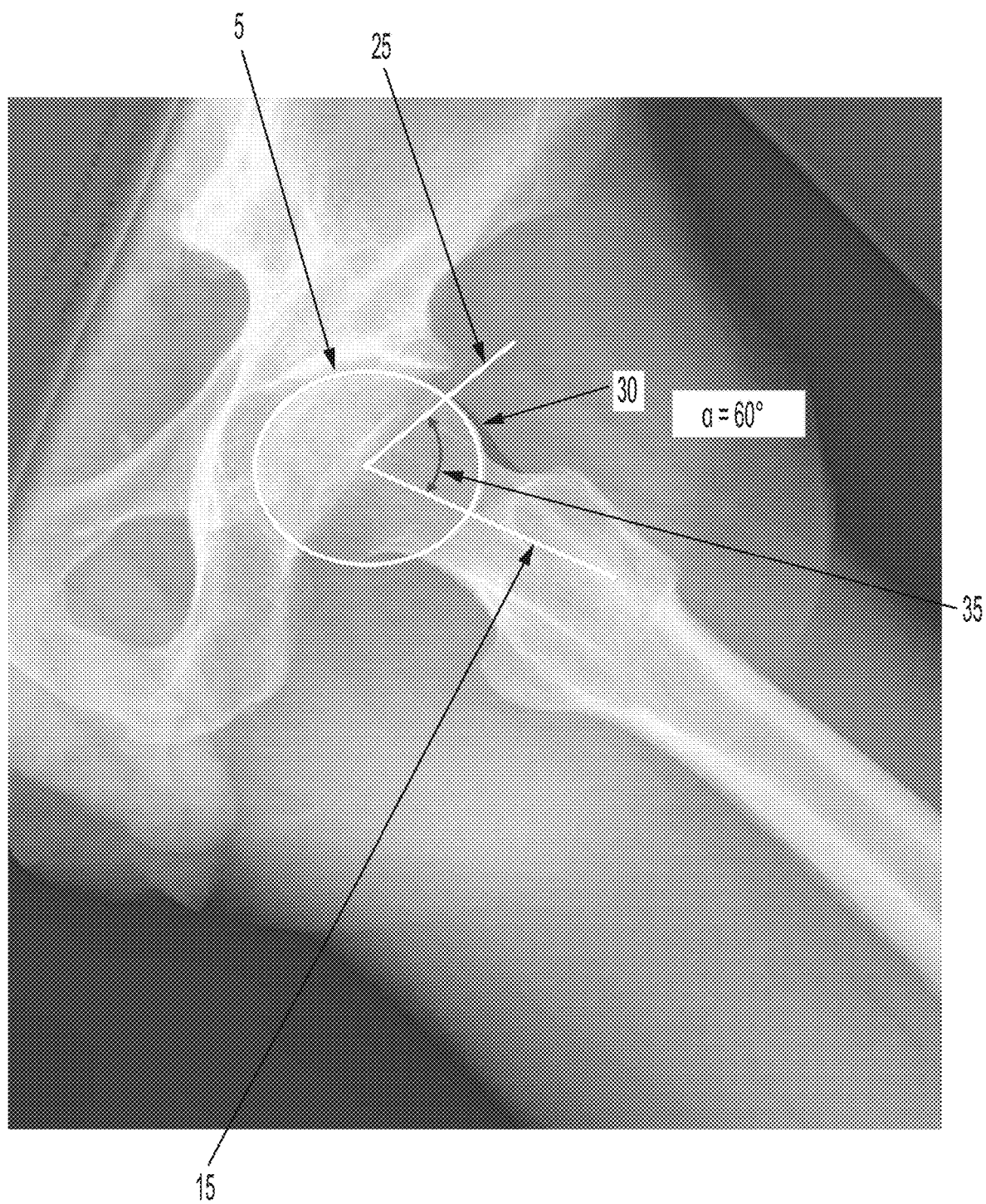
Figure 47:
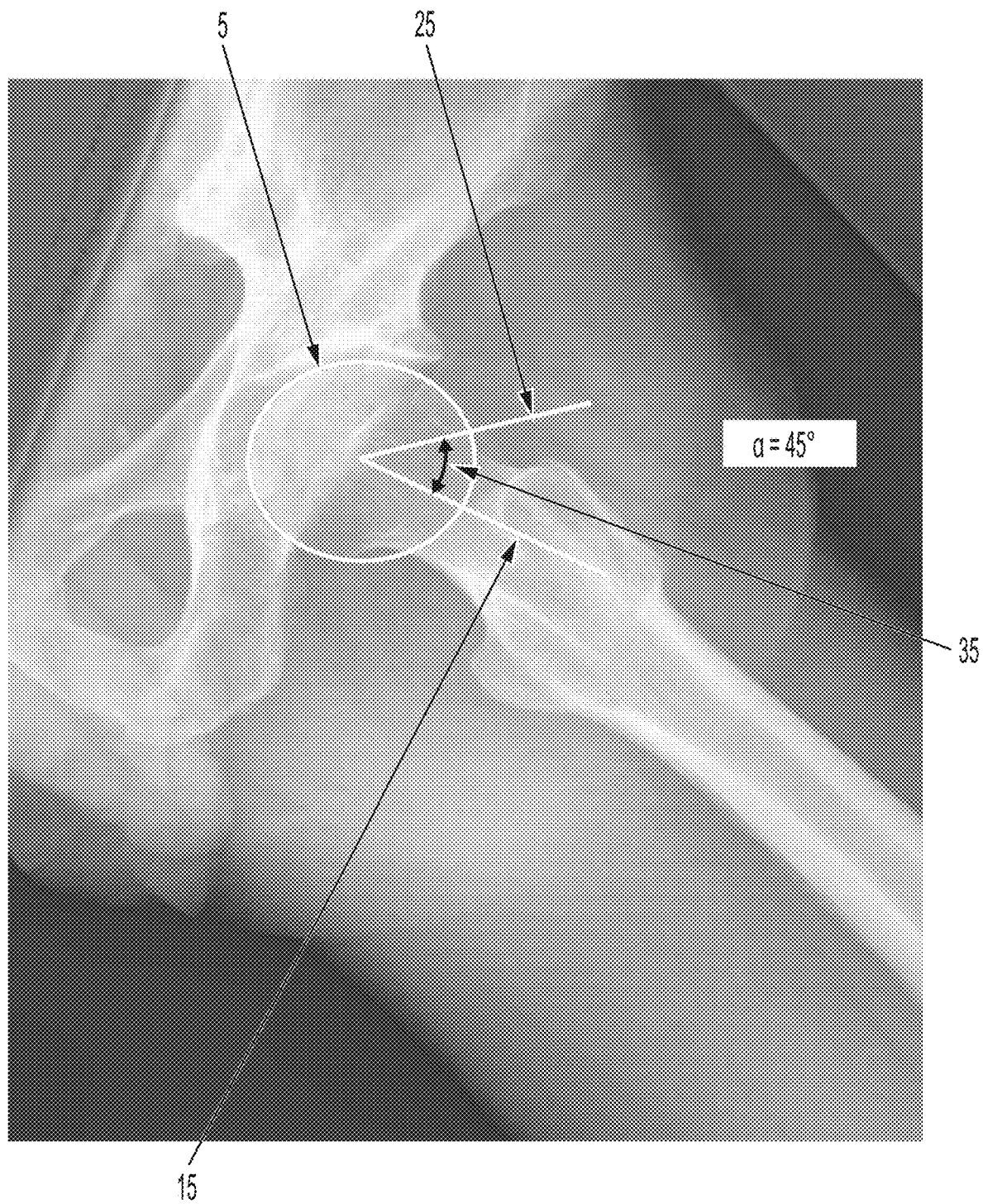

By way of example but not limitation, 2D images acquired intra-operatively by a C-arm X-ray machine 115 can be "merged" with one another so as to form a pseudo-3D model of the cam pathology. In this embodiment, C-arm X-ray machine 115 is oriented in multiple planes such that multiple 2D images of the cam pathology are acquired. Computer visual guidance system 125 then merges the acquired 2D images so as to form a partial 3D model of the cam pathology. In one form of this embodiment, a 2D outline 235 (FIG. 41) of the cam pathology is created with the 2D images. Once the images and corresponding outlines of the cam pathology are merged, a 3D representation of the cam pathology can be generated, for example, by geometric modeling of the outer surface of the cam pathology.

Step 18 According to Various Embodiments Adjustments

According to various embodiments, the surgeon can make adjustments to one or more parameters used to generate the annotations displayed to the user. For example, the surgeon can adjust the locations of the previously-determined femoral head, the previously-determined femoral neck, the previously-determined measured Alpha Angle, the previously-determined target Alpha Angle, the previously-determined resection curve start point, the previously-determined resection curve end point, the centerline for the head-neck offset measurement, the edge of the femoral head for the head-neck offset, the edge of the femoral neck for the head-neck offset measurement, the target head-neck offset, the angles of one or more lines used for determining head-neck offset, and/or any other parameter determined by the system based on the X-ray image. In various embodiments, the user can make one or more adjustments by simply dragging the graphical objects associated with any of respective parameters to a desired location using the annotated image displayed by computer visual guidance system 125 (e.g., the touchscreen of a tablet device). If the user does adjust one or more of these locations, computer visual guidance system 125 may automatically re-compute the anatomical measurements and resection curve by utilizing the user-specified locations in place of the automatically-calculated locations. Subsequent images that are processed may or may not take into account the user-specified location changes to improve the overall accuracy and robustness of the measurements and resection curve location. For example, if the user specifies a larger femoral head radius, the femoral head detection algorithm may give preference to a larger detected femoral head. Also, if the user manually adjusts the resection curve end point, subsequent processed images may also provide a resection end point that is closer to the user's manual modification, i.e., if the user moves the resection end point more proximal, then the following images might also place the resection end point more proximal than would be the case by default. A good method for retaining relative distances between images (with regard to how far proximal or distal relative to the femoral head) would be to retain distances relative to the size of the femoral head. For example, a distance of "1.5 times the femoral head radius" should be a relatively constant distance between processed images, regardless of changes in zooming and rotation of the femur (as the femoral head radius is approximately spherical and should retain a relatively constant radius regardless of how it is imaged).

Figure 57A:
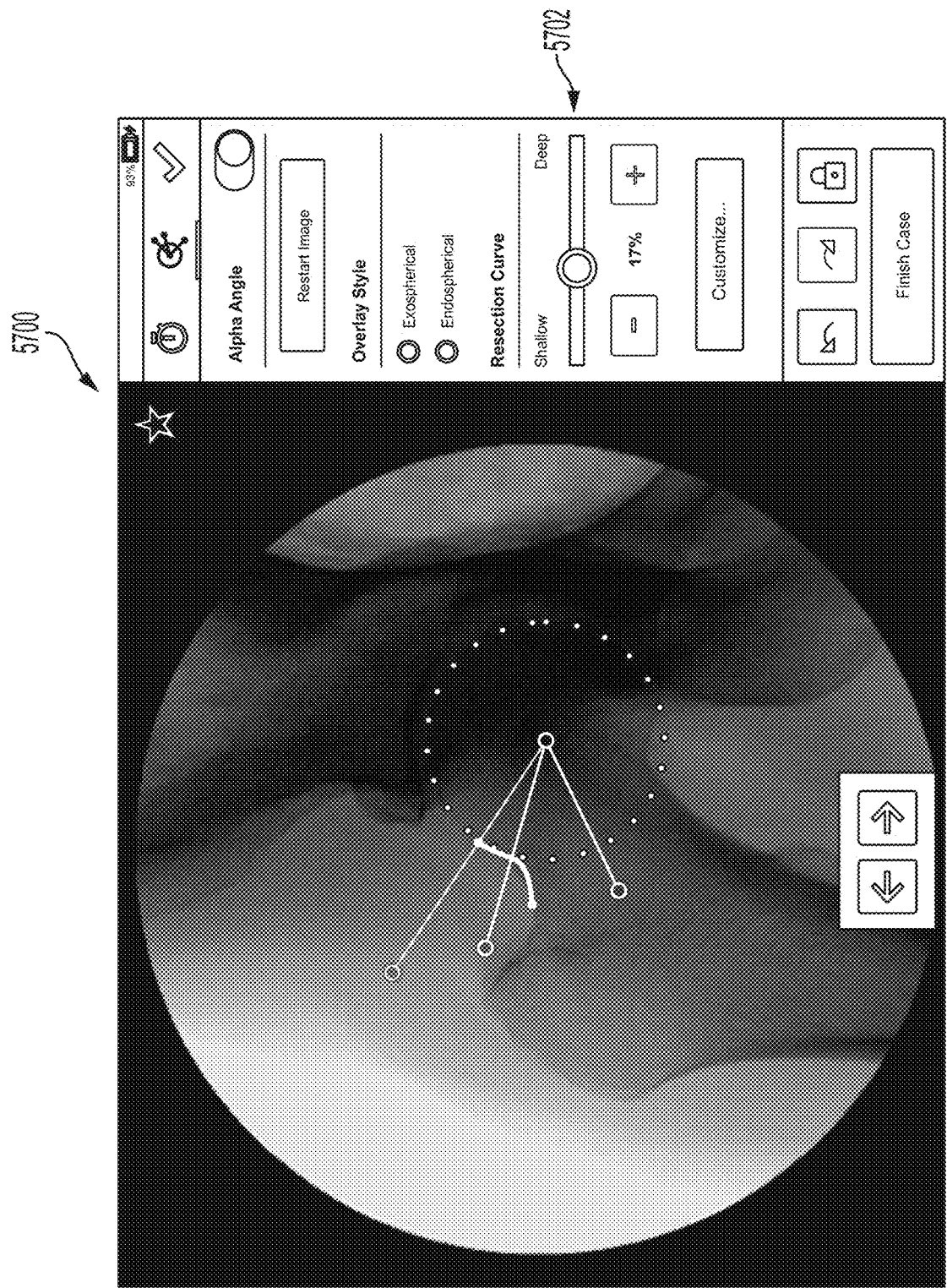
FIGS. 57A and 57B illustrate graphical user interfaces for user adjustment of the resection curve, according to various embodiments.
Figure 57B:
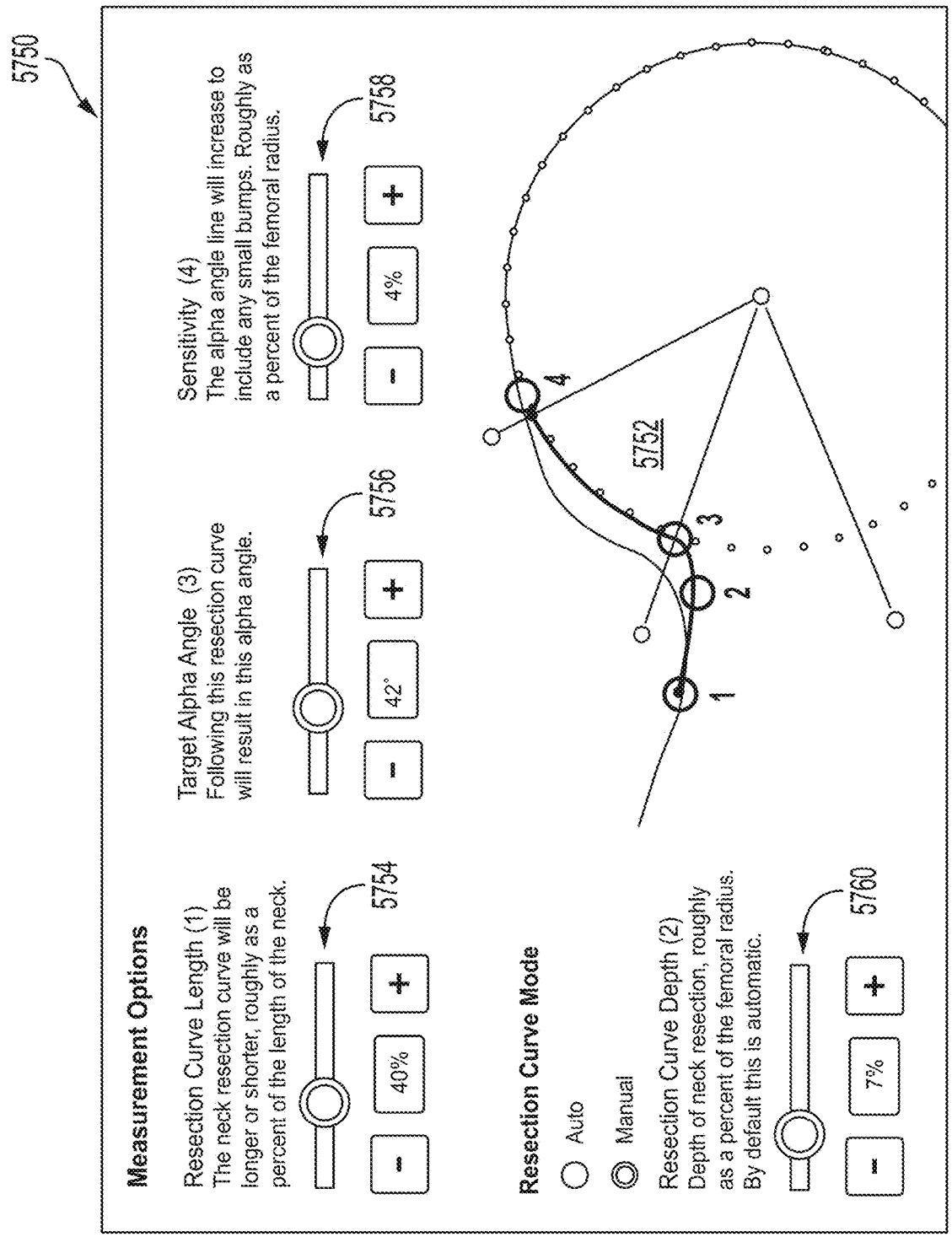

FIGS. 57A and 57B illustrate user interfaces for providing a user with the ability to adjust the resection curve generated by the system 125. In user interface 5700 of FIG. 57A, a slider 5702 can be adjusted by the user to selectively set the resection curve "depth," with a deeper setting being associated with more bone removal. The system 125 may automatically update the resection curve based on the user's adjustment via the slider 5702. In various embodiments, the system updates the resection curve as the user adjusts the slider 5702 so that the user can observe how changes in the slider setting affect the resection curve. Thus, the slider 5702 can provide the user with a simple and intuitive adjustment of the resection curve, which may be suitable for users that are not as familiar with the various parameters that determine the resection curve.

In various embodiments, the system 125 may provide the user more control over the resection curve by providing more user adjustments. FIG. 57B illustrates a user interface 5750 that includes a plurality of user adjustments (resection curve length, target alpha angle, and sensitivity) and a graphical depiction 5752 illustrating what the various adjustments control. In the illustrated embodiment, the resection curve length adjuster 5754 can be used to adjust the location of the endpoint of the resection curve along the neck ("1" in the graphical depiction 5752), the target alpha angle adjuster 5756 can be used to increase or decrease the target alpha angle ("3" in the graphical depiction 5752), and the sensitivity adjuster 5758 can be used to move the alpha angle line to include or not include bumps on the femoral head ("4" in the graphical depiction 5752). In various embodiments, a resection curve depth adjuster 5760 may also be included. Once the user has set the adjusters to the desired locations, the system 125 may update the resection curve accordingly. As discussed above, the user adjusted settings may be preserved and applied to the processing of later captured X-ray images. In some embodiments, the adjustments may be stored in association with a user profile so that the settings are applied to procedures conducted by the particular user.

The Iterative Nature of Computer Visual Guidance System 125

The surgeon can iteratively check the progress of the boney resection by periodically updating the intra-operative X-ray image and the assessment, by computer visual guidance system 125, of the measurements associated with the bony pathology. Referring to FIGS. 42-44 and 45-47, as the cam pathology surgery progresses, the surgeon periodically updates the intraoperative C-arm image. As this occurs, computer visual guidance system 125 automatically reassesses the cam pathology (i.e., it automatically recalculates the Alpha Angle, the head-neck offset, and/or the resection curve, etc.), and automatically annotates the X-ray image, such as to show how the Alpha Angle changes from the original Alpha Angle toward the target Alpha Angle. This approach provides iterative guidance to the surgeon, enabling the surgeon to proceed with greater confidence as the cam pathology is reduced and, ultimately, reduces the possibility of under-resection of the cam pathology which could necessitate revision hip arthroscopy.

The additional X-ray images acquired for this iterative process of repeatedly assessing the cam pathology as the surgery progresses may be done with the patient's leg and the C-arm X-ray machine remaining in the same position so as to provide updated assessments of the boney resection with the same X-ray projection; or the patient's leg may be re-positioned, and/or the C-arm X-ray machine moved, between X-ray images so as to provide updated assessments of the boney resection with differing X-ray projections.

Providing Workflow Assistance

In some embodiments, it may be beneficial to document the cam pathology, both before and after removal. Computer visual guidance system 125 can be configured to provide step-by-step guidance to the surgeon to make sure that documenting images are captured at the appropriate points along the procedure, preferably along with automatic measurements.

Providing Confirmation and Manual Correction

The computer visual guidance system 125 may not be 100% accurate or the surgeon may make different choices for their patient based on experience and their understanding of the patient's condition. Since images end up being part of a medical record, computer visual guidance system 125 may be configured to require manual confirmation from the surgeon before saving an image to the medical record. These interactions may be done in the sterile field through a variety of input devices including but not limited to:
  wireless mouse (sterile draped)
  wireless accelerometer with buttons (sterile draped)
  remote control (sterile draped)
  tablet (sterile draped)
  camera buttons.

Figure 48:
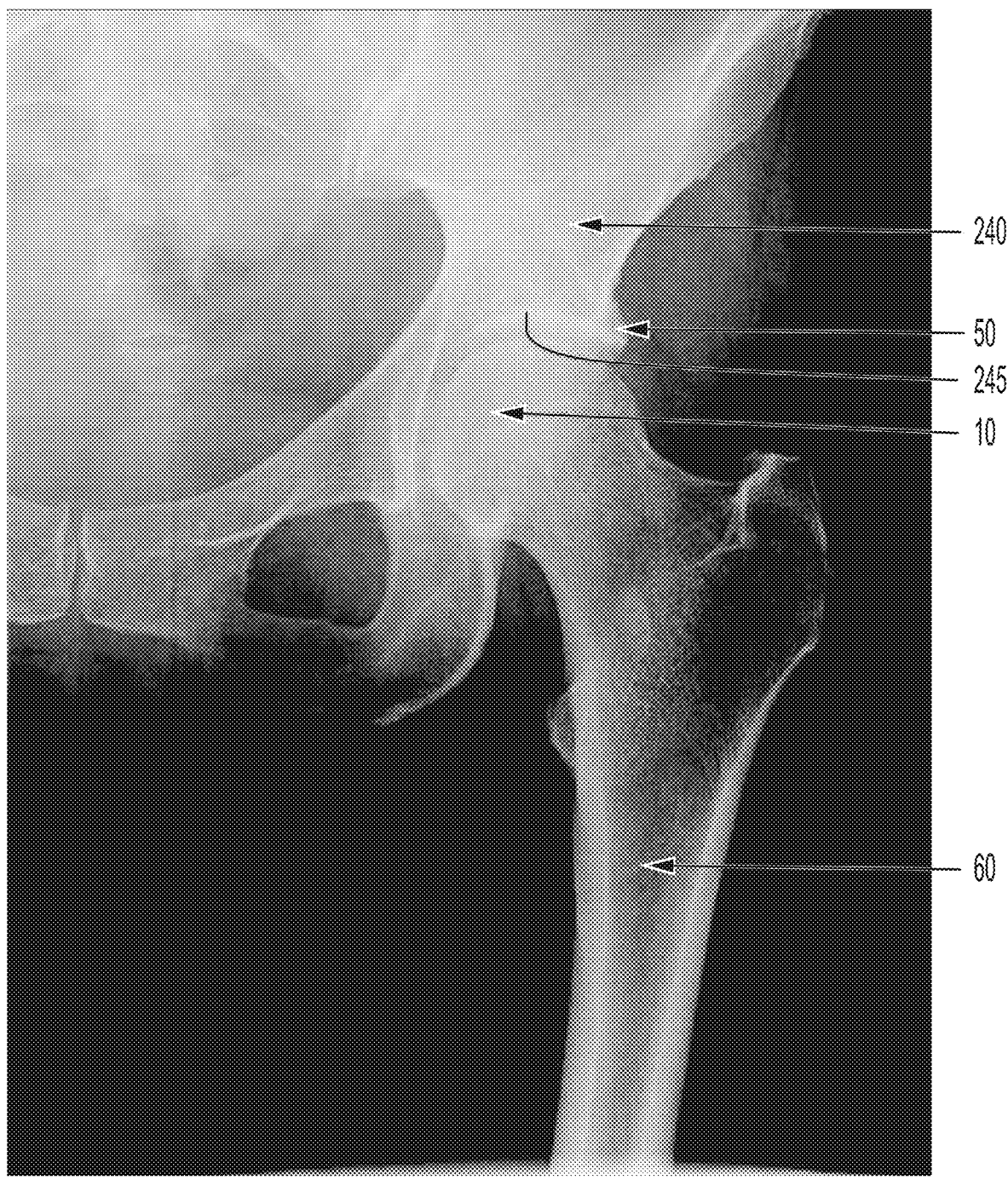
FIG. 48 is a schematic view showing pincer-type femoroacetabular impingement.

Example Embodiment of a Method and a System for the Treatment of Pincer-Type Femoroacetabular Impingement in a Hip Joint FIG. 48 is a schematic view of an acetabulum 240 comprising an acetabular cup 245 for receiving femoral head 10 of femur 60, and illustrates a pincer-type femoroacetabular impingement site 50 which needs to be debrided in order to treat the pincer-type femoroacetabular impingement.

The present disclosure describes a computer visual guidance system configured to analyze an X-ray image (e.g., an intra-operative C-arm X-ray image) to measure (e.g., automatically measure) features of the hip, such as the pincer pathology (e.g., by using a "Center Edge Angle" calculation, see below), and then to annotate the X-ray image for use by the surgeon in treating the pincer pathology. The systems, methods, and techniques disclosed herein according to various embodiments guide the surgeon to an optimal resection of the pincer pathology which is causing the impingement. As noted above, arthroscopic resections are currently "eyeballed" and the surgeon has no objective way to define completion of the boney resection. This leads to over-resection and, most commonly, under-resection of the pincer pathology—which is a significant cause of revision hip arthroscopy. The present disclosure addresses this problem by providing means which automatically analyze an X-ray image with respect to a pincer pathology and then automatically annotates the X-ray image with guidance features which can be used by the surgeon in treating the pincer pathology.

The present disclosure comprises a series of steps which start with an X-ray image and yields measurement of a feature of the hip (e.g., the Center Edge Angle) and an annotation correctly shown onto that X-ray image for the surgeon to be able to assess the pathology and progress towards proper resection.

In some embodiments, the disclosure utilizes the aforementioned methodology for treating a cam pathology, except that it is modified for treating a pincer pathology. More particularly, Steps 11-14 in the cam pathology procedure (FIG. 20) are replaced by the following Steps 11-14 for the pincer pathology treatment.

Step 11 According to Various Embodiments: Finding the Transverse Pelvic Axis

Figure 49:
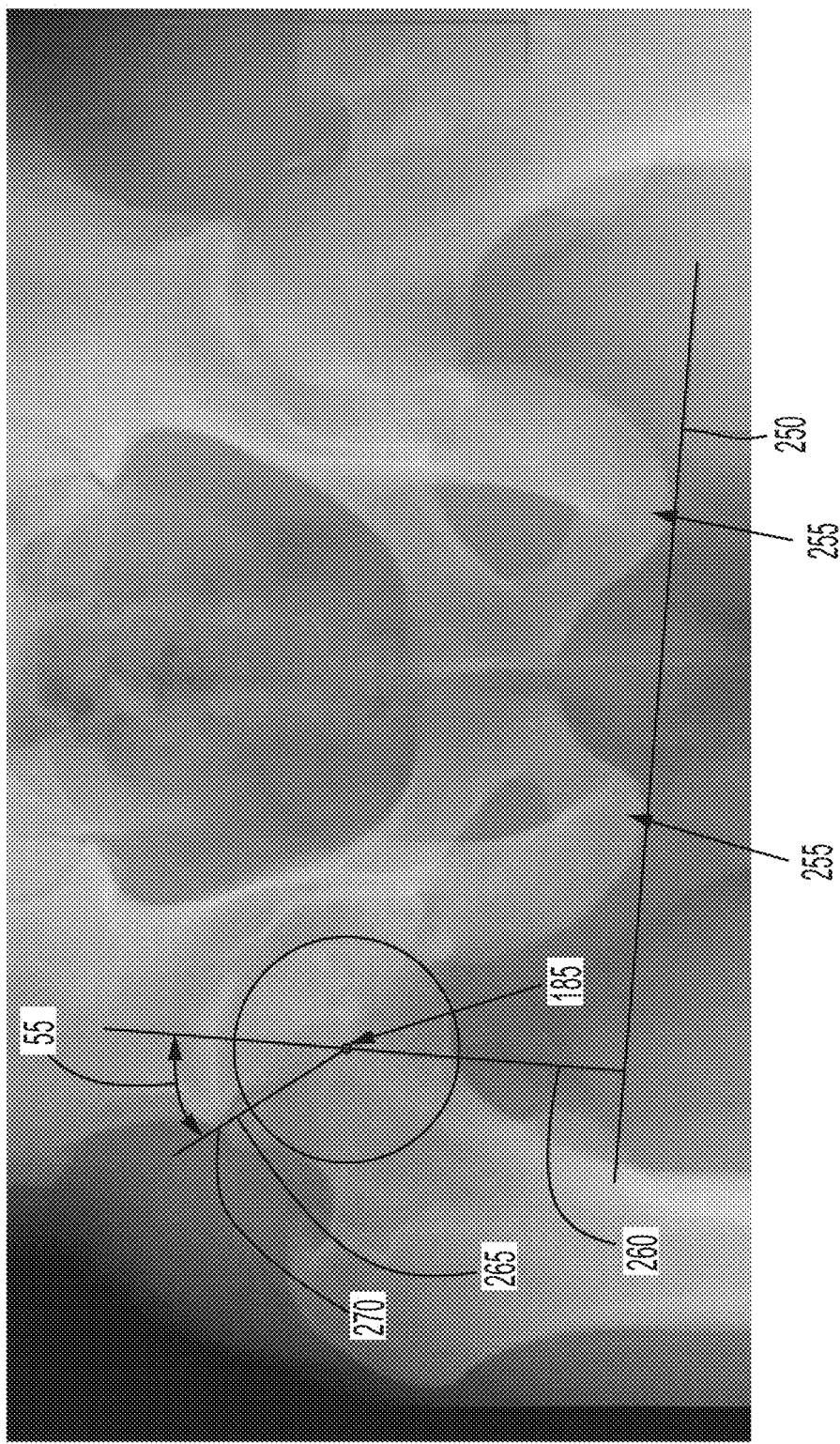
FIG. 49 is a schematic view showing a Center Edge Angle calculation.

Referring to FIG. 49, the transverse pelvic axis 250 is located using standard image processing techniques, e.g., by drawing a line between the inferior apexes 255 of the ischium bones (or, alternatively, by drawing a line between the center of both femoral heads).

Step 12 According to Various Embodiments: Finding the Perpendicular to the Transverse Pelvic Axis which Extends Through the Center of the Femoral Head Referring to FIG. 49, the perpendicular 260 to the transverse pelvic axis 250 which extends through the center of the femoral head is located using standard image processing techniques, e.g., by extending a line from the center of the femoral head which is 90 degrees from the transverse pelvic axis.

Step 13 According to Various Embodiments: Finding the Line which Extends from the Lateral Acetabular Edge to the Center of the Femoral Head Referring to FIG. 49, the lateral acetabular edge line 265 which extends from the lateral edge 270 of the acetabular rim to the center 185 of the femoral head is located using standard image processing techniques, e.g., in an AP (Anterior-Posterior) view, by creating a line which passes from the lateral sourcil (the most supereolateral aspect of the sclerotic weight-bearing zone of the acetabulum) to the center of the femoral head.

Step 14 According to Various Embodiments: Measuring the Center Edge Angle

Referring to FIG. 49, the Center Edge Angle 55 (i.e., the angle between the perpendicular 260 and the lateral acetabular edge line 265) is calculated, e.g., by measuring the angle formed between the portion of the perpendicular 260 on the superior side of the femoral head and the lateral acetabular edge line 265.

The Center Edge Angle of a "normal" person is typically between about 25 and about 35 degrees (i.e., the target Center Edge Angle is normally approximately 25 degrees to approximately 35 degrees).

Both the actual Center Edge Angle and the target Center Edge Angle can be automatically computed by computer visual guidance system 125 from an X-ray image and these features automatically annotated on the X-ray image for display to the surgeon. Furthermore, the difference between the actual Center Edge Angle and the target Center Edge Angle (i.e., the resection section) can be automatically identified by computer visual guidance system 125 and automatically annotated on the X-ray image for display to the surgeon.

Checklist Graphical User Interface

In some embodiments, a graphical user interface may be provided for capturing and categorizing anatomical images, such as anatomical images of a hip. For example, it may be standard practice in certain medical procedures for physicians to capture anatomical images, such as X-ray images, in predefined patient positions and/or from predefined angles. For example, for cam resection procedures, six standard patient positions are typically imaged to ensure that all potential cam pathology locations on the femur are assessed, as described in an article in The American Journal of Sports Medicine, titled "Intraoperative Fluoroscopic Imaging to Treat Cam Deformities: Correlation with 3-Dimensional Computed Tomography," authored by James R. Ross, et al., and published online on Apr. 15, 2014, the entire contents of which is hereby incorporated by reference. As described in the Ross article, the six standard positions are: the knee and hip in full extension (i.e., 0 degrees flexion) and the leg in (1) 30 degrees of internal rotation, (2) neutral rotation, and (3) 30 degrees of external rotation; and the hip and knee positioned in 50 degrees of flexion and the hip in (4) neutral rotation, (5) 40 degrees of external rotation, and (6) 60 degrees of external rotation. Each position may be imaged once before resection and once after resection, and typically at least once during the resection procedure. Improved interfaces for capturing, annotating, and categorizing such images are required.

Figure 52A:
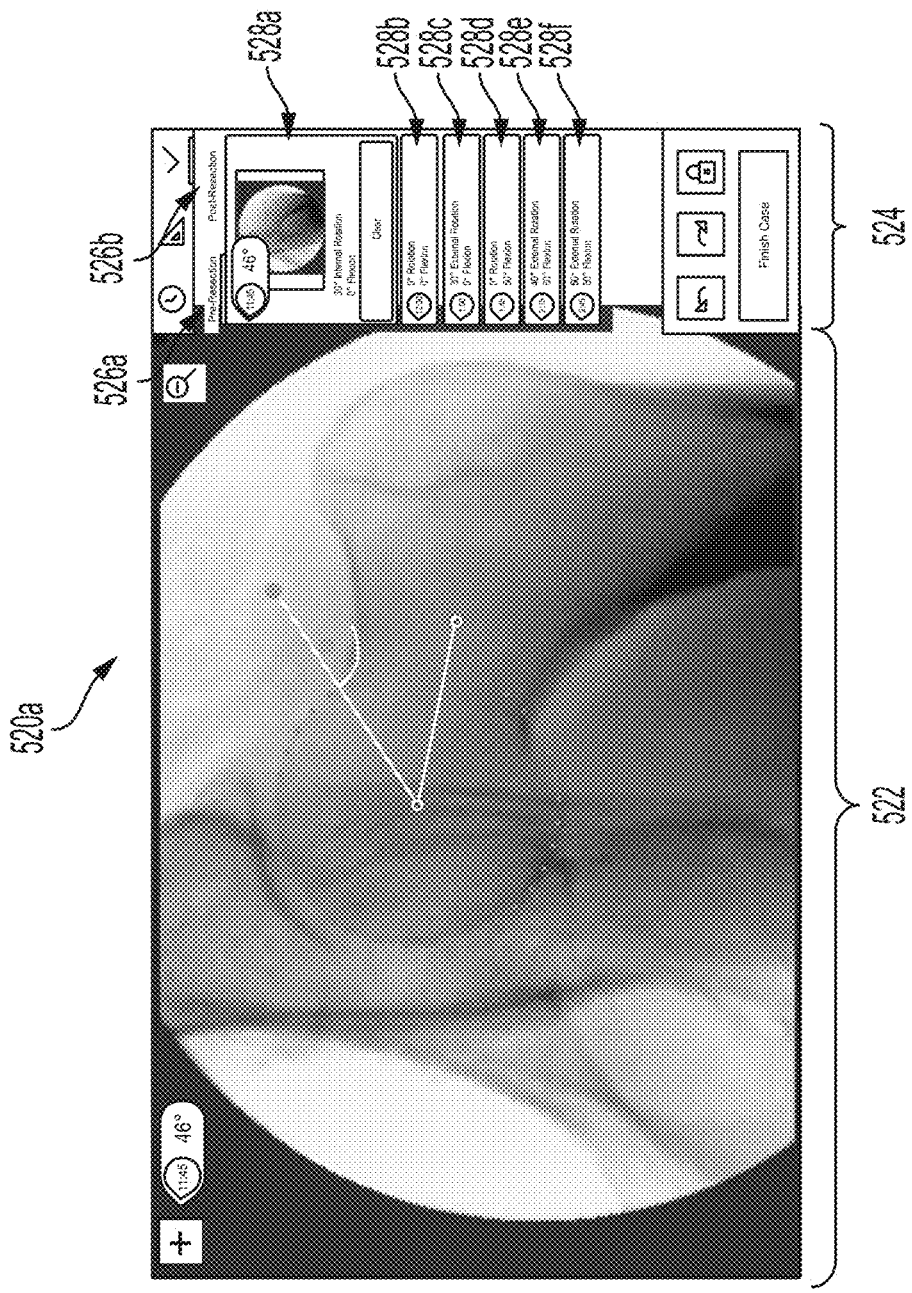
FIGS. 52A and 52B depict screens of a graphical user interface for capturing and categorizing anatomical images, in accordance with some embodiments.
Figure 52B:
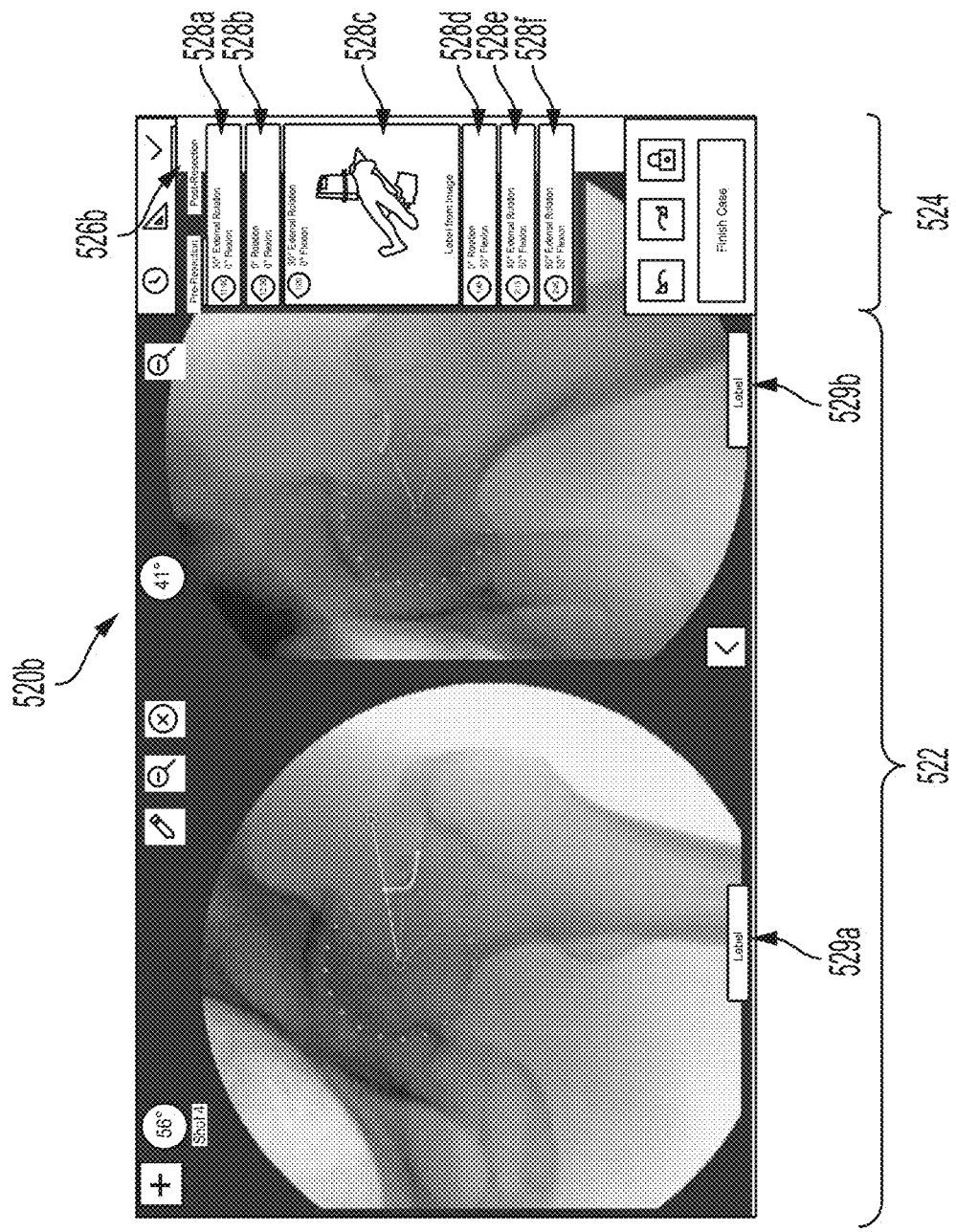

FIGS. 52A and 52B depict different screens of a graphical user interface for capturing and categorizing anatomical images, in accordance with some embodiments. FIG. 52A shows screen 520a, while FIG. 52B shows screen 520b. In both screens, an interactive interface is for capturing and categorizing images is displayed.

As shown, the interface comprising screens 520a and 520b may comprise image viewing area 522 and checklist 524. In image viewing area 522, one or more images (e.g., X-ray images, fluorescence images, endoscopic images, etc.) of patient anatomy may be displayed such that they may be viewed, manipulated, annotated, and/or otherwise interacted with by a user of the graphical user interface. In some embodiments, images displayed in image viewing area 522 may be annotated while they are displayed in viewing area 522, including by being automatically annotated by the system generating and displaying the interface and/or by being manually annotated by a user interacting with the interface.

Checklist 524 may be a graphical user interface element comprising a plurality of graphical user interface object corresponding to respective patient positions and/or image angles to be captured. In the example of FIGS. 52A and 52B, checklist 524 comprises six graphical user interface objects 528a-528f, each object corresponding respectively to a different patient position to be imaged for a cam resection procedure. Graphical user interface objects may be arranged in a predefined order or other arrangement that is conducive to manipulating and imaging patient anatomy before, during, or after a procedure. In some embodiments, graphical user interface objects may be arranged into pre-procedure and post-procedure categories, where each category contains graphical user interface objects corresponding to images to be captured either before or after a procedure (or during a procedure). In the example shown in FIGS. 52A and 52B, checklist 524 comprises two tabs: pre-resection tab 526a and post-resection tab 526b. As shown in the figures, selection of pre-resection tab 526a causes the system to display the six graphical user interface objects 528a-528f, while selection of post-resection tab 526b may cause the system to display graphical user interface objects corresponding to post-resection images to be captured.

In operation, a user of the graphical user interface may select a pre-resection tab 526a by clicking or tapping on tab 526a, thereby causing graphical user interface objects 528a-528f to be displayed. The user may then select the first object under tab 526a, which is object 528a as shown in FIG. 52A, by clicking or tapping on the object.

When a user selects an object, the system may display an expanded view of the object, as shown by object 528a in FIG. 52A and by object 528c in FIG. 52b. In the expanded view of the object, the object may display information and/or visual guidance regarding the position/angle to be captured, as shown by way of example in object 528c in FIG. 52b.

After expanding an object in checklist 524, the user may then save an image that is being displayed in image viewing area 522 (e.g. an image that was taken corresponding to the patient position indicated by the expanded user interface object). An image or images may be displayed in image viewing area 522, and a user of the interface may select an image, manipulate a selected image, and/or cause a selected image to be annotated, for example as discussed elsewhere herein and/or as shown on by annotated anatomical images in FIGS. 52A and 52B.

Once the user is satisfied with the selected and/or manipulated image to be used for the image position/angle category corresponding to the selected object, the user may execute an input to cause the system to save the image to the selected object category. For example, a user may click or tap a displayed icon, such as label icon 529a or 529b in FIG. 52B, to cause the system to save the image corresponding to the selected icon to the selected step of the checklist. In the case of FIG. 52B, selecting icon 529a causes the system to save the leftmost anatomical image to the third step of the pre-resection checklist, corresponding to object 528c. If a user saves an image to a step of the checklist and decides that he wants to un-save the image from that category, for example to replace it, a user may in some embodiments be able to select a "clear" or "delete" icon, which may for example be displayed as part of the expanded user interface object for the checklist step, as shown at object 528a in FIG. 52a.

After a user saved an image to a step of the checklist, the information and/or visual guidance regarding the patient position and/or image angle to be captured previously displayed in the object in the checklist may be replaced and/or augmented by display all or part of the saved image itself, as shown for example in object 528a in FIG. 52A.

In some embodiments, after a user of the graphical interface selects an image to be saved to a step in the checklist, the interface may automatically advance to a next step in the checklist, for example by automatically collapsing an expanded view of the previous step and instead displaying an expanded view of the next step in the checklist. In some embodiments, a user may manually move between different steps in the checklist by tapping or clicking on different user interface objects corresponding to the desired angle/position.

In some embodiments, a user may use the interface to retrieve one or more images that has already been saved, to be displayed in image viewing area 522. Images may be retrieved from storage, or captured dynamically as the user interacts with the system.

In some embodiments, the user may customize the checklist if, for example, there is a patient position and/or image angle that is not represented by the default graphical user interface objects (e.g., objects 528a-528f), or, for example, if the user wishes to remove one of the positions and/or image angles represented by a default object.

In some embodiments, the graphical user interface may further comprise a comparison mode, in which the interface simultaneously displays images that were saved to a corresponding pre-resection and post-resection position/angle categories, such that a user of the interface can compare the selected images for the same checklist step from before and after the resection procedure by viewing them side-by-side and/or overlaid with one another.

Tool Interference Graphical User Interface

In some embodiments, a graphical user interface can indicate to a user that a tool or other foreign object in an X-ray image is may be in a non-optimal position in the image. For example, a tool or other object that may be interfering with identification with one or more anatomical features (also referred to herein as characteristics) in the image, resulting in an erroneous determination of a resection curve, may be indicated via a graphical indication. This may alert the user that the tool should be moved and a new image captured.

Figure 56:
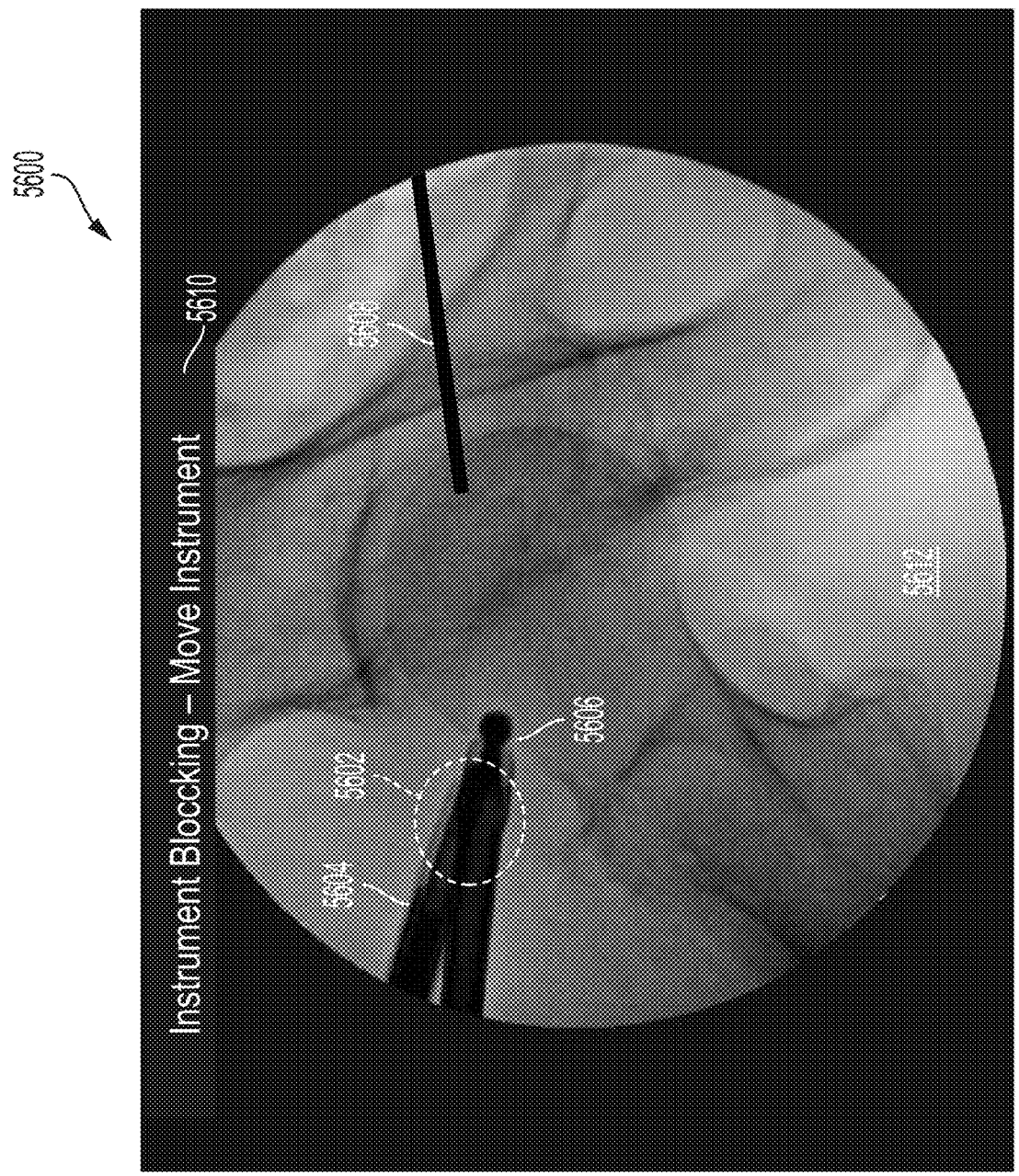
FIG. 56 illustrates an example of a graphical user interface that includes a graphical indication for indicating the presence of a tool that may be in a non-optimal position in the X-ray imaging field, according to various embodiments.

FIG. 56 illustrates an example of a graphical user interface that includes a graphical indication for indicating the presence of a tool that may be in a non-optimal position in the X-ray imaging field, according to some embodiments. Graphical user interface 5600 includes a graphical indication 5602 on a tool 5604 in the X-ray image 5612. The system 125 may be configured to identify tools, such as tool 5604, in any suitable fashion, including, for example, based on identifying strong parallel lines, which are unlikely to be associated with anatomy. System 125 may be configured to determine that an identified tool is interfering with one or more image-related determinations of the system and may position a graphical indication 5602 on the tool to indicate to the user that the tool is interfering. According to various embodiments, the system may be configured to determine that the tool(s) is interfering with the determination of one or more characteristics of the bone in the X-ray image, such as interfering with the determination of one or more edges of the femoral head (i.e., the system cannot correctly locate the edges), the edges of the femoral neck and/or the femoral shaft, a center of the femoral neck, a center of the femoral head, and/or any other characteristics that may be used to generate a measurement or resection curve. The tool may be interfering in various ways, such as by obscuring at least a portion of an edge of a bone or by extending alongside the bone such that the system has trouble distinguishing the edge of the bone from the edge of the tool. For example, in the illustrated example, the tool 5604 is overlying the edges of the femoral head/neck transition 5606 where the resection curve is needed such that the system 125 cannot determine the resection curve. The system may be configured to automatically determine that the one or more edges associated with the tool are adversely affecting the determination of the at least one characteristic using any suitable image processing methods. According to various embodiments, the system may automatically determine that the one or more edges associated with the tool are adversely affecting the determination of the at least one characteristic by identifying a sharp or angular transition between edges, such as when a tool extends transversely across an edge, or by determining an unexpected end to an edge, such as based on no edges points being detected where the body of the tool is overlying an edge.

In some embodiments, the graphical indication 5602 may be placed on top of the tool 5604 that is problematic so that the user can easily understand which tool should be removed. For example, in the illustrated embodiment, tool 5604 may be determined to be problematic and, therefore, the indication 5602 is located on top of tool 5604. Other tools in the image that are not determined to be problematic may not be provided with a graphical indication 5602. For example, tool 5608 may not be interfering with the femoral head identification, and therefore, is not provided with the indication 5602. In some embodiments, a textual indication 5610 associated with a problematic tool may be included to provide the user with further instruction or context associated with the graphical indication 5602.

Three-Dimensional Pre-Operative Plan Graphical User Interface

In some embodiments, a graphical user interface may be provided for displaying a pre-operative plan comprising interactive three-dimensional renderings of the patient's anatomy. This preoperative plan may be displayed intraoperatively, including by being displayed alongside intraoperative images captured of the patient's anatomy during an operation. In some embodiments, a preoperative plan may be displayed on a touch-screen device that may be viewed and controlled by a physician during the procedure itself.

Figure 53:
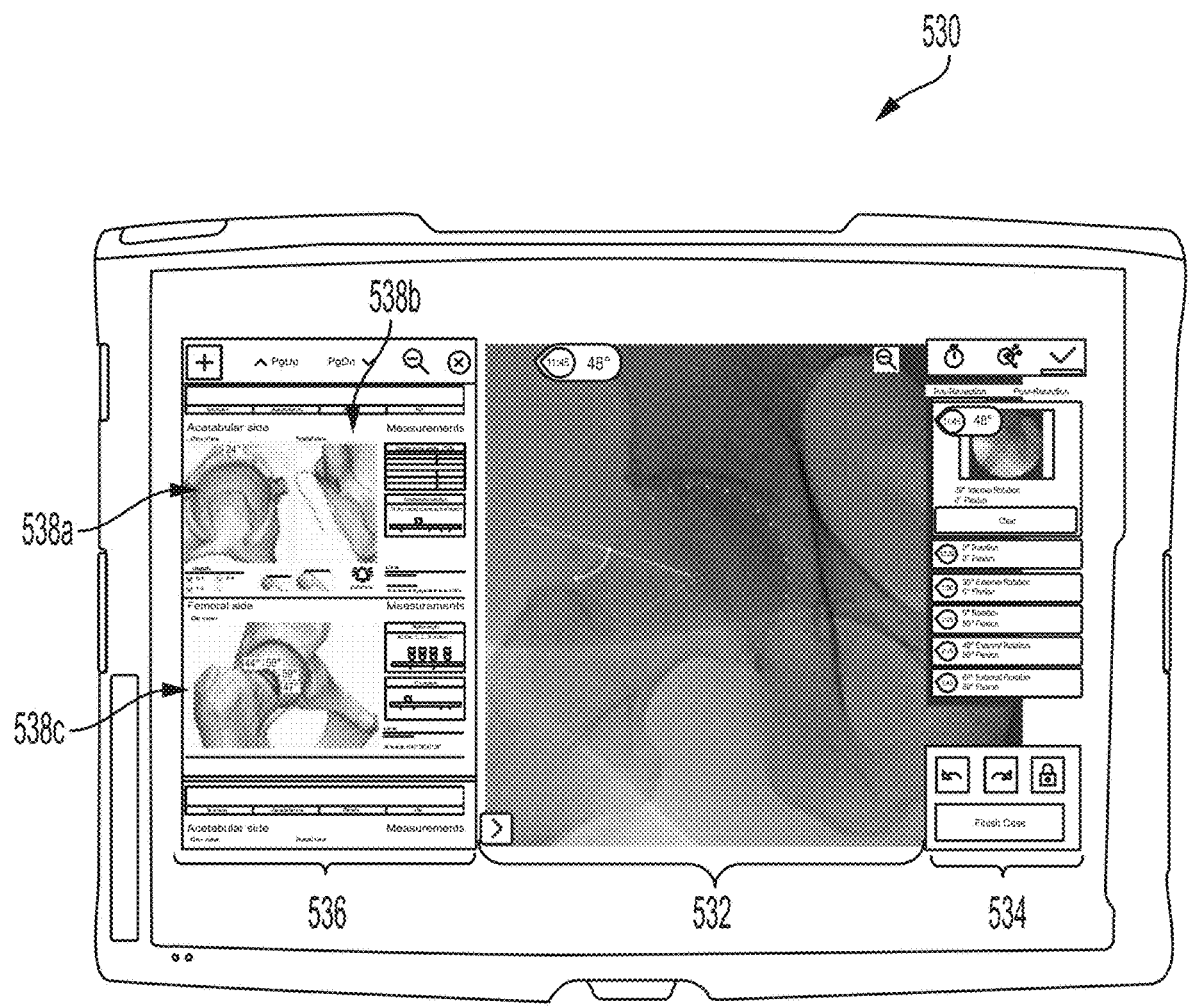
FIG. 53 depicts a screen of a graphical user interface for capturing and categorizing anatomical images, in accordance with some embodiments.

FIG. 53 depicts a screen 530 of a graphical user interface for displaying a three-dimensional interactive preoperative plan alongside intraoperative images. In some embodiments, the graphical user interface screen shown in FIG. 53 may be displayed on a display during an operation, and may be communicatively coupled to one or more imaging devices, such as by wired or wireless electronic communication mediums, so as to be able to receive intraoperative images during the operation for comparison to the preoperative plan.

As shown in FIG. 53, screen 530 comprises intraoperative image 532 and checklist 534, which may share any one or more characteristics in common with the intraoperative images and checklists, respectively, discussed above with respect to the interface in FIGS. 52A and 52B. In some embodiments, intraoperative image 532 may be an image (e.g., an X-ray image, a fluorescence image, an endoscopic image, etc.) captured during a procedure and displayed to a physician with or without manipulation, processing, and/or annotation of the image. In some embodiments, intraoperative image 532 may be a video feed captured during an operation.

Screen 530 further comprises preoperative plan 536. In some embodiments, a preoperative plan may be a plan for guiding a surgeon regarding how much bone should be removed to achieve a target (e.g., normal) morphology. The plan can provide guidance regarding morphology measurements for a hip joint, including the Alpha Angle, head-neck offset, Lateral Center Edge Angle, Acetabular Version and Femoral Torsion, Tonnis angle, neck shaft angle, head-neck offset, and acetabular coverage to help the surgeon gauge the deviation of the subject morphology from the target morphology. The plan may include a 3D rendering of the hip joint, a heat map on the rendering that illustrates the portion and amount of the bone that should be resected, a coordinate system for the surgeon to use as a basis for matching the planned resection area to the operative resection area, and alpha angle, head-neck offset, and/or lateral center edge angle measurements at different circumferential locations. In some embodiments, preoperative plan 536 may share any one or more characteristics of the preoperative plans disclosed in U.S. patent application Ser. No. 16/261,464, which is hereby incorporated by reference in its entirety.

Preoperative plan 536 comprises interactive three-dimensional images 538a-c. Interactive three-dimensional images 538a-c may be three-dimensional models of anatomical structures relevant to an operative plan, and may include one or more annotations relevant to planned surgical steps or other procedures to be carried out as part of the operation. Interactive three-dimensional images 538a-c may be zoomable (e.g., by touch-screen pinching or depinching manipulation, or by other user inputs) and/or rotatable in two dimensions and/or three dimensions (e.g., by touch-screen twisting manipulation, or by other user inputs). By zooming and/or rotating an interactive three-dimensional image in an preoperative plan, a physician may be able to view the image from angles that are not accessible via a limited number of static two-dimensional images, and the physician may further be able to manipulate the three-dimensional image to match an angle of an intra-operative image such as image 532. In some embodiments, a physician may zoom and/or rotate a three-dimensional image in order to visualize placement of portals for access, and/or in order to visualize trajectories of access for instruments to be used in the procedure.

In some embodiments, a physician may interact with and manipulate the preoperative plan in additional ways besides zooming and rotating three-dimensional images, such as by scrolling through a pre-operative plan using touch-screen inputs or other user inputs.

Connectivity between the computer visual guidance system and the hip distraction equipment can provide medical personnel with useful information before, during and after a surgical procedure. For instance, the computer visual guidance system can be used to guide the medical personnel through the proper set-up of the distraction equipment, including assembly of the distraction equipment, attachment of the distraction equipment to the surgical bed, placement of other equipment in the surgical suite, proper patient positioning and attachment to the distraction equipment, information on use of the distraction equipment during the procedure, cleaning information, storage information and disassembly instructions. This information may be presented as a step-based system with prompts, or as a menu-driven system, or as a question-driven system, that provides users with only the requested information. The information may be presented as text, images (including video) and/or animation (including video), as appropriate, to convey the needed information.

The computer visual guidance system may be used in conjunction with sensors. By way of example but not limitation, if sensors are placed on the distraction equipment, the computer visual guidance system can utilize information about the distraction equipment and provide feedback to medical personnel. For instance, a set of sensors in the distraction equipment can detect the position of the distraction equipment in space. Information about the position of the heel or foot of the patient would be particularly useful as it is typically the attachment point for the patient to the distraction equipment. Additional information about the position of the patient's hip could be provided manually or through coordination with the C-arm X-ray device. Knowing this information would then provide information about the relative position of the patient's leg, and specifically their hip (e.g., whether it is in flexion, extension, abduction, adduction, internal or external rotation). Sensors can also be used to detect when traction is applied, either by measuring the position of the heel relative to the hip, or by a measurement of force. Alternatively, image analysis can be done to determine if the acetabulum and femoral head are dislocated allowing the deduction of whether traction is applied. This could provide medical personnel with feedback on the amount of tension applied to the patient, its direction of force (vector), and duration of the application of traction.

In as much as information about the position of the patient and the distraction equipment is available, it can also be used to help guide medical personnel during the procedure. For instance, while resecting a cam pathology on the femur, it is often important to move the patient's leg in order to fully visualize the pathology. With the ability to sense the position of the distraction equipment and therefore the patient's leg and hip position, the computer visual guidance system can prompt medical personnel on how to position the patient for optimal resection. Furthermore, the positioning of the hip and leg during this part of the procedure can be driven by pre-operative planning software that has been created to analyze and plan the resection. This pre-operative software may generate a series of images showing patient hip positions so that the surgeon and operative team can fully visualize the pathology, in particular the cam pathology. These views can be delivered to the computer visual guidance system and used to position the patient during the surgery to ensure visualization and review of the resection plan.

Example: Use of the Novel Computer Visual Guidance System for Applications Other than Alpha Angle Calculations and/or Center Edge Angle Calculations In various embodiments, the computer visual guidance system of the present disclosure may be used for applications other than the specific Alpha Angle measurements, head-neck offset measurements, and/or Center Edge Angle measurements discussed herein as related to the treatment of the joint including, for example, the hip joint.

In various embodiments, the computer visual guidance system of the present disclosure may be used to measure other parameters in order to guide debridement of the femur and/or acetabulum during treatment of femoroacetabular impingement.

In various embodiments, the computer visual guidance system of the present disclosure may be used to guide debridement in joints other than the hip joint (e.g., to guide debridement of a surface of a humerus in order to prepare that surface for re-attachment of a torn rotator cuff, or to guide debridement of a surface of a bone in spinal surgery, etc.).

In various embodiments, the computer visual guidance system of the present disclosure may be used in non-arthroscopic procedures.

Display Device with Water-Droplet Detection for Use in Surgical Environment

In some embodiments, water droplets may be present in a surgical environment for performing one or more of the procedures discussed herein. Water droplets may, in some embodiments, spray onto a touchscreen display device used in a surgical environment or onto a sterile drape covering the touchscreen device. In some embodiments, water on a touchscreen display device or drape covering the device may cause false or erroneous inputs to be registered by the device.

Accordingly, in some embodiments, a touchscreen display device for use in a surgical environment, for example for use in displaying any of the images and/or graphical user interfaces discussed herein, may be configured to automatically detect the presence of water on a touch-sensitive surface of the device or portion of the drape covering the touch-sensitive surface (the following applies equally to water droplets on the touch-sensitive surface itself and water droplets on a drape or other protective covering on the touch-sensitive surface), and to respond to such detection by disabling inputs and/or displaying an indication that the device should be dried. In some embodiments, disabling input in response to detection of water may prevent the device from registering erroneous inputs due to water on the touch-sensitive surface of the touch-screen display device.

In some embodiments, the device may be configured to detect the presence of water by detecting an object on a touch sensitive surface by detecting a point of contact on the touch-sensitive surface for greater than a predefined period of time, by detecting greater than a predefined number of simultaneous points of contact on the touch sensitive surface, by detecting a touch contact that is greater than or smaller than a predefined threshold size, and/or by detecting that greater than a predefined percentage of a touch-sensitive surface is registering a contact.

Computerized Systems

Figure 54:
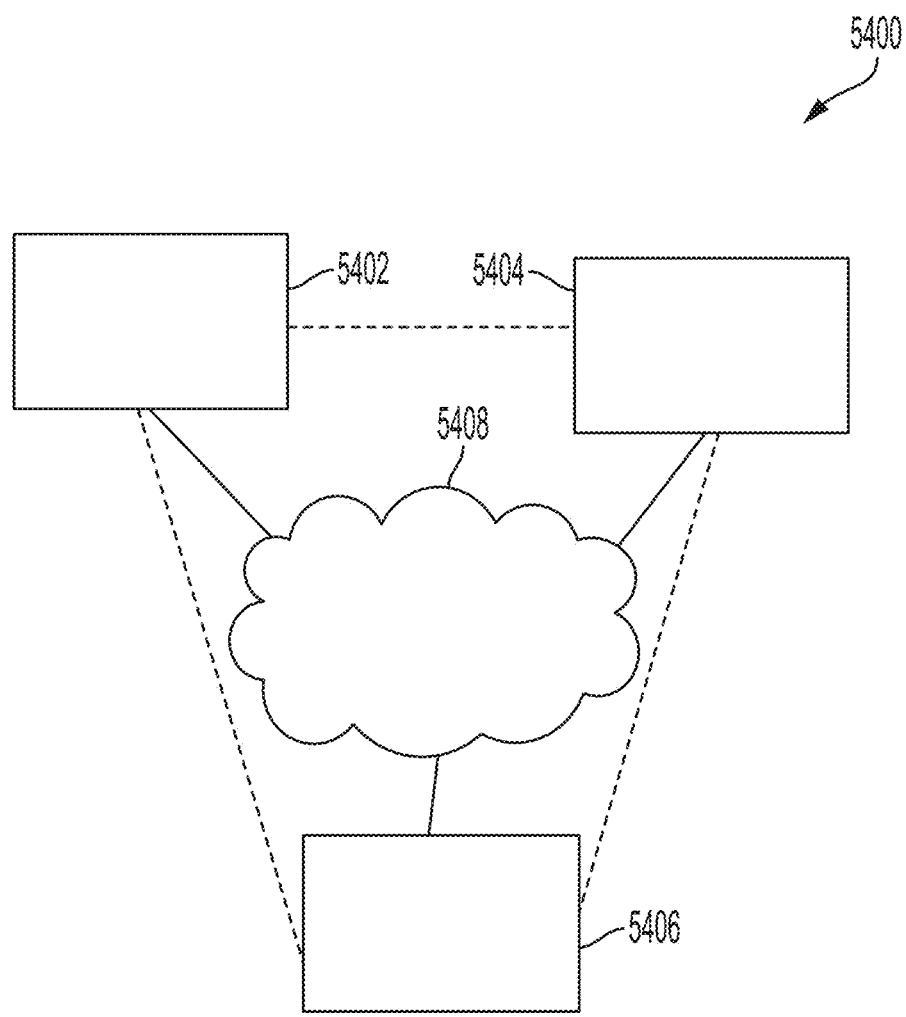
FIG. 54 illustrates a system 5400 for imaging a joint of a subject, processing images of patient anatomy, generating 3D renderings of patient anatomy, displaying user interfaces for guiding surgeons in operative procedures on patients, and/or displaying user interfaces for guiding practitioners in categorizing and manipulating images of patient anatomy, according to various embodiments.

FIG. 54 illustrates a system 5400 for imaging a joint of a subject, processing images of patient anatomy, generating 3D renderings of patient anatomy, displaying user interfaces for guiding surgeons in operative procedures on patients, and/or displaying user interfaces for guiding practitioners in categorizing and manipulating images of patient anatomy, according to various embodiments. System 5400 includes an imaging subsystem 5402 for imaging the joint of the subject; a visualization generating subsystem 5404 for generating visualizations of the joint from imaging generated by the imaging subsystem, and/or for processing images of patient anatomy; and a display subsystem 5406 for displaying generated visualizations to a practitioner, for displaying user interfaces for guiding surgeons in operative procedures on patients, and/or for displaying user interfaces for guiding practitioners in categorizing and manipulating images of patient anatomy. The subsystems may be communicatively connected via a network 5408, such as a local area network, a wide area network, a combination of local and wide area networks, or any suitable communication network. In some embodiments, the subsystems may be directly connected to one another such that data is transferred from one subsystem to another directly, without being routed through a network. For example, an imaging subsystem and a visualization generating subsystem may be different portions of the same operating suite.

Imaging subsystem 5402 can include an imager for generating imaging data for a subject. Imaging data can include, for example, MRI scans, CT scans, x-rays, fluorescence imaging data, or any suitable imaging data for imaging a joint of a subject. In some embodiments, the imaging subsystem 5402 can include one or more imaging data processing systems for processing imaging data generated by an imager. (Note that, in some embodiments, one or more image data processing systems may also be included in visualization generating subsystem 5404.) The imaging subsystem 5402 can include one or more data storage systems for storing imaging data. The imaging subsystem 5402 can be configured to transmit imaging data for a joint of a subject to visualization generating subsystem 5404. For example, after an imaging session in which a joint of a subject was imaged, imaging data generated during the session can be transmitted to the visualization generating subsystem 5404 for generating visualizations, according to the principles described above. In some embodiments, data is transferred from an imaging subsystem to a visualization generating subsystem 5404 in the same facility, such as a central computing system. In other embodiments, data is transferred to a remote system, such as one operated by a third party that provides a visualization generation service.

The visualization generating subsystem 5404 can be configured to receive imaging data and use some or all of the imaging data for processing images of patient anatomy (e.g., to generate one or more annotations) and/or for generating a three-dimensional model of at least a portion of the joint of the subject. In processing images of patient anatomy, subsystem 5404 may identify one or more characteristics or features of patient anatomy in the captured images as described herein, may process or modify the captured image as described herein, and/or may calculate and generate one or more annotations (such as angle markings and/or spline markings) as described herein. In generating a three-dimensional model, the subsystem 5404 can identify at least one region of the joint that deviates from a baseline anatomy by comparing at least a portion of the three-dimensional model to a baseline model. The subsystem 5404 can generate a measurement of a characteristic of the joint at one or more predefined locations using the three-dimensional model and a coordinate system; and can generate a three-dimensional rendering of the model, according to the principles described herein. The three-dimensional rendering can include a visual indication of the at least one region of the three-dimensional model that deviates from the baseline, wherein the at least one region is visually indicated according to degree of deviation. The three-dimensional rendering can be a component of a visualization that includes any other relevant information as described herein.

The visualization generating subsystem 5404 can be configured to transmit visualizations, such as those including three-dimensional renderings and/or image annotations, to display subsystem 5406 for displaying the generated visualizations to a practitioner to help the practitioner plan and/or execute a surgical procedure to correct a pathology analyzed and indicated in the visualization. For example, the visualizations can be displayed to a computer used by a practitioner via, for example, a web interface or an app. The visualizations may also be displayed as part of one or more of the graphical user interfaces described herein. The display subsystem can include one or more operating room displays for displaying the visualizations to the practitioner during surgery, for example including a touch-screen display such as a tablet configured to be used by a surgeon during a procedure.

Figure 55:
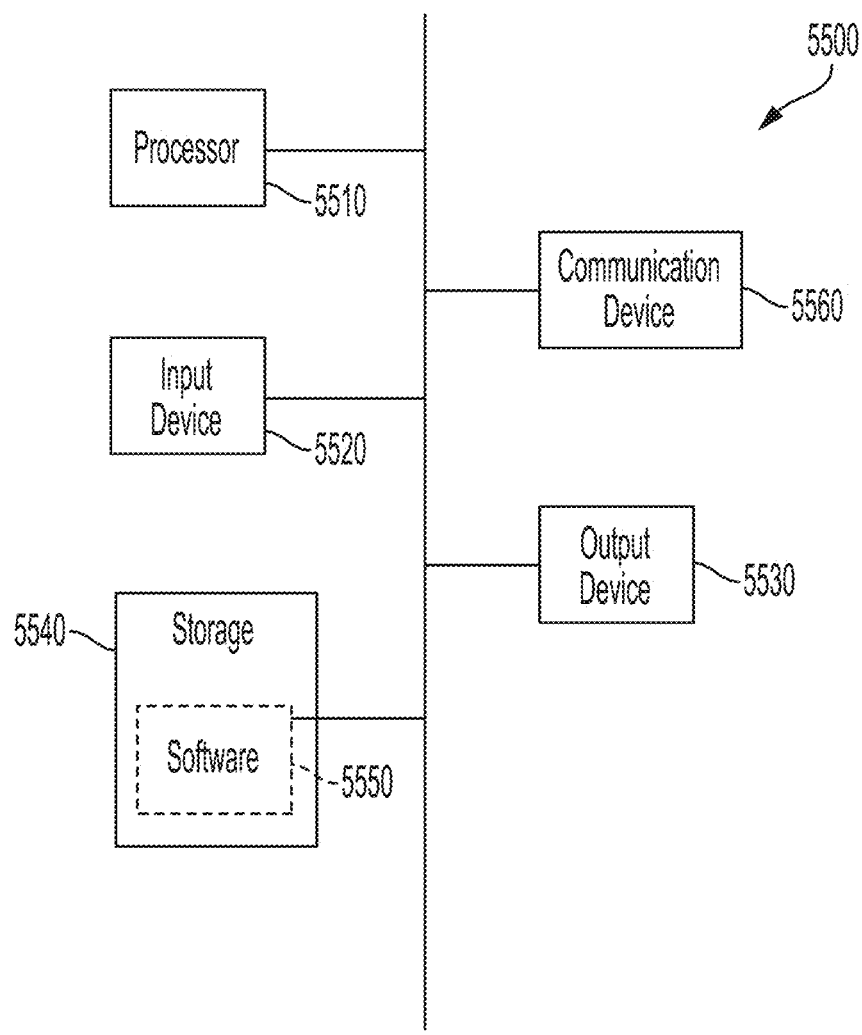
FIG. 55 illustrates a computer system, in accordance with some embodiments.

FIG. 55 illustrates an example of a computing system, in accordance with some embodiments, for generating visualization according to the principles described herein. System 5500 can be used for one or more of subsystems 5402, 5404, and 5406 of system 5400. System 5500 can be a computer connected to a network, such as network 5408 of system 5400. System 5500 can be a client computer or a server. As shown in FIG. 55, system 5500 can be any suitable type of microprocessor-based system, such as a personal computer, workstation, server, or handheld computing device (portable electronic device) such as a phone or tablet. The system can include, for example, one or more of processor 5510, input device 5520, output device 5530, storage 5540, and communication device 5560. Input device 5520 and output device 5530 can generally correspond to those described above and can either be connectable or integrated with the computer.

Input device 5520 can be any suitable device that provides input, such as a touch screen, keyboard or keypad, mouse, or voice-recognition device. Output device 5530 can be any suitable device that provides output, such as a touch screen, haptics device, or speaker.

Storage 5540 can be any suitable device that provides storage, such as an electrical, magnetic, or optical memory including a RAM, cache, hard drive, or removable storage disk. Communication device 5560 can include any suitable device capable of transmitting and receiving signals over a network, such as a network interface chip or device. The components of the computer can be connected in any suitable manner, such as via a physical bus or wirelessly.

Software 5550, which can be stored in storage 5540 and executed by processor 5510, can include, for example, the programming that embodies the functionality of the present disclosure (e.g., as embodied in the devices as described above).

Software 5550 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 5540, that can contain or store programming for use by or in connection with an instruction execution system, apparatus, or device.

Software 5550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic, or infrared wired or wireless propagation medium.

System 5500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 5500 can implement any operating system suitable for operating on the network. Software 5550 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

It should be understood that many additional changes in the details, materials, steps and arrangements of parts, which have been herein described and illustrated in order to explain the nature of the present disclosure, may be made by those skilled in the art while still remaining within the principles and scope of the disclosure.

The invention claimed is:

1. A system for annotating an image of a bony pathology for a surgical procedure on the bony pathology, wherein the system comprises a processor and a display and is configured to:
   receive an image of the bony pathology;
   automatically analyze the image to determine whether a femoral head of the bony pathology is endospherical;
   in accordance with determining that the femoral head is endospherical, determine at least a portion of a resection curve according to a first set of parameters; and
   in accordance with determining that the femoral head is not endospherical, determine the at least a portion of the resection curve according to a second set of parameters, the first and second sets of parameters including at least one parameter that is not shared;
   automatically annotate the image with the at least a portion of the resection curve to create an annotated image, wherein the at least a portion of the resection curve indicates how the bony pathology depicted in the image should be resected;
   display a graphical user interface comprising the annotated image and at least one graphical object configured to adjust at least one parameter of the first set of parameters or the second set of parameters;
   receive at least one input from a user moving the at least one graphical object to a desired location of the graphical user interface; and
   in response to the at least one input, automatically modify and display the at least a portion of the resection curve in the annotated image of the graphical user interface based on the at least one input.

2. The system of claim 1, wherein determining whether the femoral head is endospherical comprises determining whether an edge of the femoral head in the image extends beyond a predetermined threshold distance inside a circle of best fit for the femoral head.

3. The system of claim 1, wherein the first set of parameters comprises an endospherical point of the femoral head, a target point, and a location of the femoral neck.

4. The system of claim 3, wherein the at least a portion of the resection curve determined according to the first set of parameters starts at the endospherical point, goes through the target point, and ends on the location of the femoral neck.

5. The system of claim 1, wherein the second set of parameters comprises a point where bone first deviates from the best-fit circle, a target point, and a location of the femoral neck.

6. The system of claim 5, wherein the at least a portion of the resection curve determined according to the second set of parameters starts at the point where the bone first deviates from a circle of best fit, goes through the target point, and ends on the location of the femoral neck.

7. The system of claim 1, wherein at least one graphical object comprises a slider, and the at least a portion of the resection curve in the annotated image in the graphical user interface is automatically modified as the user moves the slider.

8. The system of claim 1, wherein the at least one parameter of the first set of parameters or the second set of parameters that is configured to be adjusted by the graphical object is a target alpha angle.

9. The system of claim 1, wherein the at least one parameter of the first set of parameters or the second set of parameters that is configured to be adjusted by the graphical object is a resection curve length.

10. The system of claim 1, wherein the at least one parameter of the first set of parameters or the second set of parameters that is configured to be adjusted by the graphical object is a resection curve depth.

11. A system for annotating an image of a bony pathology of a patient for a surgical procedure on the bony pathology, wherein the system comprises a processor and a display and is configured to:
    receive data regarding anatomy of subjects other than the patient;
    based at least in part on the data regarding anatomy of subjects other than the patient, generate and store a mathematical model that includes characteristics of non-pathologic anatomy, the mathematical model configured to accept characteristics of anatomy as input and to generate at least a portion of a resection curve as an output;
    receive an image of the bony pathology of the patient;
    automatically analyze the image to determine at least one characteristic of the bony pathology of the patient;
    based on the at least one characteristic of the bony pathology of the patient, automatically generate a first segment of a resection curve for the image of the bony pathology of the patient and use the mathematical model to automatically generate a second segment of the resection curve for the image of the bony pathology of the patient such that the second segment of the resection curve for the image is a function of the characteristics of non-pathologic anatomy and the at least one characteristic of the bony pathology of the patient, the resection curve for the image indicating how the bony pathology depicted in the image should be resected; and
    display a graphical user interface comprising an annotated image of the bony pathology of the patient and at least one graphical object, the annotated image comprising the resection curve for the image, and the graphical object configured to adjust at least one parameter used to generate the resection curve;
    receive at least one input from a user moving the at least one graphical object to a desired location of the graphical user interface; and
    in response to the at least one input, automatically modify and display the resection curve in the annotated image of the graphical user interface based on the at least one input.

12. The system of claim 11, wherein automatically generating the second segment of the resection curve for the image comprises determining one or more of an end point distal on the femoral neck and a control point for forming a spline in the second segment of the resection curve for the image.

13. The system of claim 11, wherein generating and storing the mathematical model is based at least in part on femoral head and neck curvatures of the anatomy of the subjects in the plurality of images.

14. The system of claim 11, wherein the at least one characteristic of the bony pathology of the patient comprises one or more selected from: femoral head radius; femoral neck width; endospherical femoral head shape; exospherical femoral head shape; distance from neck center to target Alpha Angle; and angle formed from (a) a neck width upper point, (b) a head center, and (c) a neck width lower point.

15. The system of claim 11, wherein the mathematical model is a regression model.

16. A method for annotating an image of a bony pathology of a patient for a surgical procedure on the bony pathology, the method comprising:
receiving data regarding anatomy of subjects other than the patient;
based at least in part on the data regarding anatomy of subjects other than the patient, generating and storing a mathematical model that includes characteristics of non-pathologic anatomy, the mathematical model configured to accept characteristics of anatomy as input and to generate at least a portion of a resection curve as an output;
receiving an image of the bony pathology of the patient;
automatically analyzing the image to determine at least one characteristic of the bony pathology of the patient;
based on the at least one characteristic of the bony pathology of the patient, automatically generating a first segment of a resection curve for the image of the bony pathology of the patient and automatically generating a second segment of the resection curve for the image of the bony pathology of the patient based on the mathematical model such that the second segment of the resection curve for the image is a function of the characteristics of non-pathologic anatomy and the at least one characteristic of the bony pathology of the patient, the resection curve for the image indicating how the bony pathology depicted in the image should be resected; and
displaying a graphical user interface comprising an annotated image of the bony pathology of the patient and at least one graphical object, the annotated image comprising the resection curve for the image;
receiving at least one input from a user via the at least one graphical object for modifying the resection curve;
in response to the at least one input, automatically modifying and displaying the resection curve in the annotated image of the graphical user interface based on the at least one input; and
resecting the bony pathology of the patient in accordance with the modified resection curve in the annotated image.

17. The method of claim 16, wherein automatically generating the second segment of the resection curve for the image comprises determining one or more of an end point distal on the femoral neck and a control point for forming a spline in the second segment of the resection curve for the image.

18. The method of claim 16, wherein generating and storing the mathematical model is based at least in part on femoral head and neck curvatures of the anatomy of the subjects in the plurality of images.

19. The method of claim 16, wherein the at least one characteristic of the bony pathology of the patient comprises one or more selected from: femoral head radius; femoral neck width; endospherical femoral head shape; exospherical femoral head shape; distance from neck center to target Alpha Angle; and angle formed from (a) a neck width upper point, (b) a head center, and (c) a neck width lower point.

20. The method of claim 16, wherein the mathematical model is a regression model.

21. A method for annotating an image of a bony pathology for a surgical procedure on the bony pathology, the method comprising:
receiving a first image of a first bony pathology;
automatically analyzing the first image to determine whether a femoral head of the first bony pathology is endospherical;
in accordance with determining that the femoral head of the first bony pathology is endospherical, determining at least a portion of a first resection curve according to a first set of parameters;
automatically annotating the first image with the at least a portion of the first resection curve to create a first annotated image, wherein the at least a portion of the first resection curve indicates how the first bony pathology depicted in the first image should be resected;
displaying the first annotated image so as to guide a surgical procedure on the first bony pathology;
receiving a second image of a second bony pathology;
automatically analyzing the second image to determine whether a femoral head of the second bony pathology is endospherical;
in accordance with determining that the femoral head of the second bony pathology is not endospherical, determining at least a portion of a second resection curve according to a second set of parameters, the first and second sets of parameters including at least one parameter that is not shared;
automatically annotating the second image with the at least a portion of the second resection curve to create a second annotated image, wherein the at least a portion of the second resection curve indicates how the second bony pathology depicted in the second image should be resected;
displaying a graphical user interface comprising the second annotated image and at least one graphical object configured to adjust at least one parameter of the first set of parameters or the second set of parameters;
receiving at least one input from a user moving the at least one graphical object to a desired location of the graphical user interface; and
in response to the at least one input, automatically modifying and displaying the at least a portion of the second resection curve in the second annotated image of the graphical user interface based on the at least one input.

22. The method of claim 21, wherein determining whether each of the femoral head of the first bony pathology and the femoral head of the second bony pathology is endospherical comprises determining whether an edge of the femoral head in the image extends beyond a predetermined threshold distance inside a circle of best fit for the femoral head.

23. The method of claim 21, wherein the first set of parameters comprises an endospherical point of the femoral head, a target point, and a location of the femoral neck.

24. The method of claim 23, wherein the at least a portion of the first resection curve determined according to the first set of parameters starts at the endospherical point, goes through the target point, and ends on the location of the femoral neck.

25. The method of claim 21, wherein the second set of parameters comprises a point where bone first deviates from the best-fit circle, a target point, and a location of the femoral neck.

26. The method of claim 25, wherein the at least a portion of the second resection curve determined according to the second set of parameters starts at the point where the bone first deviates from a circle of best fit, goes through the target point, and ends on the location of the femoral neck.

27. A method for annotating an image of a bony pathology of a patient for a surgical procedure on the bony pathology, the method comprising:
receiving data regarding anatomy of subjects other than the patient;
based at least in part on the data regarding anatomy of subjects other than the patient, generating and storing a mathematical model that includes characteristics of non-pathologic anatomy, the mathematical model configured to accept characteristics of anatomy as input and to generate at least a portion of a resection curve as an output;
receiving an image of the bony pathology of the patient;
automatically analyzing the image to determine at least one characteristic of the bony pathology of the patient;
based on the at least one characteristic of the bony pathology of the patient, automatically generating a first segment of a resection curve for the image of the bony pathology of the patient and automatically generating a second segment of the resection curve for the image of the bony pathology of the patient based on the mathematical model such that the second segment of the resection curve for the image is a function of the characteristics of non-pathologic anatomy and the at least one characteristic of the bony pathology of the patient, the resection curve for the image indicating how the bony pathology depicted in the image should be resected; and
displaying a graphical user interface comprising an annotated image of the bony pathology of the patient and at least one graphical object, the annotated image comprising the resection curve for the image, and the graphical object configured to adjust at least one parameter used to generate the resection curve;
receiving at least one input from a user moving the at least one graphical object to a desired location of the graphical user interface; and
in response to the at least one input, automatically modify and display the resection curve in the annotated image of the graphical user interface based on the at least one input.

28. The method of claim 27, wherein automatically generating the second segment of the resection curve for the image comprises determining one or more of an end point distal on the femoral neck and a control point for forming a spline in the second segment of the resection curve for the image.

29. The method of claim 27, wherein generating and storing the mathematical model is based at least in part on femoral head and neck curvatures of the anatomy of the subjects in the plurality of images.

30. The method of claim 27, wherein the at least one characteristic of the bony pathology of the patient comprises one or more selected from: femoral head radius; femoral neck width; endospherical femoral head shape; exospherical femoral head shape; distance from neck center to target Alpha Angle; and angle formed from (a) a neck width upper point, (b) a head center, and (c) a neck width lower point.

31. The method of claim 27, wherein the mathematical model is a regression model.

* * * * *